United States Patent
Zhao et al.

(10) Patent No.: US 12,441,732 B2
(45) Date of Patent: Oct. 14, 2025

(54) POTASSIUM SALT CRYSTAL FORM B OF PHOSPHODIESTERASE TYPE 5 INHIBITOR, AND PREPARATION METHOD AND USE THEREFOR

(71) Applicant: Guangzhou Huazhen Pharmaceutical Co., Ltd, Guzngzhou (CN)

(72) Inventors: Allan Zijian Zhao, Guangzhou (CN); Yunping Mu, Guangzhou (CN); Fanghong Li, Guangzhou (CN); Zhenggang Zhao, Guangzhou (CN); Huidan Zhu, Guangzhou (CN)

(73) Assignee: SHENZHEN HANHUI PHARMACEUTICAL TECHNOLOGY CO., LTD., Shenzhen (CN)

( * ) Notice: Subject to any disclaimer, the term of this patent is extended or adjusted under 35 U.S.C. 154(b) by 979 days.

(21) Appl. No.: 17/617,655

(22) PCT Filed: Aug. 7, 2020

(86) PCT No.: PCT/CN2020/107811
§ 371 (c)(1),
(2) Date: Dec. 9, 2021

(87) PCT Pub. No.: WO2020/249139
PCT Pub. Date: Dec. 17, 2020

(65) Prior Publication Data
US 2022/0251093 A1 Aug. 11, 2022

(30) Foreign Application Priority Data
Jun. 12, 2019 (CN) .................. 201910505948.5

(51) Int. Cl.
| | |
|---|---|
| *C07D 487/04* | (2006.01) |
| *A61P 9/00* | (2006.01) |
| *A61P 9/12* | (2006.01) |
| *A61P 11/00* | (2006.01) |
| *A61P 13/12* | (2006.01) |
| *A61P 15/10* | (2006.01) |

(52) U.S. Cl.
CPC ............. *C07D 487/04* (2013.01); *A61P 9/00* (2018.01); *A61P 9/12* (2018.01); *A61P 11/00* (2018.01); *A61P 13/12* (2018.01); *A61P 15/10* (2018.01); *C07B 2200/13* (2013.01)

(58) Field of Classification Search
CPC ... C07D 487/04; C07B 2200/13; A61P 15/10; A61P 9/00; A61P 9/12; A61P 11/00; A61P 13/12
See application file for complete search history.

(56) References Cited

U.S. PATENT DOCUMENTS

| | | |
|---|---|---|
| 4,753,224 A | 6/1988 | Tojo |
| 5,305,736 A | 4/1994 | Ito |
| 6,225,315 B1 | 5/2001 | Ellis |

FOREIGN PATENT DOCUMENTS

| | | |
|---|---|---|
| CN | 1572227 A | 2/2005 |
| CN | 1798519 A | 7/2006 |
| CN | 102450996 A | 5/2012 |
| CN | 102020645 B | 12/2012 |
| CN | 104602588 A | 5/2015 |
| CN | 104812290 A | 7/2015 |
| CN | 207666561 U | 7/2018 |
| CN | 212996344 U | 4/2021 |
| WO | 2007056955 A1 | 5/2007 |
| WO | 2016035386 A1 | 3/2016 |

OTHER PUBLICATIONS

Examination Report for GB2117860.3; dated Feb. 24, 2023; 1 page.
Australian Government, IP Australia; 1st Office Action of Corresponding AU Application No. 2020293524; Date: Sep. 15, 2022; pp. 1-2.
International Search Report, China National Property Administration, International Application No. PCT/CN2021/098683, Sep. 22, 2021, 3 pages.
Written Opinion of the International Searching Authority, International Searching Authority; Application No. PCT/CN2021/098683, Sep. 22, 2021, 9 pages.
International Searching Authority, China Patent Office (ISA/CN); International Search Report, Intl Application PCT/CN2020/107811; Date: Oct. 28, 2020; pp. 1-3.
International Searching Authority, China Patent Office (ISA/CN); Written Opinion of The International Searching Authority, Intl Application PCT/CN2020/107811; Date Oct. 28, 2020; pp. 1-4.
China Patent Office; First Office Action of corresponding application No. 2019105059485; Date: Jan. 10, 2022; pp. 1.

*Primary Examiner* — Timothy R Rozof

(57) ABSTRACT

Disclosed in the present disclosure are a potassium salt crystal form B of a phosphodiesterase type 5 inhibitor, and a preparation method and a use therefor. The structural formula of the phosphodiesterase type 5 inhibitor is as shown in a formula (I), and the X-ray powder diffraction (XRPD) pattern of the potassium salt crystal form B has characteristic peaks at the following 2θ angles: $5.71°\pm0.2°$, $8.23°\pm0.2°$, $11.37°\pm0.2°$, $13.22°\pm0.2°$, $17.09°\pm0.2°$, $21.56°\pm0.2°$, $23.99°\pm0.2°$, and $25.85°\pm0.2°$. Further disclosed in the present disclosure is a use for the present crystal form potassium salt in preparing drugs for treating pulmonary hypertension, idiopathic pulmonary fibrosis, renal fibrosis, myocardial hypertrophy, or erectile dysfunction.

19 Claims, 22 Drawing Sheets

POTASSIUM SALT CRYSTAL FORM B OF PHOSPHODIESTERASE TYPE 5 INHIBITOR, AND PREPARATION METHOD AND USE THEREFOR

INCORPORATION BY REFERENCE

This application is a U.S. National Phase of International PCT Application No. PCT/CN2020/107811 filed on Aug. 7, 2020, which claims priority to CN Application No. 201910505948.5 filed on Jun. 12, 2019, the contents of each application are herein incorporated by reference in their entirety.

TECHNICAL FIELD

The present disclosure relates to the chemical pharmaceutical field, and specifically relates to a potassium salt crystal form B of a phosphodiesterase type 5 inhibitor, and a preparation method and a use therefor.

BACKGROUND

Phosphodiesterase inhibitors (PDEis) are drugs that inhibit the activity of phosphodiesterases (PDEs) and have a wide application prospect in diseases such as heart failure, asthma, and erectile dysfunction. Cyclic adenosine monophosphate (cAMP) and cyclic guanosine monophosphate (cGMP) are two important second messengers in cells that are involved in various metabolic activities of the body through the activation of protein kinase A (PKA) and protein kinase G (PKG) pathways, and regulation of their intracellular concentrations is mainly determined by the balance between the synthesis of adenylate (guanylate) cyclase and the hydrolysis of PDE. PDE can specifically catalyze the hydrolysis of cGMP and cAMP in cells to produce the corresponding inactive 5'-nucleotides, wherein phosphodiesterase type 5 (PDE5) may specifically hydrolyze cGMP, and is mainly distributed in the lung, pancreas, brain, penile corpus cavernosum, vascular smooth muscle cells, platelets, skeletal muscle cells, and myocardial cells. The studies have shown that PDE-5i can regulate the contractility of the penile corpus cavernosum and the vascular smooth muscle of the lung, and participate in the conduction of the NO-cGMP signal pathway in the brain, as well as the growth and apoptosis of breast cancer cells. However, the therapeutic effects of PDE-5i on IPF have not been reported and need to be further investigated.

Sildenafil, a selective inhibitor of cGMP-specific PDE5, is a drug for the treatment of erectile dysfunction (ED) in men that was accidentally invented during the development of drugs for the treatment of cardiovascular diseases. By selectively inhibiting PDE5, Sildenafil can prevent the degradation of cGMP, and increase the level of cGMP in cells, thereby increasing the effects of nitric oxide in relaxing vascular smooth muscle and reducing vascular resistance, thus Sildenafil was first introduced into clinical research as a candidate drug for the treatment of cardiovascular diseases. In 2005, the FDA in USA approved Sildenafil for the treatment of pulmonary arterial hypertension (PAH), and in 2009, another PDE5i, Tadalafil, was approved, both of which are currently used as first-line therapeutic agents for PAH. PDE5i can increase pulmonary artery vasodilation and inhibit pulmonary vascular remodeling, thereby reducing pulmonary artery pressure and pulmonary vascular resistance, significantly increasing the survival rate of patients and improving the quality of life. However, Sildenafil has the disadvantages of high dosage (100 mg/day), short biological half-life, low bioavailability (about 41%), and the need for patients to take the drug for multiple times a day, which greatly increases the adverse effects of the drug and the cost of treatment. In addition, the selective effect of Sildenafil on PDE5 is only 10 times that of PDE6 which is an enzyme existing in the retina. Therefore, high doses or high blood drug concentration of Sildenafil may cause color vision abnormalities such as photophobia and blurred vision. Compared with Sildenafil, Tadalafil has a significantly prolonged biological half-life (approximately 17.5 hours) and requires a lower daily therapeutic dose (40 mg/day), significantly reducing the cost of treatment for patients. However, because Tadalafil also inhibits other PDEs, adverse effects, such as headache, stomach discomfort or pains, diarrhea, back pains and muscle pains, are also significant.

To overcome the side effects clinically manifested by Sildenafil and Tadalafil, the Chinese patent document (CN102020645A) discloses a pyrazolopyrimidinone derivative with few side effects for the preparation of therapeutic agents for the treatment of male impotence, pulmonary arterial hypertension, lower urinary tract syndrome, benign prostatic enlargement, chronic heart failure, stroke, coronary artery disease, neurological pituitary function disorder, etc. The Chinese patent document also specifically discloses a compound WYQ: 5-(2-H-5 (N-butoxycarbonylaminosulfonyl)phenyl)-1-methyl-3-propyl-1,6-dihydro-7H-pyrazolo[4,3-d]pyrimidin-7-one, having a structure shown in a formula (I). Compared with Sildenafil, which has a structural formula shown in a formula (II), the compound WYQ retains the parent ring on Sildenafil which is highly similar to the molecular structure of cyclic guanosine monophosphate (cGMP), ensuring the activity of the derivative, while removing the ethoxy group which may be decomposed from the side chain benzene ring, and replacing cyclic methylpiperazine with chain n-butoxymethanamide to reduce the tension, thereby improving the stability of the drug in the organism.

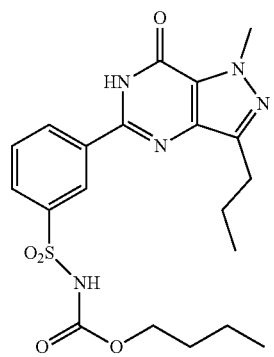

(I)

-continued

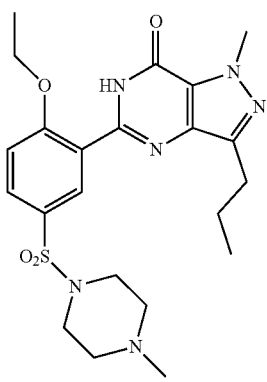

(II)

The compound WYQ is a derivative of Sildenafil and has the same efficacy as Sildenafil and Tadalafil, and has a lower dose and higher efficacy than Sildenafil. Since the efficacy of the compound WYQ is dependent on the therapeutic dose, and more importantly, the solubility of the compound WYQ in water is very low, which increases the daily dose of the compound WYQ. The compound WYQ is mainly metabolized by the liver and kidneys, which may increase the burden on the liver and kidneys if a large dose is given to a person with hepatorenal insufficiency for long-term treatment, causing serious adverse effects and significantly increasing the cost of treatment for the patient. In view of the inadequacy of the prior art, there is still a need to develop a PDE5i crystal form with good water solubility and physicochemical stability in the art to meet the strict requirements of clinical drugs on the physicochemical properties of active substances, such as morphology, water solubility and purity. At present, there has not been any report on the potassium salt crystal form of the compound WYQ.

SUMMARY

Therefore, the present disclosure aims to provide a potassium salt crystal form of the compound WYQ with good water solubility and stable physicochemical properties.

The present disclosure provides a potassium salt crystal form B of a compound, wherein the compound has a structural formula shown in a formula (I), (I)

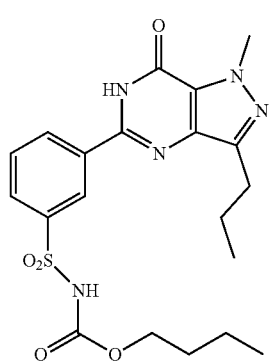

an X-ray powder diffraction (XRPD) pattern of the potassium salt crystal form B has characteristic peaks at the following 2θ angles: 5.71°±0.2°, 8.23°±0.2°, 11.37°±0.2°, 13.22°±0.2°, 17.09°±0.2°, 21.56°±0.2°, 23.99°±0.2°, and 25.85°±0.2°.

Further, the X-ray powder diffraction (XRPD) pattern of the potassium salt crystal form B has characteristic peaks at the following 2θ angles: 15.88°±0.2°, 16.35°±0.2°, 18.47°±0.2°, 19.70°±0.2°, 22.90°±0.2°, 23.64°±0.2°, and 31.92°±0.2°.

Further, the X-ray powder diffraction (XRPD) pattern of the potassium salt crystal form B has characteristic peaks at the following 2θ angles: 25.04°±0.2°, 26.54°±0.2°, 28.36°±0.2°, 29.94°±0.2°, 35.48°±0.2°, and 37.83°±0.2°.

Further, the potassium salt crystal form B has an X-ray powder diffraction (XRPD) pattern as shown in FIG. 1.

Further, a differential scanning calorimetry (DSC) pattern of the potassium salt crystal form B has characteristic melting absorption peaks at 191.3° C. and 217.9° C.

Further, the potassium salt crystal form B has a TG-DSC pattern as shown in FIG. 2.

Further, the potassium salt crystal form B has a molecular formula: $C_{20}H_{24}KN_5O_5S$.

Further, the potassium salt crystal form B has a following structural formula:

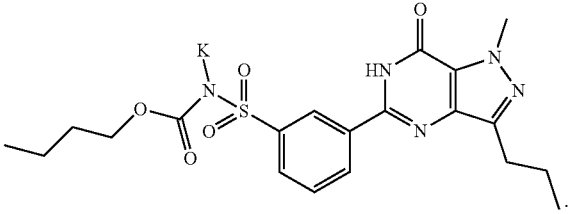

The present disclosure also provides a method for preparing the potassium salt crystal form B of the compound shown in the formula (I) above, including:

mixing the compound shown in the formula I with a solvent to form a suspension 1;

adding potassium hydroxide into the suspension 1 to dissolve to form a suspension 2, followed by crystallizing with stirring to form a solid material; and separating the solid material by filtrating under vacuum, and drying under vacuum to obtain the potassium salt crystal form B of the compound.

Further, the solvent is selected from the group consisting of acetone, tetrahydrofuran, ethyl acetate or ethanol.

Further, a mass-volume ratio of the compound shown in the formula I to the solvent is 25-30 mg/mL, and a mass ratio of potassium hydroxide to the compound shown in the formula I is 1:(7-10).

Further, the crystallizing by stirring includes: sequentially stirring the suspension 2 at 45-50° C. for 5-10 min, then at 20-30° C. for 20-24 h, and then at 45-50° C. for 8-10 h.

Further, the method for preparing the potassium salt crystal form B of the compound includes:

mixing the compound shown in the formula I with acetone at a mass-volume ratio of 28 mg/mL to form a suspension 1;

adding potassium hydroxide to the suspension 1 to dissolve with sonicating to form a suspension 2, wherein a mass ratio of potassium hydroxide to the compound shown in the formula I is 1:8;

sequentially stirring the suspension 2 at 50° C. for 5 min, then at 25° C. for 24 h and then at 50° C. for 9 h, thereby forming a solid material; and separating the solid material by filtrating under vacuum, and drying under vacuum to obtain the potassium salt crystal form B of the compound.

The disclosure further provides a pharmaceutical composition, including the potassium salt crystal form B of the compound shown in the formula (I) above and a pharmaceutically acceptable carrier.

The disclosure further provides use of the potassium salt crystal form B of the compound shown in the formula (I) above in the manufacture of a medicament for treating pulmonary arterial hypertension.

The present disclosure further provides use of the potassium salt crystal form B of the compound shown in the formula (I) above in the manufacture of a medicament for treating idiopathic pulmonary fibrosis.

The present disclosure further provides use of the potassium salt crystal form B of the compound shown in the formula (I) above in the manufacture of a medicament for treating renal fibrosis.

The present disclosure further provides use of the potassium salt crystal form B of the compound shown in the formula (I) above in the manufacture of a medicament for treating myocardial hypertrophy.

The present disclosure further provides use of the potassium salt crystal form B of the compound shown in the formula (I) above in the manufacture of a medicament for treating erectile dysfunction.

The disclosure further provides a method for treating pulmonary arterial hypertension, including administering the potassium salt crystal form B of the compound shown in the formula (I) above to a subject; preferably, the potassium salt crystal form B of the compound is administered orally at a dose of 0.324-3.24 mg·kg$^{-1}$·d$^{-1}$, preferably once a day, preferably for 14 consecutive days; or preferably, the potassium salt crystal form B of the compound is administered by injecting at a dose of 0.097-1.296 mg·kg$^{-1}$·d$^{-1}$, preferably once a day, preferably for 14 consecutive days.

The disclosure further provides a method for treating idiopathic pulmonary fibrosis, including administering the potassium salt crystal form B of the compound shown in the formula (I) above to a subject; preferably, the potassium salt crystal form B of the compound is administered orally at a dose of 0.405-1.62 mg·kg$^{-1}$·d$^{-1}$, preferably once a day, preferably for 23 consecutive days; or preferably, the potassium salt crystal form B of the compound is administered by injecting at a dose of 0.122-0.648 mg·kg$^{-1}$·d$^{-1}$, preferably once a day, preferably for 23 consecutive days.

The disclosure further provides a method for treating renal fibrosis, including administering a potassium salt crystal form B of the compound shown in the formula (I) above to a subject; preferably, the potassium salt crystal form B of the compound is administered orally at a dose of 0.405 mg·kg$^{-1}$·d$^{-1}$, preferably once a day, preferably for 10 consecutive days, more preferably for 7 consecutive days; or preferably, the potassium salt crystal form B of the compound is administered by injecting at a dose of 0.1215-0.162 mg·kg$^{-1}$·d$^{-1}$, preferably once a day, preferably for 10 consecutive days, more preferably for 7 consecutive days.

The disclosure further provides a method for treating myocardial hypertrophy, including administering the potassium salt crystal form B of the compound shown in the formula (I) above to a subject; preferably, the potassium salt crystal form B of the compound is administered orally at a dose of 0.324 mg·kg$^{-1}$·d$^{-1}$, preferably once a day, preferably for 7 consecutive days; or preferably, the potassium salt crystal form B of the compound is administered by injecting at a dose of 0.097-0.1296 mg·kg$^{-1}$·d$^{-1}$, preferably once a day, preferably for 7 consecutive days.

The disclosure further provides a method for treating erectile dysfunction, including administering the potassium salt crystal form B of the compound shown in the formula (I) above to a subject; preferably, the potassium salt crystal form B of the compound is administered orally at a dose of 0.324-3.24 mg·kg$^{-1}$·d$^{-1}$, preferably once a day, preferably for 14 consecutive days; or preferably, the potassium salt crystal form B of the compound is administered by injecting at a dose of 0.097-1.296 mg·kg$^{-1}$·d$^{-1}$, preferably once a day, preferably for 14 consecutive days.

The technical solution of the present disclosure has advantages that the potassium salt crystal form B of the compound WYQ, which is obtained by screening the crystal form formed by the salt formation or eutectic of the compound WYQ, has better water solubility and stable physicochemical properties; and has low dose and high efficacy in the treatment of pulmonary arterial hypertension and erectile dysfunction and the like; in particular, the potassium salt crystal form B is found to have therapeutic effects on idiopathic pulmonary fibrosis, renal fibrosis and myocardial hypertrophy, also with low dose and high efficacy; and has the advantages of a simple preparation process, easy operation and good stability, thereby having the potential to be developed as a drug for treatment of the above diseases.

BRIEF DESCRIPTION OF THE DRAWINGS

In order to illustrate the technical solutions in the specific embodiments of the present disclosure or the prior art more clearly, the following is a brief description of the accompanying drawings that need to be used in the description of the specific embodiments or the prior art, it would be obvious that the following drawings in the description are some embodiments of the present disclosure, and that other drawings can be obtained from these drawings without any creative effort for a person of ordinary skill in the art.

DETAILED DESCRIPTION

Figure 1:
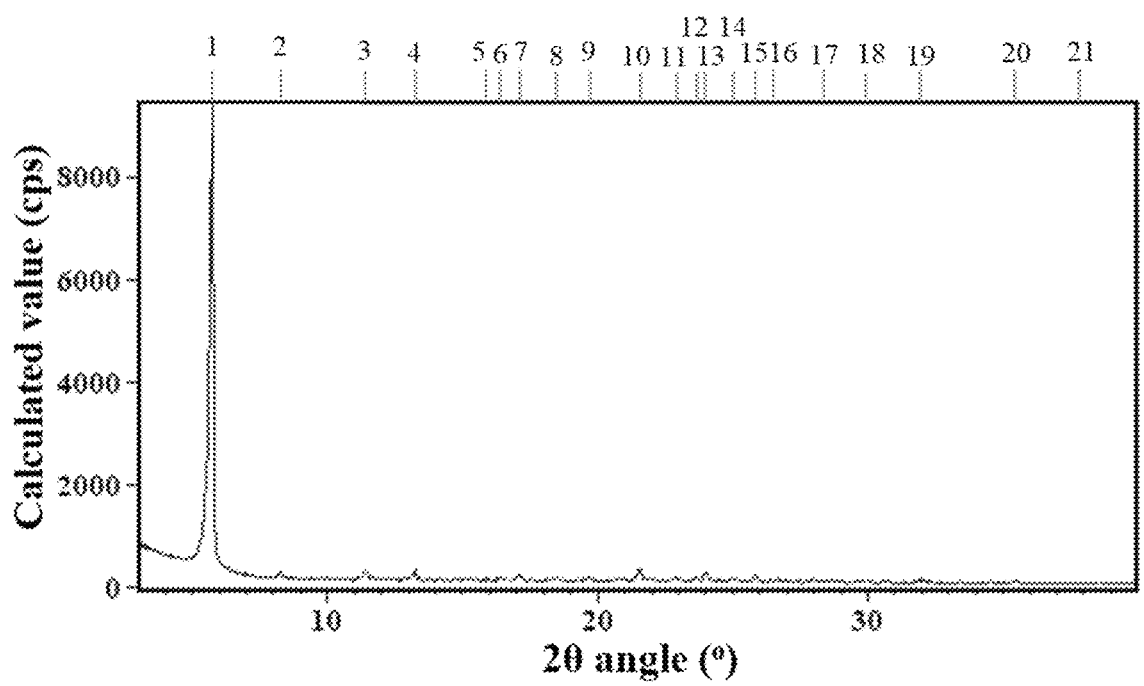
FIG. 1 is an X-ray powder diffraction (XRPD) pattern of a potassium salt crystal form B prepared in Embodiment 1 according to the present application.

The following embodiments are provided for a better understanding of the disclosure and are not limited to the best embodiments, and are not intended to limit the content and protection scope of the present disclosure. Any product identical or similar to the disclosure derived by anyone under the enlightenment of the present disclosure or by combining the disclosure with features of other prior art falls within the scope of the disclosure.

Source of Reagents

Potassium hydroxide was purchased from China National Pharmaceutical Group Co., Ltd.;

The compound WYQ (batch No.: ET2951-2-P1) was synthesized by WuXi AppTec New Drug Development Co., Ltd. with the following synthetic routes:

(1) a compound 1 (50.0 g, 274 mmol, 1.00 eq) and a compound 1A (41.5 g, 274 mmol, 1.00 eq) were mixed in dioxane (350 ml) to form a suspension, and then the mixture was stirred at 80° C. for 3 h after forming an imine by thin layer chromatography (TLC). CuCl$_2$ (36.9 g, 274 mmol, 1.00 eq) was added under an O2 condition. The mixture was stirred at 80° C. for 2 h under the same O2 condition (15 psi). TLC (petroleum ether/ethyl acetate=3/1, Rf=0.43) indicated that the reaction was complete, the reaction mixture was poured into ice water (500 ml) and stirred for 20 min, filtered and concentrated under reduced pressure, to obtain the residue. The reaction mixture was washed with methyl tert-butyl ether (MTBE, 500 ml), filtered and concentrated under reduced pressure to give a compound 2 (50.0 g, 160 mmol, a yield of 58.2%) as a white solid;

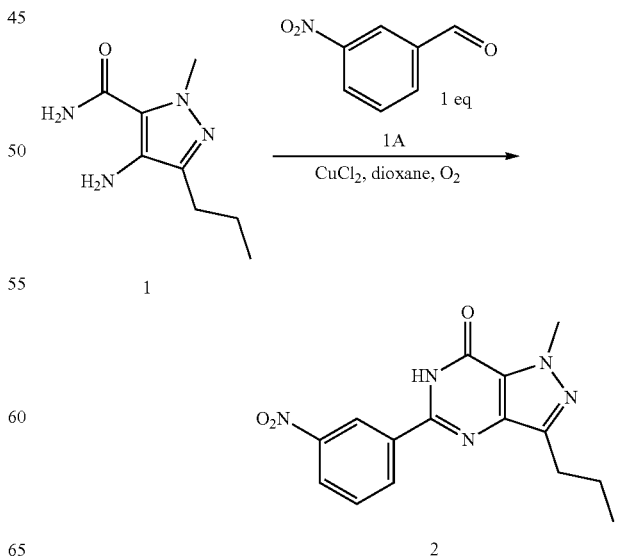

(2) the compound 2 (50.0 g, 160 mmol, 1.00 eq) was dissolved in methanol (MeOH, 250 ml) and tetrahydrofuran (THF, 250 ml) under a N₂ condition, and a palladium-carbon catalyst (Pd/C, 5.00 g, a purity of 10%) was added. The suspension was degassed under vacuum and purged for several times with H₂, and the mixture was stirred at 50° C. under a H₂ condition (50 psi) for 5 h. TLC (petroleum ether/ethyl acetate=0/1, Rf=0.33) indicated that the reaction was complete, and the reaction mixture was filtered and the filtrate was concentrated. The crude product was washed with MTBE (200 ml×3) to give a compound 3 (40.0 g, 118.6 mmol, a yield of 74.3%, a purity of 84.0%) as a white solid;

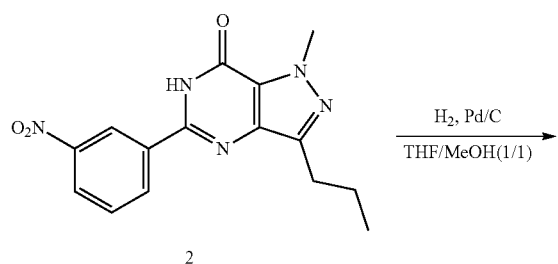

the compound 3 (40.0 g, 141 mmol, 1.00 eq) was dissolved in acetonitrile (MeCN, 500 mL), BF₃.HF (18.6 g, 212 mmol, 1.50 eq) and tert-butyl nitrite (21.8 g, 212 mmol, 1.50 eq) are added, and then the mixture was stirred at 0° C. under a N₂ condition for 0.5 h. SO₂ (90.4 g, 1.41 mol, 10.0 eq) and CuCl (20.9 g, 212 mmol, 1.50 eq) were added to MeCN (100 ml) and purged for 3 times with N₂, and then the mixture was stirred at 25° C. under a N₂ condition for 2.5 h. TLC (petroleum ether/ethyl acetate=0/1, Rf=0.36) indicated the reaction was completed, and the reaction mixture was added to ice water (500 ml) and stirred at 0° C. for 0.5 h. After filtration, the filter cake was concentrated under low pressure to give the residue. The crude product was washed with MTBE (200 ml), and filtered. The filter cake was concentrated under reduced pressure to give a compound 4 (40.0 g, 109 mmol, a yield of 77.2%) as a white solid;

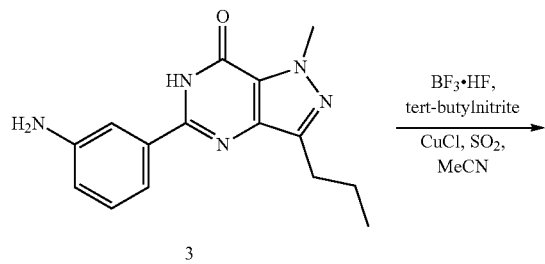

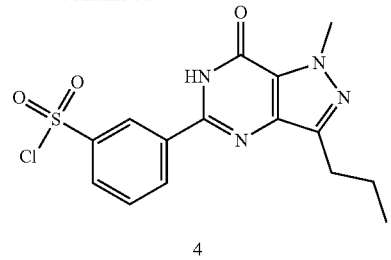

the compound 4 (40.0 g, 109 mmol, 1.00 eq) was dissolved in NH₃·H₂O (300 ml, a purity of 25%) to form a mixture. The mixture was purged for 3 times with N₂, and then stirred at 30° C. under a N₂ condition for 12 h. TLC (petroleum ether/ethyl acetate=0/1, Rf=0.24) indicated that the reaction was complete, and the reaction mixture was concentrated and filtered. The filter cake was concentrated under reduced pressure to give the residue. The residue was diluted with THF (300 ml), dried over Na₂SO₄, filtered and concentrated under reduced pressure to give a compound 5 (30.0 g, 86.4 mmol, a yield of 79.2%) as a blue solid;

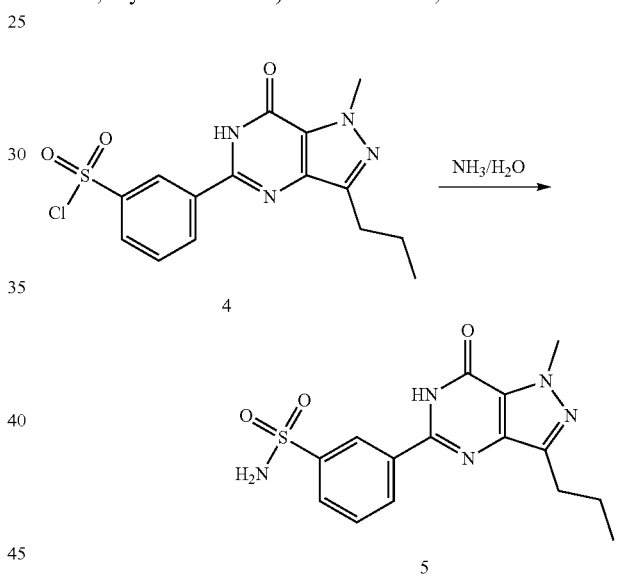

the compound 5 (15.0 g, 43.2 mmol, 1.00 eq) was dissolved in N,N-dimethylformamide (DMF, 75.0 ml) and dichloromethane (DCM, 75.0 ml) to form a mixture, and 4-dimethylaminopyridine (DMAP, 2.64 g, 21.6 mmol, 0.50 eq) and triethylamine (TEA, 8.74 g, 86.4 mmol, 2.00 eq) were added. A compound 5A (11.8 g, 86.4 mmol, 2.00 eq) was added at 0° C., and the mixture was purged for 3 times with N₂, and stirred for 12 h at 25° C. under a N₂ condition. TLC (dichloromethane/methanol=10/1, Rf=0.31) indicated the reaction was completed, and the reaction mixture was partitioned in ethyl acetate (EtOAc, 200 ml) and brine (300 ml). The organic phase was separated, washed with brine (200 ml×3), dried over Na₂SO₄, filtered and concentrated under reduced pressure to obtain the residue. The residue was purified by column chromatography (SiO₂, dichloromethane-methanol 101), followed by preparative high performance liquid chromatography (TFA conditions, column: Phenomenex Luna C18 250×50 mm×10 μm, mobile phase: [water 0.1% acetonitrile], B %: 35%65%. After 20 min, the compound WYQ (10.2 g, 22.5 mmol, a yield of 52.2%, a purity of 98.8%) as a white solid was obtained.

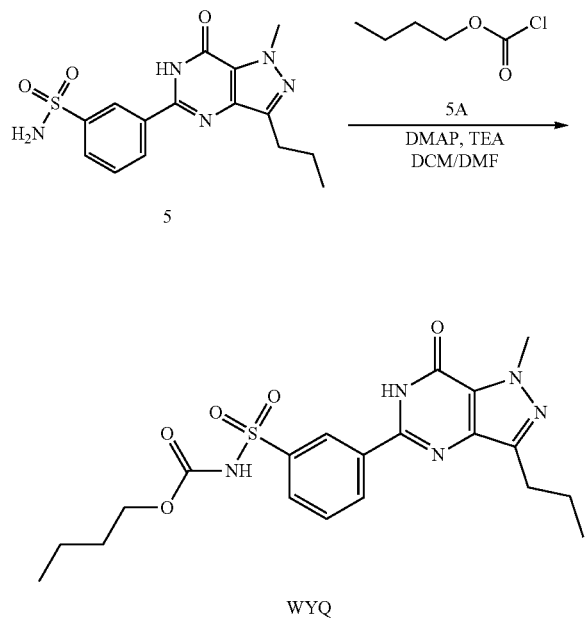

Embodiments in which specific experimental procedures or conditions are not described can be performed according to the conventional experimental procedures or conditions as described in the literature in the art. The used reagents or apparatus, where the manufacturer is not specified, are commercially available conventional reagent products.

Embodiment 1

Preparation Method of the Potassium Salt Crystal Form B of the Compound WYQ:

400.1 mg of the compound WYQ was weighed in a 20 mL vial, 14.4 mL of acetone (acetone:water=19:1, v/v) was added, and mixing was conducted to form a suspension 1;

50.5 mg of potassium hydroxide was weighed, and added into the suspension 1, and the mixture was sonicated for 30 s to aid in dissolution, thereby forming a suspension 2;

the suspension 2 was stirred at 50° C. for 5 min, at 25° C. for 24 h, and at 50° C. for 9 h, sequentially, to separate out a solid material; and the solid material was separated by vacuum filtration and dried under vacuum at 25° C. for 24 h to obtain 290.1 mg of a crystalline solid (a mass yield: 72.5%).

The X-ray powder diffraction (XRPD) pattern was shown in FIG. 1; TG-DSC pattern was shown in FIG. 2; the HPLC purity was 98.7 area %; IC test (Thermo ICS1100) results indicated that the stoichiometric ratio of the compound WYQ to potassium ions is 1:7-1:10; the polarized light microscopy (PLM, Axio Lab. A1) pattern was shown in FIG. 3, indicating that the prepared potassium salt crystal form B consists of small particles with agglomeration.

Embodiment 2

Preparation Method of the Potassium Salt Crystal Form B of the Compound WYQ:

480 mg of the compound WYQ was weighed in a 40 mL vial, 20 mL of tetrahydrofuran (tetrahydrofuran:water=19:1, v/v) was added, and mixing was conducted to form a suspension 1;

69 mg of potassium hydroxide was weighed, and added to the suspension 1, and the mixture was sonicated for 60 s to aid in dissolution, thereby forming a suspension 2;

the suspension 2 was stirred at 45° C. for 10 min, at 20° C. for 24 h, and at 45° C. for 10 h, sequentially, to separate out a solid material; and the solid material was separated by vacuum filtration and dried under vacuum at room temperature for 12 h to obtain 290.1 mg of a crystalline solid (a mass yield: 72.5%).

Figure 2:
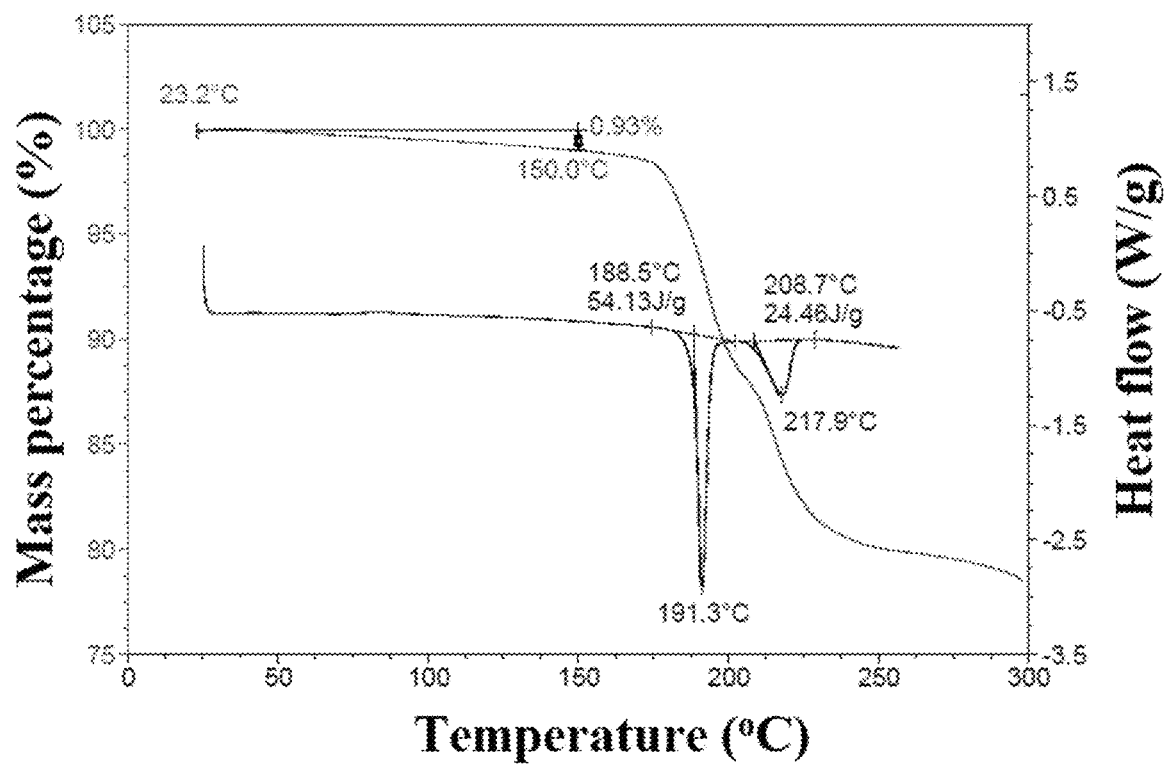
FIG. 2 is a TG-DSC pattern of the potassium salt crystal form B prepared in Embodiment 1 according to the present application.
Figure 3:
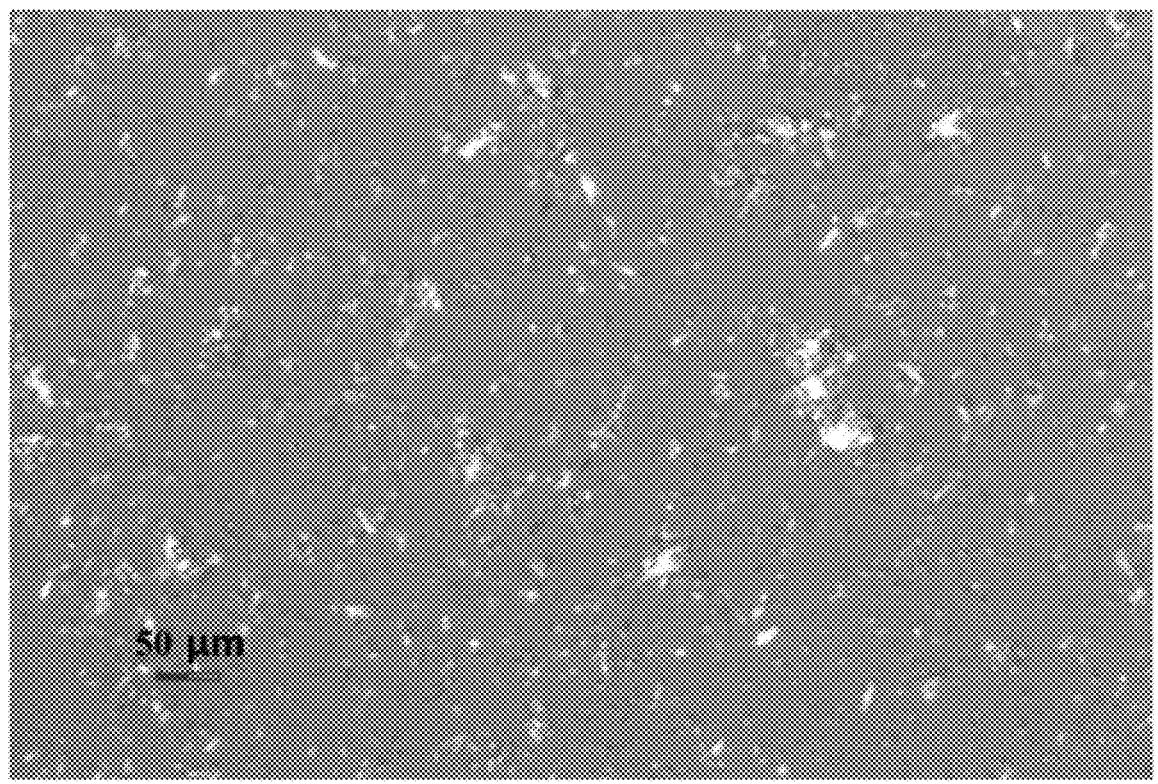
FIG. 3 is a polarized light micrograph of the potassium salt crystal form B prepared in Embodiment 1 according to the present application.

The X-ray powder diffraction (XRPD) pattern was substantially consistent with that in FIG. 1; the TG-DSC pattern was substantially consistent with that in FIG. 2; the HPLC purity was 99 area %.

Embodiment 3

Preparation Method of the Potassium Salt Crystal Form B of the Compound WYQ:

600 mg of the compound WYQ was weighed in a 40 mL vial, 20 mL of ethyl acetate (ethyl acetate:water=19:1, v/v) was added, and mixing was conducted to form a suspension 1;

60 mg of potassium hydroxide was weighed, and added to the suspension 1, and the mixture was sonicated for 40 s to aid in dissolution, thereby forming a suspension 2;

the suspension 2 was stirred at 50° C. for 8 min, at 30° C. for 20 h and at 50° C. for 8 h sequentially, to separate out a solid material; and the solid material was separated by vacuum filtration and dried under vacuum at room temperature for 20 h to obtain 290.1 mg of a crystalline solid (a mass yield: 72.5%).

The X-ray powder diffraction (XRPD) pattern was substantially consistent with that in FIG. 1; the TG-DSC pattern was substantially consistent with that in FIG. 2; the HPLC purity was 99 area %.

The present disclosure provides the potassium salt crystal form B of the compound WYQ, and the properties of the potassium salt crystal form B of the compound WYQ prepared in Embodiment 1 were investigated by various means and instruments.

I. X-Ray Powder Diffraction (XRPD)

The XRPD pattern of the potassium salt crystal form B prepared in Embodiment 1 was obtained using an X-ray powder diffractometer (X'Pert³) with a scanning speed of 2° per minute and a copper-chromium target, as shown in FIG. 1. Test parameters for XRPD are shown in Table 1. Each detailed parameter for X-ray powder diffraction in FIG. 1 is shown in Table 2.

TABLE 1

| Test parameters for XRPD | |
|---|---|
| Parameters | XRPD (reflection mode) |
| X-ray | Cu, kα, Kα1 (Å): 1.540598; Kα2 (Å): 1.544426 Kα1/Kα2 intensity ratio: 0.50 |
| X-ray tube setting | 45 kV, 40 mA |
| divergent slit | fixed 1/8° |
| scanning mode | continuous |
| scanning range (°2θ) | 3°-40° |
| Scanning time per step (s) | 46.7 |
| Scanning step length (°2θ) | 0.0263 |
| Test time | approx. 5 min |

TABLE 2

Parameters for X-ray powder diffraction of the potassium salt crystal form B prepared in Embodiment 1

| Peak No.: | Diffraction angle (2θ°) | Peak height (cts) | Left half-height width (2θ°) | Interplanar crystal spacing (Å) | Relative intensity (%) |
|---|---|---|---|---|---|
| 1 | 5.71 | 9242.67 | 0.1023 | 15.48 | 100.00 |
| 2 | 8.23 | 149.89 | 0.1023 | 10.74 | 1.62 |
| 3 | 11.37 | 188.39 | 0.1023 | 7.79 | 2.04 |
| 4 | 13.22 | 197.75 | 0.1023 | 6.70 | 2.14 |
| 5 | 15.88 | 45.48 | 0.1535 | 5.58 | 0.49 |
| 6 | 16.35 | 78.80 | 0.1023 | 5.42 | 0.85 |
| 7 | 17.09 | 115.22 | 0.1535 | 5.19 | 1.25 |
| 8 | 18.47 | 87.84 | 0.1023 | 4.80 | 0.95 |
| 9 | 19.70 | 86.10 | 0.1535 | 4.51 | 0.93 |
| 10 | 21.56 | 254.74 | 0.1279 | 4.12 | 2.76 |
| 11 | 22.90 | 80.59 | 0.2047 | 3.88 | 0.87 |
| 12 | 23.64 | 85.49 | 0.1535 | 3.76 | 0.92 |
| 13 | 23.99 | 200.28 | 0.1023 | 3.71 | 2.17 |
| 14 | 24.04 | 37.53 | 0.2047 | 3.56 | 0.41 |
| 15 | 25.85 | 127.41 | 0.1279 | 3.45 | 1.38 |
| 16 | 26.54 | 29.52 | 0.4093 | 3.36 | 0.32 |
| 17 | 28.36 | 17.55 | 0.6140 | 3.15 | 0.19 |
| 18 | 29.94 | 33.69 | 0.3582 | 2.98 | 0.36 |
| 19 | 31.92 | 52.37 | 0.2047 | 2.80 | 0.57 |
| 20 | 35.48 | 20.74 | 0.3070 | 2.53 | 0.22 |
| 21 | 37.83 | 17.59 | 0.6140 | 2.38 | 0.19 |

II. Thermal Analysis and Variable Temperature XRPD Test

The differential scanning calorimetry pattern (DSC curve) of the potassium salt crystal form B prepared in Embodiment 1 was obtained by using a differential scanning calorimetry analyzer (Discovery series DSC2500, TA company in USA); and the thermogravimetric curve (TG curve) of the potassium salt crystal form B prepared in Embodiment 1 as shown in FIG. 2 was obtained by using a thermogravimetric analyzer (Q series Q500/5000, TA company in USA). The DSC and TGA test parameter settings were shown in Table 3.

TABLE 3

DSC and TGA test parameters

| Parameters | TGA | DSC |
|---|---|---|
| Method | linear temperature rise | linear temperature rise |
| Sample pan | aluminum pan, open | aluminum pan, covered with a lid |
| Temperature range | room temperature-target temperature | 25° C.-target temperature |
| Scanning rate (° C./min) | 10 | 10 |
| Protective gas | nitrogen | nitrogen |

As shown in FIG. 2, the potassium salt crystal form B prepared in Embodiment 1 has a weight loss of 0.9% before 150° C. and has endothermic peaks at the peaks of 191.3° C. (a starting temperature of 188.5° C.) and 217.9° C. (a starting temperature of 208.7° C.). In combination with the small weight loss of the potassium salt crystal form B before melting and decomposition, it is assumed that the potassium salt crystal form B prepared in Embodiment 1 is an anhydrous crystal form.

Figure 4:
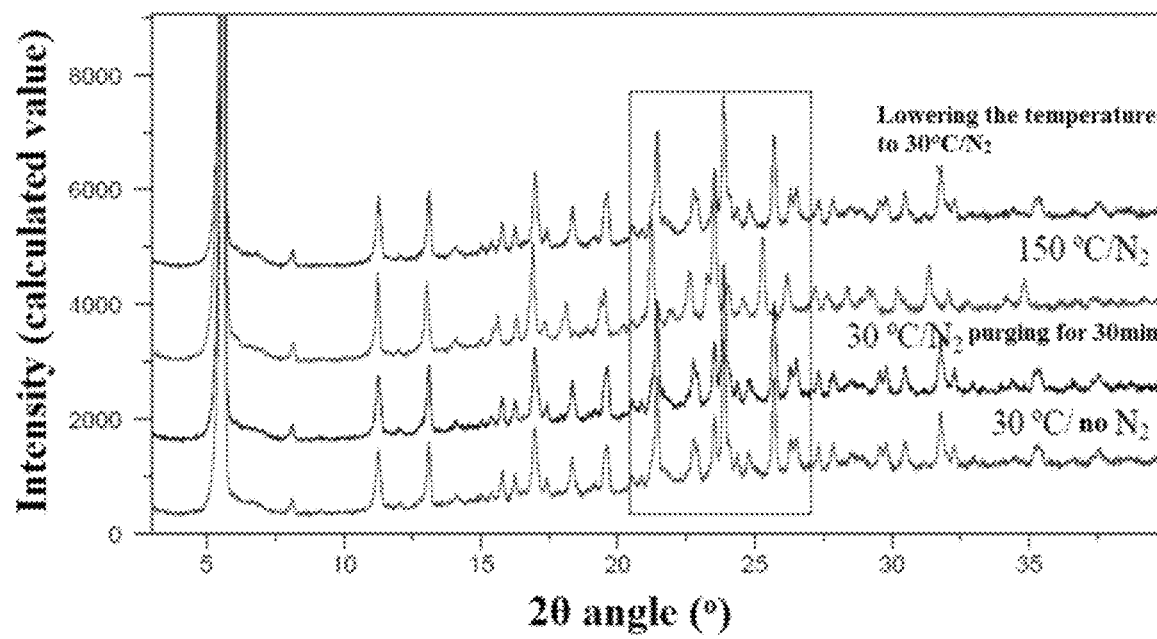
FIG. 4 is a graph of a variable temperature X-ray powder diffraction test of the potassium salt crystal form B prepared in Embodiment 1 according to the present application.

Further, variable temperature X-ray powder diffraction (VT-XRPD) tests were performed, in which test conditions were respectively: at 30° C. without nitrogen protection, nitrogen purging at 30° C. for 30 minutes, heating to 150° C. under nitrogen protection, and lowering the temperature to 30° C. under nitrogen protection. Results of the tests were shown in FIG. 4. After the potassium salt crystal form B prepared in Embodiment 1 was purged with nitrogen at 30° C. for 30 minutes, the crystal form did not change. After heating to 150° C. under nitrogen protection, it was observed that some diffraction peaks shifted. After the temperature was lowered to 30° C., the crystal form was consistent with the potassium salt crystal form B, thereby confirming that the potassium salt crystal form B of the compound WYQ was an anhydrous crystal form.

III. Dynamic Vapor Sorption (DVS) Experiments

Figure 5:
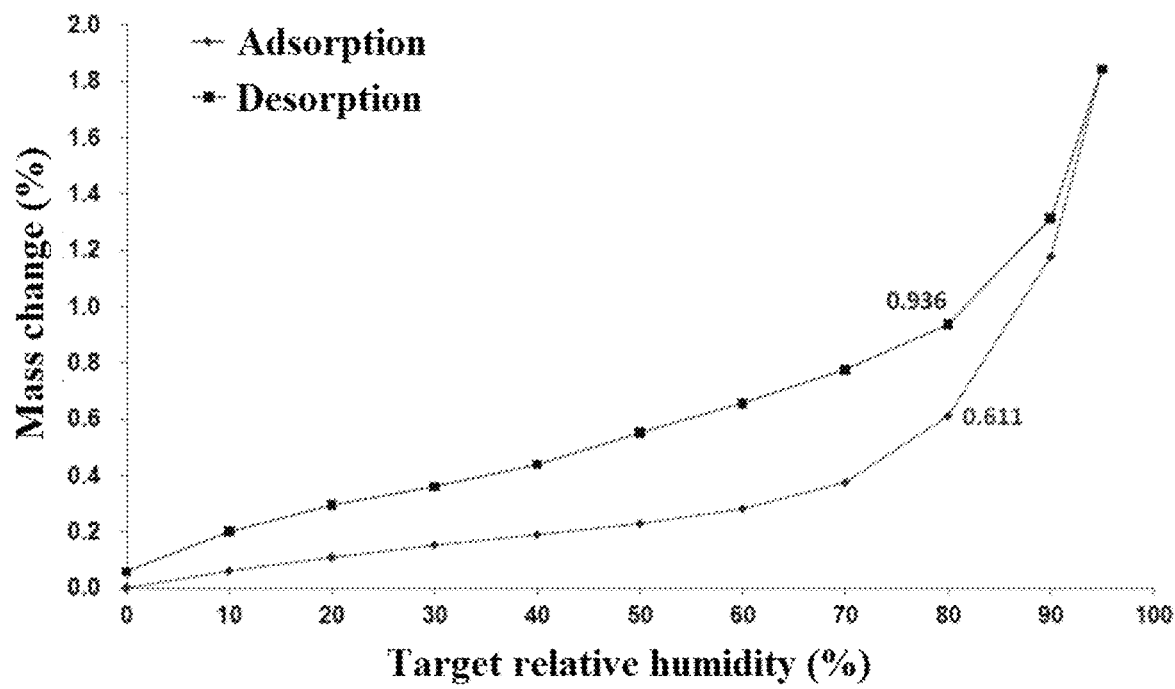
FIG. 5 is a DVS test diagram of the potassium salt crystal form B prepared in Embodiment 1 according to the present application.
Figure 6:
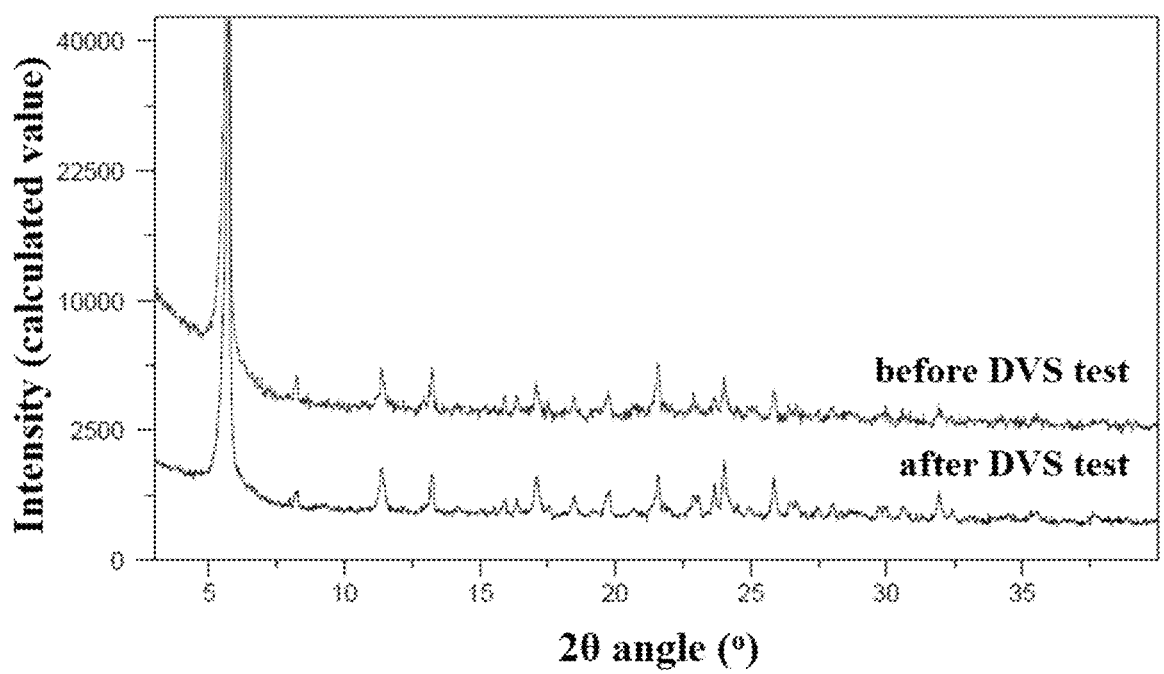
FIG. 6 is a comparison graph of XRPD before and after DVS test of the potassium salt crystal form B prepared in Embodiment 1 according to the present application.
Figure 7:
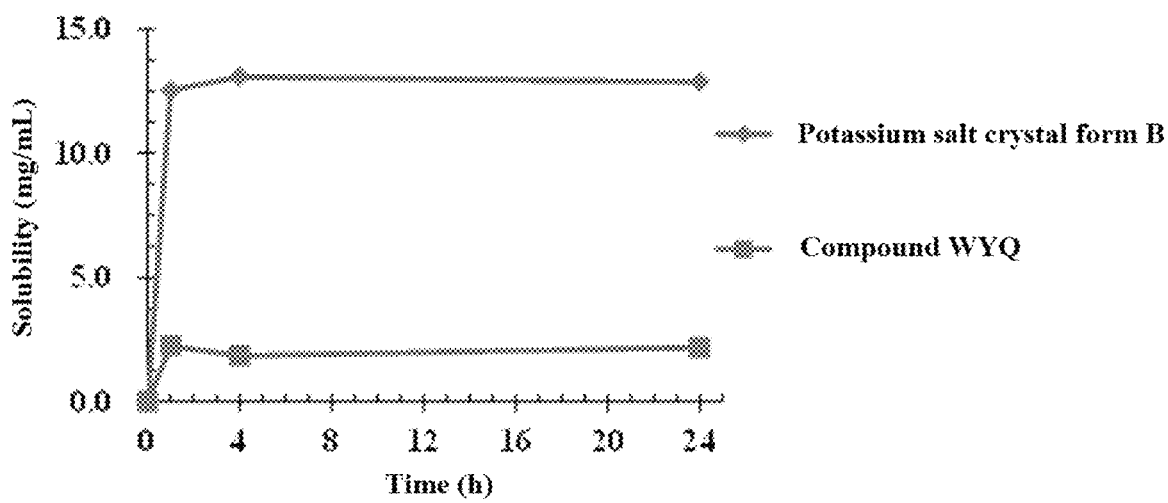
FIG. 7 is a graph of the dynamic solubility of the potassium salt crystal form B prepared in Embodiment 1 in water at 37° C.
Figure 8:
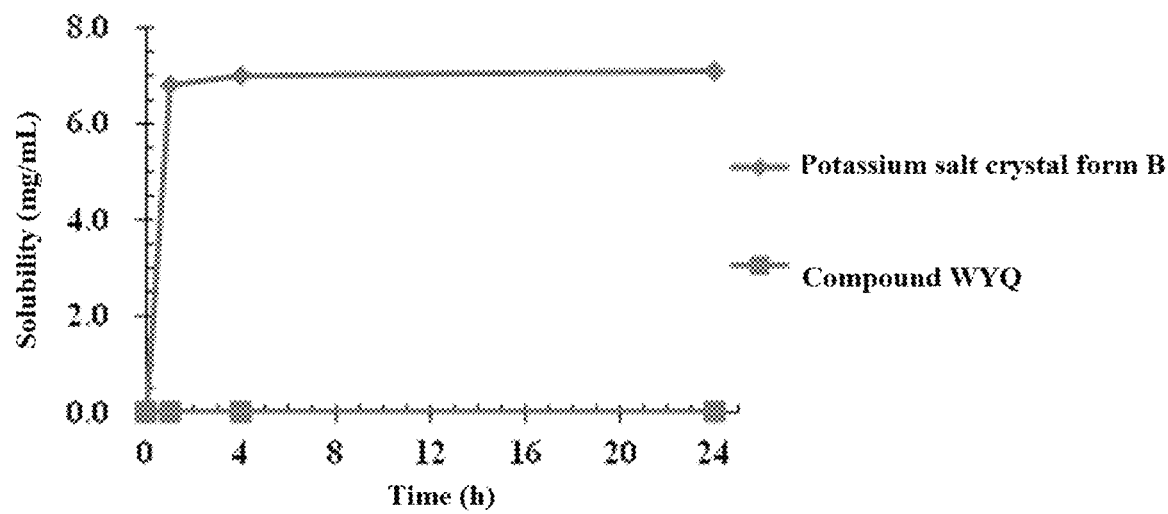
FIG. 8 is a graph of the dynamic solubility of the potassium salt crystal form B prepared in Embodiment 1 in SGF at 37° C.
Figure 9:
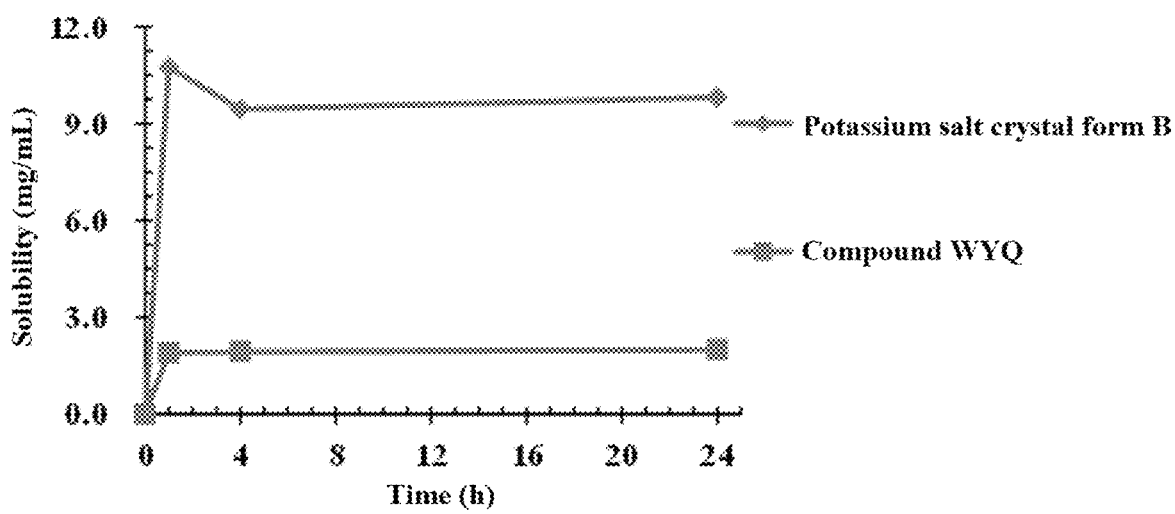
FIG. 9 is a graph of the dynamic solubility of the potassium salt crystal form B prepared in Embodiment 1 in FaSSIF at 37° C.
Figure 10:
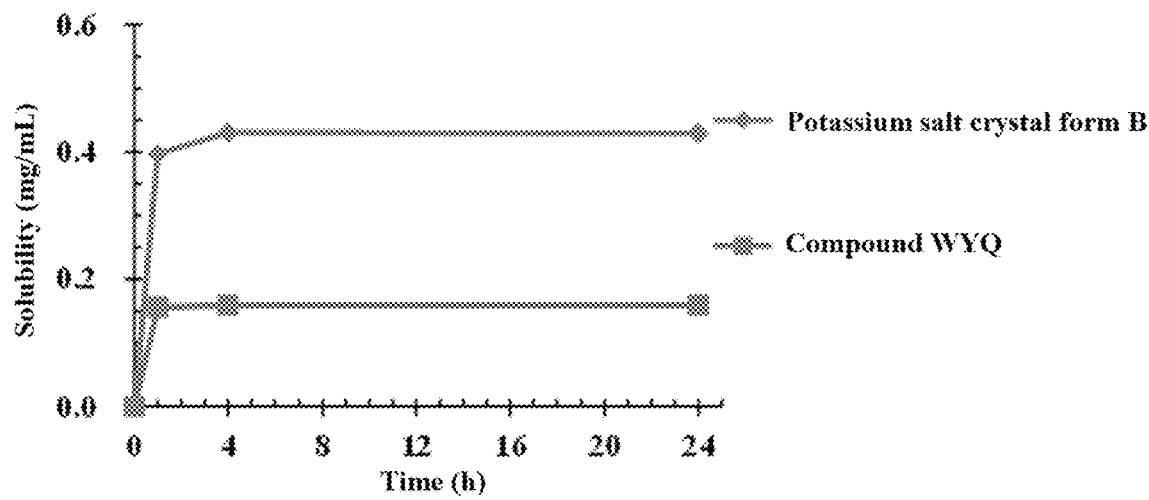
FIG. 10 is a graph of the dynamic solubility of the potassium salt crystal form B prepared in Embodiment 1 in FeSSIF at 37° C.

Dynamic vapor adsorption (DVS) experiments were performed at 25° C. on a DVS Intrinsic instrument from SMS (Surface Measurement Systems) to test hygroscopicity of the potassium salt anhydrous crystal form B prepared in Embodiment 1. The test sample was first dried at 0% relative humidity (RH) to remove the adsorbed solvent or water, and then the test was started with a target RH of 0-95%. As shown in FIG. 5, the change in mass (water adsorption amount) of the potassium salt crystal form B sample at 25° C./80% RH was 0.6%, indicating a slight hygroscopicity. As shown in FIG. 6, it was showed in the comparison graph of XRPD that the crystal form of the test sample did not change before and after the DVS test. DVS test parameter settings were shown in Table 4.

TABLE 4

DVS test parameters

| Parameters | Setting value |
|---|---|
| temperature | 25° C. |
| sample amount | 10-20 mg |
| protective gas and flow rate | $N_2$, 200 ml/min |
| dm/dt | 0.002%/min |
| min. dm/dt equilibrium time | 10 min |
| max. equilibrium time | 180 min |
| RH range | 0% RH-95% RH-0% RH |
| RH gradient | 10% (0% RH-90% RH, 90% RH-0% RH) 5% (90% RH-95% RH, 95% RH-90% RH) |

IV. Dynamic Solubility Test

Figure 11:
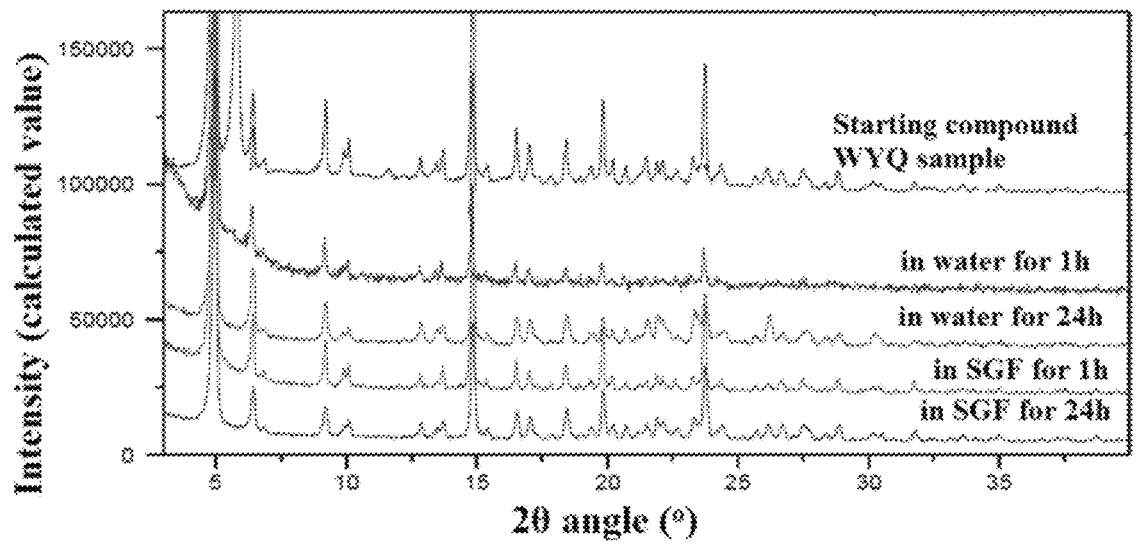
FIG. 11 is a comparation graph of the XRPD results of the solid obtained from a compound WYQ sample in water and in SGF at 37° C.
Figure 12:
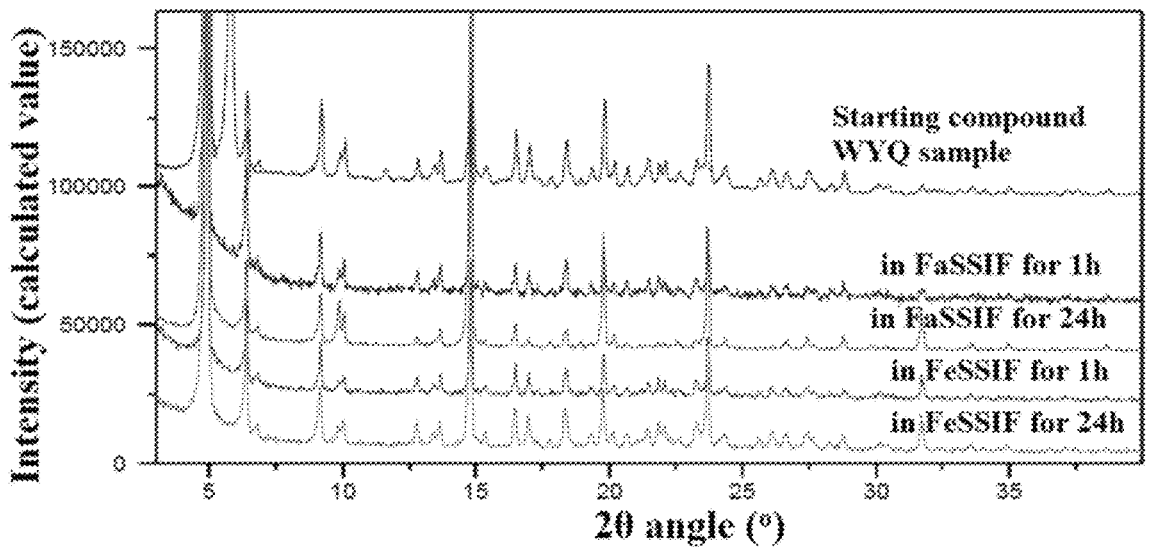
FIG. 12 is a comparation graph of the XRPD results of the solid obtained from a compound WYQ sample in FaSSIF and FeSSIF at 37° C.
Figure 13:
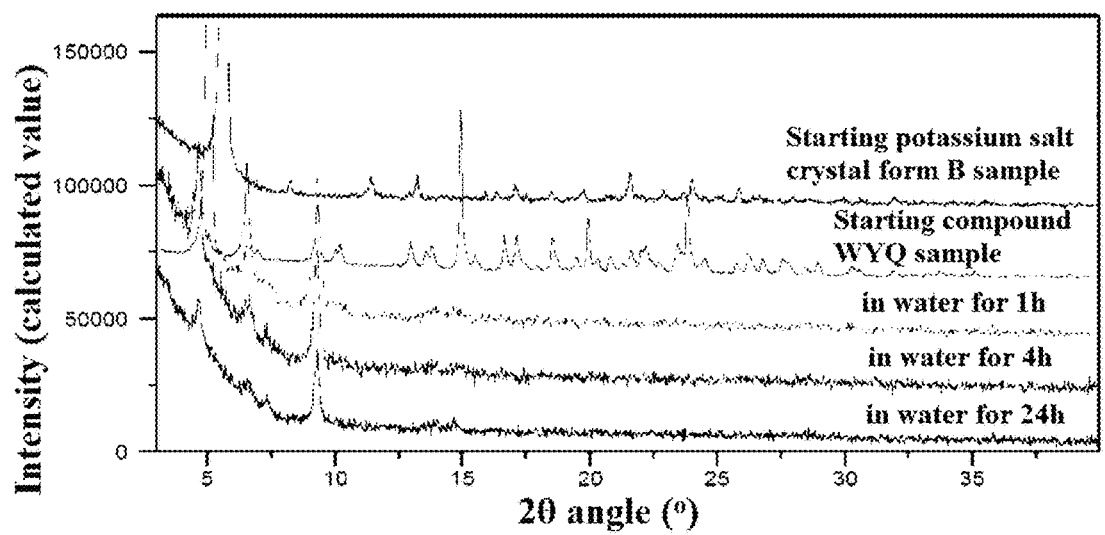
FIG. 13 is a comparation graph of the XRPD results of the solid obtained from the potassium salt crystal form B prepared in Embodiment 1 in water at 37° C.
Figure 14:
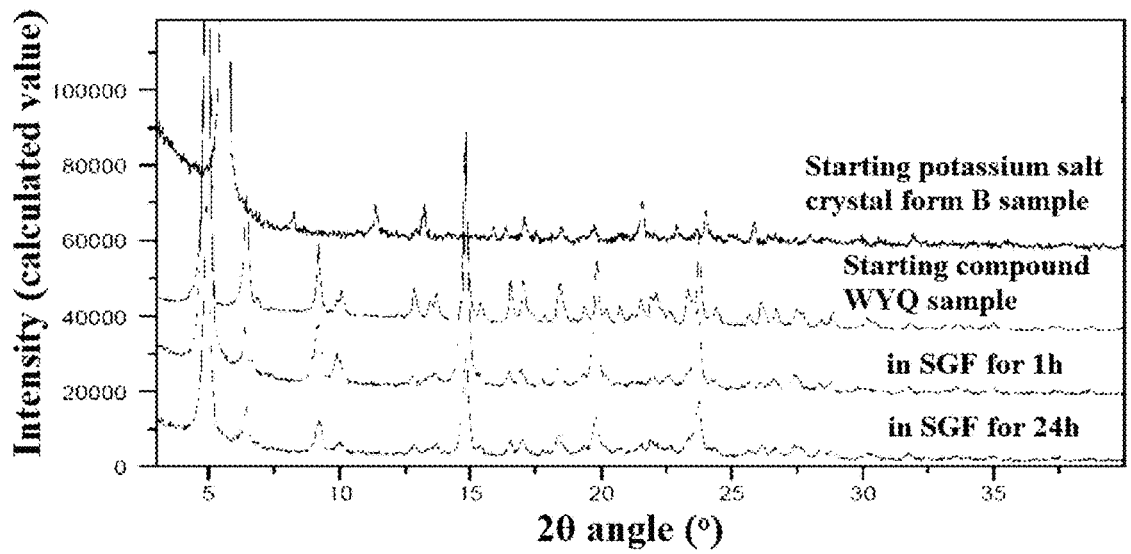
FIG. 14 is a comparation graph of the XRPD results of the solid obtained from the potassium salt crystal form B prepared in Embodiment 1 in SGF at 37° C.
Figure 15:
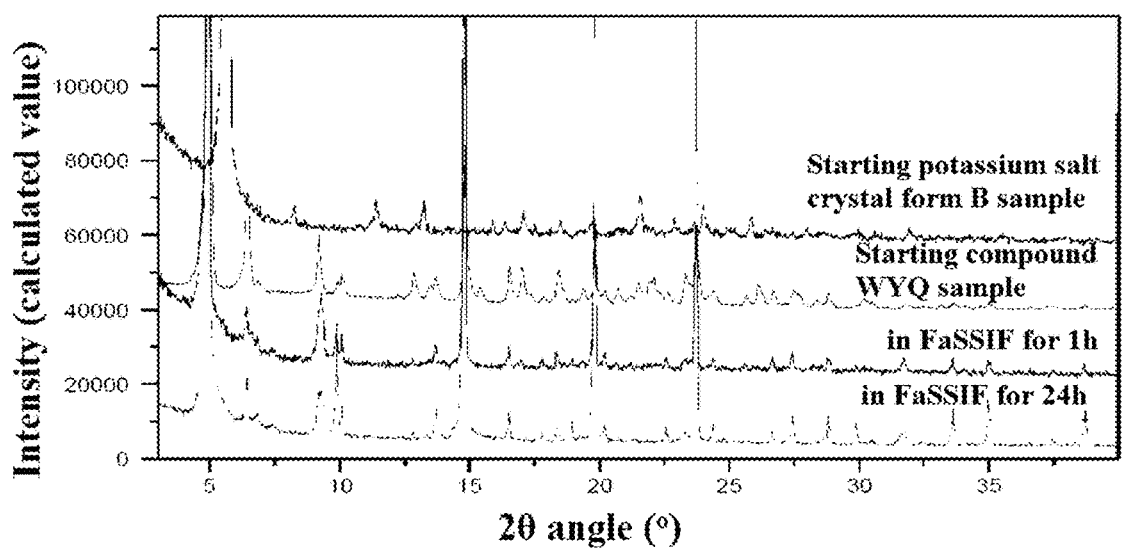
FIG. 15 is a comparation graph of the XRPD results of the solid obtained from THE potassium salt crystal form B prepared in Embodiment 1 in FaSSIF at 37° C.
Figure 16:
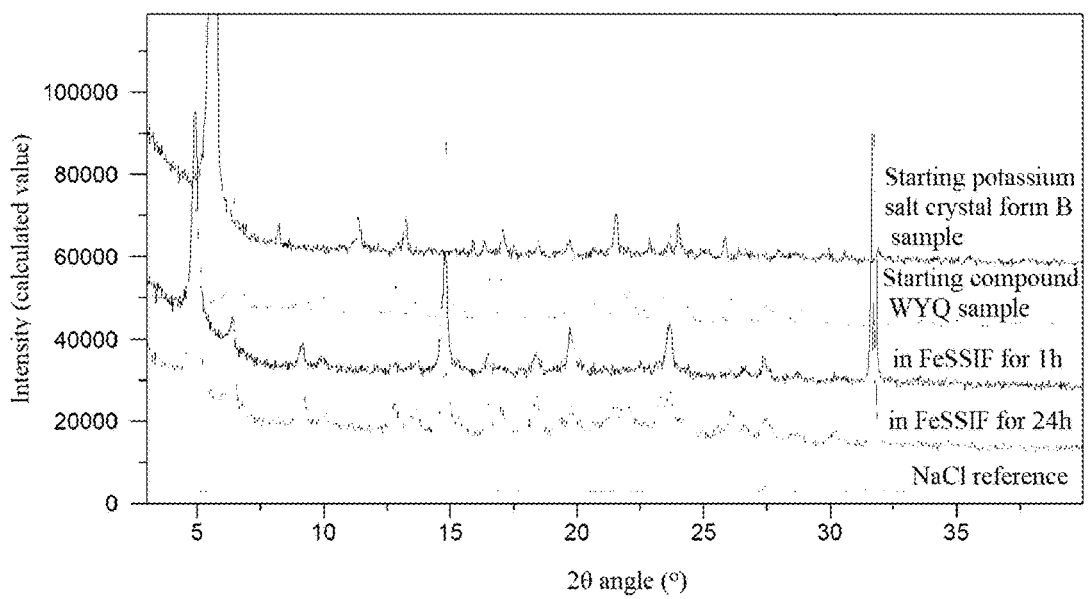
FIG. 16 is a comparation graph of the XRPD results of the solid obtained from the potassium salt crystal form B prepared in Embodiment 1 in FeSSIF at 37° C.

The dynamic solubility of the potassium salt crystal form B sample prepared in Embodiment 1 was tested in four solvents: water, simulated gastric fluid (SGF), fasted-state simulated intestinal fluid (FaSSIF), and fed-state simulated intestinal fluid (FeSSIF) at 37° C./60% RH, and the dynamic solubility data of the compound WYQ sample were collected under the same conditions. In the dynamic solubility test experiment, about 16 mg of the potassium salt crystal form B sample/compound WYQ sample were weighed and mixed with 3.2 mL of a solvent in a 4 mL centrifuge tube, and the centrifuge tube was sealed and fixed on a rotating disk at 25 r/min, and samples were rotated and mixed at 37° C. for 1 h, 4 h and 24 h, and sampled. The solubility (S, mg/mL), pH and crystal form change after XRPD assay (FC, where "yes" means that the crystal form has partially or completely changed to the compound WYQ) were measured at each sampling point. Test results were shown in Table 5. The solubility curves of the potassium salt crystal form B samples in water, SGF, FaSSIF and FeSSIF were shown in FIGS. 7-10, and the comparison of XRPD results (see XRPD parameter settings in Table 1) of the compound WYQ samples in different solvents at 1 h and 24 h sampling points were shown in FIGS. 11-12. The comparison of the XRPD results of the potassium salt crystal form B samples in different solvents at 1 h and 24 h sampling points were shown in FIGS. 13-16.

V. Solid-State Stability Test

The solid-state stability of the potassium salt crystal form B prepared in Embodiment 1 was tested, in which 5.22 mg of potassium salt crystal form B samples were weighed and left open at 25° C./60% RH, and 5.19 mg of potassium salt crystal form B samples were weighed and left open at 40° C./75% RH. After one week, all samples were subjected to XRPD characterization (see XRPD parameter settings in Table 1) and HPLC purity test (Agilent 1100) to detect changes in crystal form and purity, wherein HPLC purity test parameters were shown in Table 6. Meanwhile, 4.59 mg of a compound WYQ sample was weighed and left open at 25° C./60% RH, and 5.11 mg of the compound WYQ sample was weighed and left open at 40° C./75% RH. The solid-state stability of these samples were performed under the same conditions for comparative reference.

TABLE 6

HPLC purity test parameters

| Parameters | Setting value | |
|---|---|---|
| chromatographic column | Waters Xbridge C18 (4.6 × 150 mm, 5 μm) | |
| mobile phase | A: 0.037% trifluoroacetic acid in water | |
| | B: 0.018% trifluoroacetic acid in acetonitrile | |
| gradient | Time (min) | % B |
| | 0.0 | 10 |
| | 24.0 | 90 |
| | 27.0 | 90 |
| | 27.1 | 10 |
| | 30.0 | 10 |
| time | 30.0 min | |
| post run time | 0.0 min | |
| flow rate | 1.0 ml/min | |
| injection volume | 5 μl | |
| detection wavelength | 220 nm | |
| column temperature | 40° C. | |
| sample chamber temperature | room temperature | |
| diluent | Acetonitrile:water = 9:1 (v/v) | |

Figure 17:
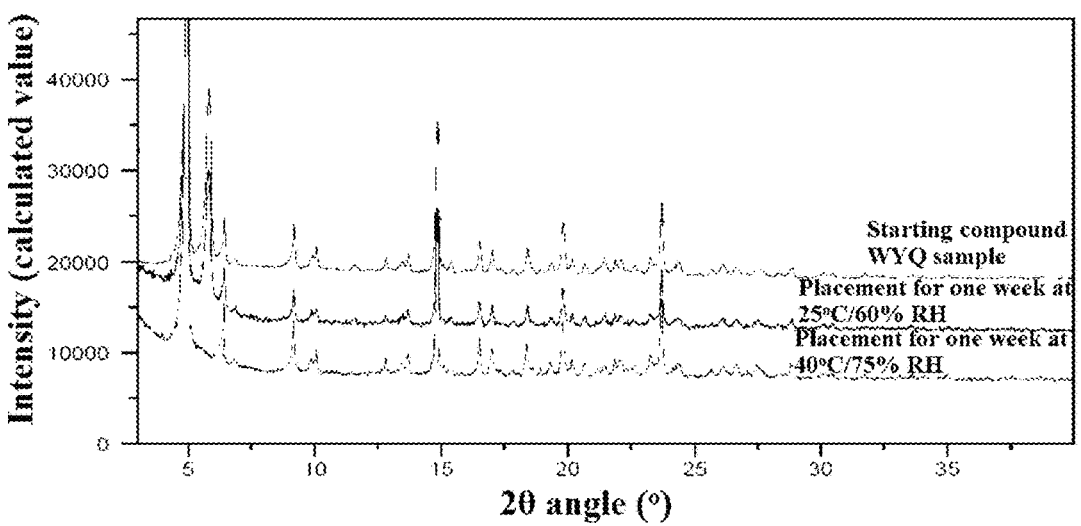
FIG. 17 is a comparison graph of the XRPD results for a compound WYQ sample after placement in solid-state stability test conditions.
Figure 18:
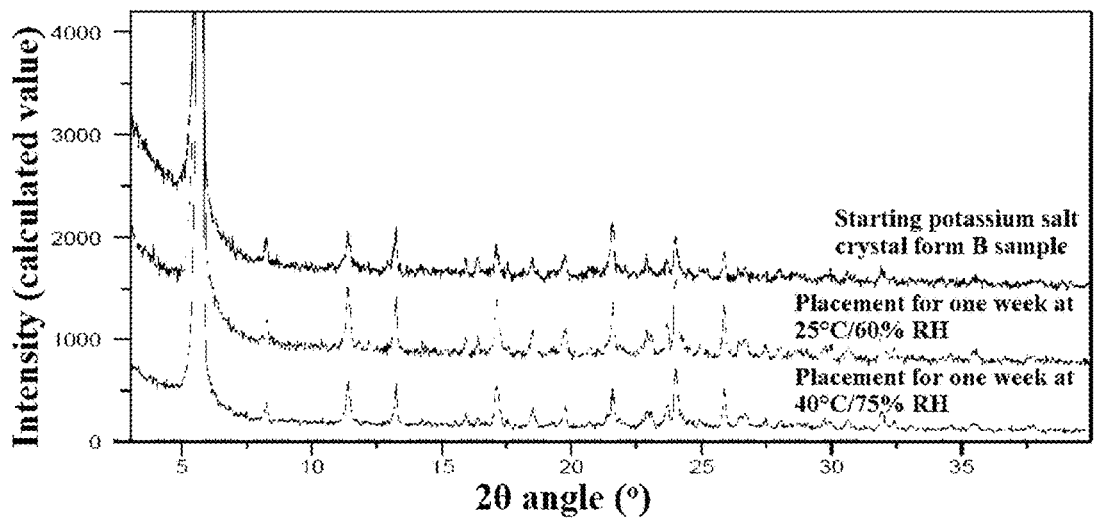
FIG. 18 is a comparation graph of the XRPD results of the potassium salt crystal form B prepared in Embodiment 1 after placement in solid-state stability test conditions.

The test results were summarized in Table 7, and the XRPD test results were shown in FIGS. 17 and 18. The results showed that the HPLC purity of the potassium salt

TABLE 5

Solubility, pH and change of crystal form after XRPD assay at each sampling point

| Test sample | Solvent | 1 h | | | 4 h | | | 24 h | | |
|---|---|---|---|---|---|---|---|---|---|---|
| | | S | pH | FC | S | pH | FC | S | pH | FC |
| compound WYQ | water | 2.2 | 7.7 | yes | 1.8 | 7.9 | yes | 2.2 | 7.6 | yes |
| potassium salt crystal form B | | 12.5 | 7.6 | weak crystallinity | 13.1 | 7.4 | weak crystallinity | 12.9 | 7.4 | weak crystallinity |
| compound WYQ | SGF | 0.0056 | 2.4 | yes | 0.006 | 2.5 | yes | 0.0069 | 2.4 | yes |
| potassium salt crystal form B | | 6.8 | 7.5 | yes | 7.0 | 7.3 | yes | 7.7 | 7.7 | yes |
| compound WYQ | FaSSIF | 1.9 | 6.5 | yes | 1.9 | 6.5 | yes | 2.0 | 6.6 | yes |
| potassium salt crystal form B | | 10.7 | 6.8 | yes | 9.5 | 6.8 | yes | 9.8 | 6.8 | yes |
| compound WYQ | FeSSIF | 0.16 | 5.0 | yes | 0.16 | 5.0 | yes | 0.16 | 5.0 | yes |
| potassium salt crystal form B | | 0.40 | 5.5 | yes | 0.43 | 5.5 | yes | 0.43 | 5.5 | yes |

It was shown in all the above results that the potassium salt crystal form B prepared in Embodiment 1 had a higher solubility than that of the compound WYQ sample in water, SGF, FaSSIF and FeSSIF at 37° C., and the solubility in water was the highest and up to 12.9 mg/mL.

crystal form B of the compound WYQ prepared in Embodiment 1 was 98.71 area %. After one week of placement, the potassium salt crystal form B sample had no change in the crystal form, and no significant change in purity was observed, showing that the samples had good physicochemical stability under both test conditions. No significant decrease in purity of the compound WYQ sample was detected after one week of placement at 25° C./60% RH, while a decrease in HPLC purity (area %) of about 1% was detected after one week of placement at 40° C./75% RH.

TABLE 7

Results of solid-state stability tests of the potassium salt crystal form B prepared in Embodiment 1

| Test sample | condition (placement for one week) | HPLC purity | | | Crystal form change |
| --- | --- | --- | --- | --- | --- |
| | | Starting purity (area %) | Purity after placement (area %) | Purity after placement/ Starting purity (%) | |
| potassium salt crystal form B | 25° C./60% RH | 98.71 | 98.62 | 99.9 | unchanged |
| | 40° C./75% RH | | 98.51 | 99.8 | unchanged |
| compound WYQ | 25° C./60% RH | 97.37 | 97.17 | 99.8 | unchanged |
| | 40° C./75% RH | | 96.30 | 98.9 | changed |

In summary, the potassium salt crystal form B sample of the compound WYQ prepared in Embodiment 1 of the present disclosure has better hygroscopicity, solubility and physicochemical stability compared with the compound WYQ sample. The pharmaceutical use of the potassium salt crystal forms B prepared by the embodiments of the present disclosure will be described in detail below in combination with specific experiments.

Experimental Example Drug Activity Assay of the Potassium Salt Crystal Form B Prepared in Embodiment 1

I. Pharmacokinetic Experiments of the Potassium Salt Crystal Form B Prepared in Embodiment 1

1. Experimental Materials 1.1 Reagents

The potassium salt crystal form B of the compound WYQ was prepared in Embodiment 1; sodium carboxymethyl cellulose, normal saline and pentobarbital sodium were purchased from China National Pharmaceutical Group Co., Ltd.; acetonitrile, formic acid and methanol were purchased from J&K Chemical Reagent Co., Ltd (China).

1.2 Instruments

Agilent Series 1200 liquid chromatography and Agilent 6410 mass spectrometer from USA.

1.3 Experimental Animals

Male SPF-grade SD rats with a weight of 180-200 g were purchased from Beijing Vital River Laboratory Animal Co., Ltd., with experimental animal license No.: SCXK (Beijing)-2002-0011. All of rats were housed in the laboratory animal house of Nanjing Medical University at a temperature of $(22\pm2)°$ C. and a humidity of $(60\pm5)°$ C. for 12 h in an alternating light and dark environment.

2. Experimental Methods

Figure 19:
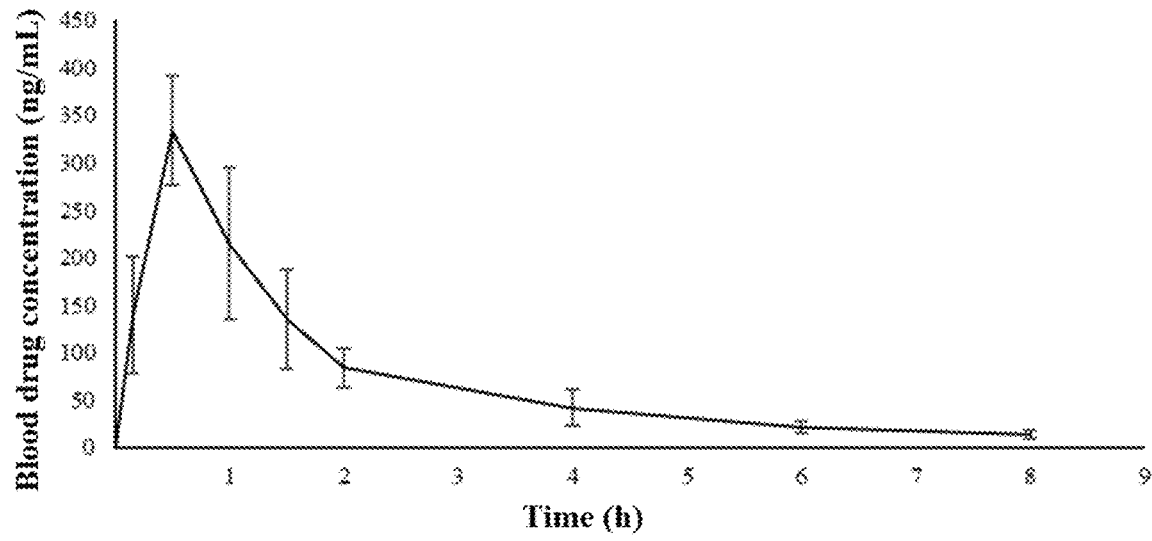
FIG. 19 is a mean blood drug concentration-time curve of 2.0 mg·kg$^{-1}$ of the potassium salt crystal form B prepared in Embodiment 1 in rats.

After 6 healthy male SD rats were fasted and drank water freely for 12 h, the rats was administered by gavage with the potassium salt crystal form B prepared in Embodiment 1 at 2 mg·kg$^{-1}$, and blood was taken from the *Bulbus oculi* venous plexus at 0.2 h, 0.5 h, 1 h, 1.5 h, 2 h, 4 h, 6 h and 8 h after administration. A solution of acetonitrile:water (1:1) was added, and centrifuging was conducted to take the supernatant for chromatographic analysis, at conditions: a chromatographic column: Thermo Fisher Hypersil gold column (3 μm, 20 mm×2.1 mm), an injection volume of 10 μL, a flow rate of 0.3 mL/min, a column temperature of 40° C., a mobile phase of water (1% formic acid) and methanol, gradient elution: methanol 10% (0 min); 10% (1 min); 90% (4 min); 90% (8 min); 10% (9 min), and with mass spectrometry conditions: multiple reaction monitoring (MRM), electrospray ionization (ESI), retention time (Dwell Time) of 200 ms, detection ion m/z 448.0-347.8. The data of blood drug concentration was analyzed with Winnolin6.3 software to obtain the pharmacokinetic parameters, thereby forming the mean blood drug concentration-time curve, as shown in FIG. 19.

3. Experimental Results

The oral half-life (t112) of the potassium salt crystal form B of the compound WYQ in male SD rats was $(2.30\pm0.27)$ h. The peak drug concentration was reached after $(0.63\pm0.12)$ h of administration, and the maximum drug concentration ($C_{max}$) was $(333.8\pm23.7)$ ng·mL$^{-1}$. The area under the mean blood drug concentration-time curve AUC$_{(0-4)}$ within 8 h after administration was $(638.8\pm72.4)$ h·ng·mL$^{-1}$, and the total area under the mean blood drug concentration-time curve AUC$_{0-\infty}$ was $(650.2\pm70.8)$ h·ng·mL$^{-1}$.

II. Experiments on Rats with Pulmonary Arterial Hypertension (PAH)

1. Experimental Materials 1.1 Reagents

The potassium salt crystal form B of the compound WYQ was prepared in Embodiment 1; Sildenafil and Tadalafil were synthesized by WuXi AppTec New Drug Development Co., Ltd. (batch No.: EW10443-180-P1, EW10443-228-P1); monocrotaline (MCT) and sodium carboxymethylcellulose were from Sigma Reagent Company in USA; heparin, urethane solution, xylene and paraffin were purchased from China National Pharmaceutical Group Co., Ltd.; hematoxylin-eosin and neutral gum were purchased from Biyuntian Biotechnology Co., Ltd. in China.

1.2 Instruments

Nikon optical microscope camera system (Japan); embedding machine: HistoCore Arcadia, Leica; microtome: RM2235, Leica; automatic staining machine: LEICA Autostainer ST5020; slide scanner: Hamamatsu NanoZoomer Digital Pathology (S210); analytical balance: METTLERToledo, ALT104; weight scale: Changshu Shuangjie Testing Instrument Factory, T1000; operating microscope: LuckbirdXTS-4A; RM6240E physiological recorder (Chengdu Instrument Factory).

1.3 Experimental Animals

SPF-grade male SD rats were provided by Jinan Pengyue Experimental Animal Breeding Co., Ltd. in Shandong, with license No.: SCXK (Shandong) 20140007, batch No. 37009200014851, and a weight of 150±5 g.

The animal room of Guangzhou Institute of Respiratory Diseases, with license No. SYXK (Guangdong) 2013-0093 of the experimental institution, an animal room temperature of 20-25° C., a humidity of 55%-65%, and alternating light and dark for 12 h, freely feeding and drinking water.

2. Experimental Methods 2.1 Experimental Grouping

SD rats were randomly divided into 8 groups, 15 rats/group: a normal control group (Vehicle); a PAH model group (MCT); a PAH+potassium salt crystal form B of WYQ mini-dose group (hereafter referring to as a mini-dose group); a PAH+potassium salt crystal form B of WYQ low-dose group (hereafter referring to as a low-dose group); a PAH+potassium salt crystal form B of WYQ medium-dose group (hereafter referring to as a medium-dose group); a PAH+potassium salt crystal form B of WYQ high-dose group (hereafter referring to as a high-dose group); a PAH+Sildenafil control group (hereafter referring to as a Sildenafil group); a PAH+Tadalafil control group (hereafter referring to as a Tadalafil group).

2.2 Animal Modeling

MCT was fully dissolved with 1M dilute HCl, diluted with double-distilled water, and adjusted to pH=7.2 with 3M NaOH, thereby preparing a MCT solution with a final concentration of 20 mg/ml.

The normal control group was injected subperitoneally with normal saline (50 mg/kg), and the rest of the groups were injected subperitoneally with MCT (50 mg/kg) at one time.

2.3 Dosage and Method of Administration

Normal control group: no administration of drug;

PAH model group: no administration of drug;

Mini-dose group: the potassium salt crystal form B of WYQ was prepared into a 0.4 mg/ml medicinal solution (ready to use) with normal saline, and administered by gavage at the dose of 2 mg·kg$^{-1}$·d$^{-1}$;

Low-dose group: the potassium salt crystal form B of WYQ was prepared into a 1 mg/ml medicinal solution (ready to use) with normal saline, and administered by gavage at the dose of 5 mg·kg$^{-1}$·d$^{-1}$;

Medium-dose group: the potassium salt crystal form B of WYQ was prepared into a 2 mg/ml medicinal solution (ready to use) with normal saline, and administered by gavage at the dose of 10 mg·kg$^{-1}$·d$^{-1}$;

High-dose group: the potassium salt crystal form B of WYQ was prepared into a 4 mg/ml medicinal solution (ready to use) with normal saline, and administered by gavage at the dose of 20 mg·kg$^{-1}$·d$^{-1}$;

Sildenafil group: Sildenafil was prepared into a 5 mg/ml medicinal solution (ready to use) with 0.5% sodium carboxymethyl cellulose, and administered by gavage at the dose of 25 mg·kg$^{-1}$·d$^{-1}$;

Tadalafil group: Tadalafil was prepared into a 2 mg/ml medicinal solution (ready to use) with 0.5% sodium carboxymethyl cellulose, and administered by gavage at the dose of 10 mg·kg$^{-1}$·d$^{-1}$.

The day of injection was the starting date of the experiment, and the administration was started after 7 days of modeling, once a day for 14 consecutive days.

According to the interspecies dose conversion method currently used by the FDA in USA, the conversion factor for rats and humans is 0.162. Therefore, based on the gavage administration dose for rats in the Embodiments, it is concluded that the oral doses of the potassium salt crystal form B of WYQ for human is 0.324, 0.81, 1.62 and 3.24 mg·kg$^{-1}$·d$^{-1}$ for the mini-dose, low-dose, medium-dose, and high-dose, respectively, administered once a day for 14 consecutive days.

According to the dose conversion between different routes of administration in the "Pharmacological Experimental Methodology", the ratio of intramuscular and intraperitoneal injection dose to oral dose is about 0.3-0.4, thereby inferring that the mini-doses, low-doses, medium-doses and high-doses of the potassium salt crystal form B of WYQ for injection in human is 0.097-0.129, 0.243-0.324, 0.486-0.648 and 0.972-1.296 mg·kg$^{-1}$·d$^{-1}$, respectively, administered once a day for 14 consecutive days (drug concentration: 1 mg/ml).

2.4 Assay Index and Test Method 2.4.1 Right Ventricular Systolic Pressure (RVSP) in PAH Rats After 3 weeks from the starting date of the experiment, RVSP data were collected on RM-6240E polygraph for each group of rats.

2.4.2 Right Ventricular Hypertrophy Index (RVMI) in PAH Rats

After 3 weeks from the starting date of the experiment, the animals were anesthetized, hemodynamically tested (RM-6240E polygraph), and sacrificed after manometry. The cardiopulmonary tissues were immediately dissected, and the right and left atria and great vessels were cut off along the atrioventricular junction with ophthalmic scissors to separate the right ventricle (RV) and left ventricular wall plus septum (LV+S), which was absorbed water with filter paper and weighed respectively, and RV/(LV+S), i.e., RVMI was calculated.

2.4.3 Pathological Observation and Quantitative Analysis of Pulmonary Arterioles in PAH Rats After 3 weeks from the starting date of the experiment, rats were heparinized with heparin (50 IU/100 g, intraperitoneal injection) for 5 min. The animals were anesthetized by injection of 20% urethane solution (0.5 ml/100 g), and the blood pressure indexes were detected and recorded.

The heart was dissected, the right ventricular wall was separated, and the left ventricle and the septum were separated, which were absorbed water with filter paper and weighed respectively to calculate the right ventricular hypertrophy index.

The lungs were dissected, wherein the right lung was ligated, and the left lung lobe was perfused with a fixative (4% paraformaldehyde) and then fixed in the fixative, dehydrated by ethanol gradient, allowed to become transparent by using xylene, immersed in wax, embedded in paraffin, sectioned (4 μm), stained with hematoxylin-eosin (HE), sealed with neutral gum and then observed under a microscope. The thickness of the tunica media of arterioles and the change thereof in six fields of view were randomly observed in different sections and compared with the control group to determine the histological changes in the lungs of each group of animals.

The thickness and outer diameter of the tunica media of pulmonary arterioles (50-1500 μM in diameter) were measured by using an image acquisition analysis system, to calculate the tunica media thickness of pulmonary arterioles and thickness percentage (WT %), WT %=(2× tunica media thickness)/outer diameter×100%.

2.4.4 Penile Erectile Function Observation in PAH Rats

After gavage treatment, penile erection in the animals was observed, wherein the time of penile erection phenomenon after gavage was recorded in each group.

Figure 20:
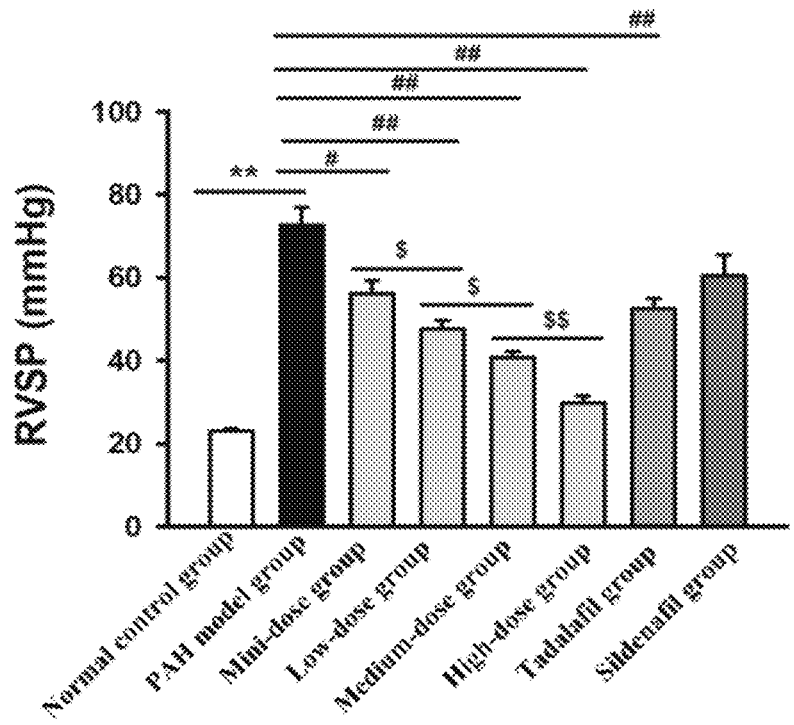
FIG. 20 is a graph showing effects of different doses of a potassium salt crystal form B of WYQ, sildenafil and tadalafil on the RVSP of rats after 21 days of treatment of PAH rats.

3. Experimental Results 3.1 Right Ventricular Systolic Pressure (RVSP) in PAH Rats FIG. 20 is a graph showing the effects of different doses of a potassium salt crystal form B of WYQ, sildenafil and tadalafil on the RVSP of rats after 21 days of treatment of PAH rats. The results showed that the RVSP of rats in the PAH model group (72.5±4.5 mmHg) was significantly higher compared with the normal control group (22.9±0.5 mmHg) (**P<0.01); the RVSP in the mini-dose, low-dose, medium-dose and high-dose groups were significantly decreased and improved (mini-dose group: 56.2±0.5 mmHg, #P<0.05; low-dose group: 47.6±1.9 mmHg, ##P<0.01; medium-dose group: 40.7±1.5 mmHg, ##P<0.01; high-dose group: 29.8±1.6 mmHg, ##P<0.01). The inhibitory effect on RVSP was dose-dependent, and the RVSP in the high-dose group was close to the normal level. The RVSP in the tadalafil group also decreased significantly compared with the PAH model group (52.5±2.4 mmHg, ##P<0.01), and the magnitude of decrease was equivalent to that in the low-dose group. The RVSP in the sildenafil group also decreased compared with the PAH model group, but the magnitude of decrease was not as great as that in the each dose group of the potassium salt crystal form B of WYQ and the tadalafil group, and was not statistically significant compared with the PAH model group (60.4±5.0 mmHg, P=0.089). The RVSP was significantly decreased in the low-dose group compared with the mini-dose group ($P<0.05). The RVSP was significantly decreased in the medium-dose group compared with the low-dose group ($P<0.05), and the RVSP was significantly decreased in the high-dose group compared with the medium-dose group ($$P<0.01).

3.2 Right Ventricular Hypertrophy Index (RVMI) in PAH Rats

Figure 21:
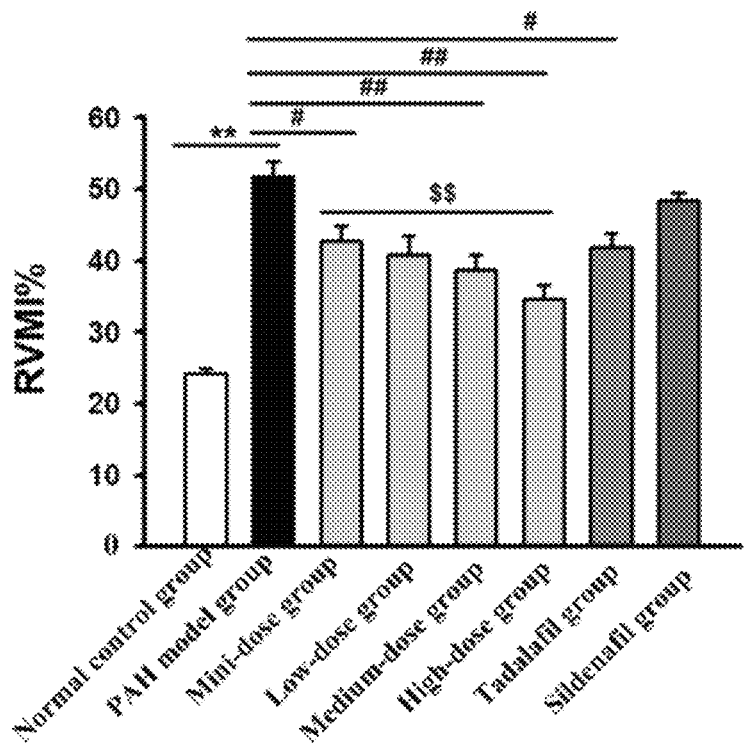
FIG. 21 is a graph showing the effect of different doses of a potassium salt crystal form B of WYQ, sildenafil and tadalafil on RVMI of rats after 21 days of treatment of PAH rats.

FIG. 21 is a graph showing the effect of different doses of a potassium salt crystal form B of WYQ, sildenafil and tadalafil on the RVMI of rats after 21 days of treatment of PAH rats. The results showed that the RVMI of the rats in the PAH model group (51.7±2.3%) was significantly higher (**P<0.01) compared with the normal control group (24.2±0.7%); the RVSP in the mini-dose, low-dose, medium-dose and high-dose groups administered with the potassium salt crystal form B of WYQ were significantly decreased and improved (mini-dose group: 42.8±2.1%, #P<0.05; low-dose group: 40.6±2.7%, ##P<0.01; medium-dose group: 38.7±2.1%, ##P<0.01; high-dose group: 34.6±19%, ##P<0.01). Unlike the inhibitory effect on RVSP, the inhibitory effect of the potassium salt crystal form B of WYQ on RVMI was not dose-dependent. The RVMI in the tadalafil group also decreased significantly compared with the PAH model group (41.8±1.9%, ##P<0.01), and the magnitude of decrease was equivalent to that in the low-dose group of the potassium salt crystal form B of WYQ. The RVMI in the sildenafil group also decreased compared with the PAH model group, but the magnitude of decrease was not as great as that in the each dose group of the potassium salt crystal form B of WYQ and the tadalafil group, and was not statistically significant compared with the PAH model group (48.4±1.0%, P=0.468). RVMI decreased significantly in the high-dose group compared with the mini-dose group ($$P<0.01).

Figure 22:
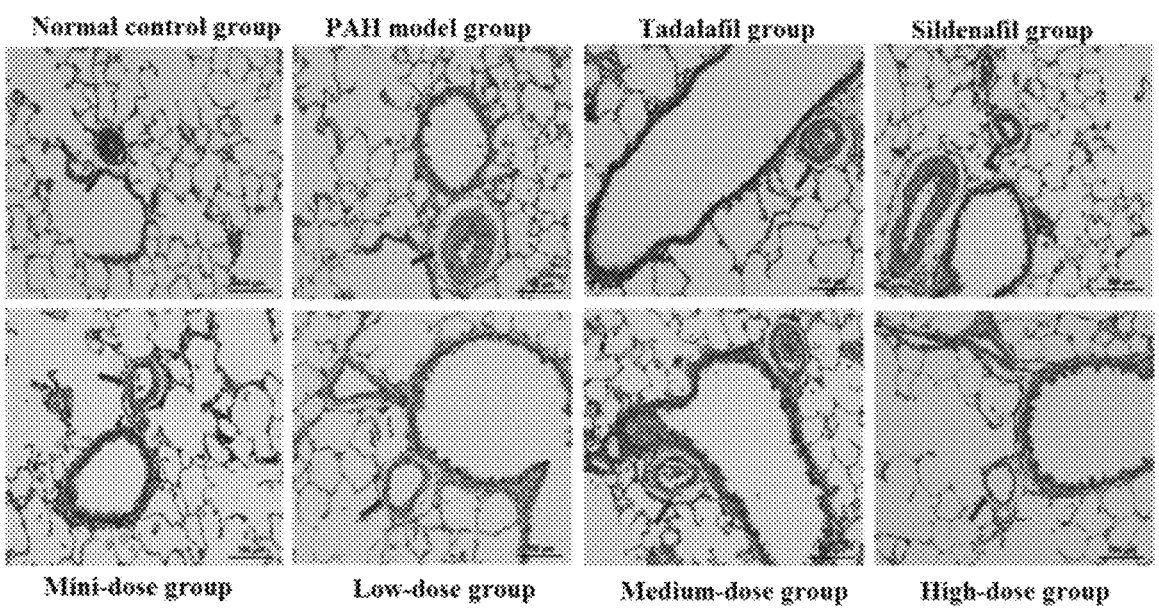
FIG. 22 shows a standard H&E staining graph of pulmonary arterioles in different groups of rats at 200 times magnification after 21 days of treatment of PAH rats with different doses of a potassium salt crystal form B of WYQ, sildenafil and tadalafil.
Figure 23:
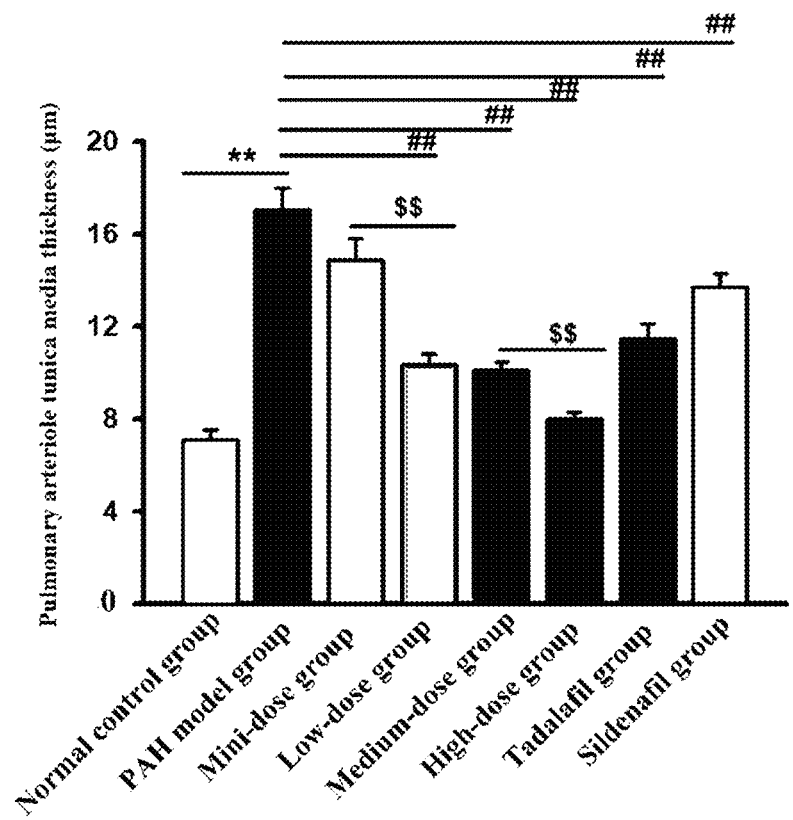
FIG. 23 shows a statistical graph of the tunica media thickness in the pulmonary arterioles of rats in different groups after 21 days of treatment of PAH rats with different doses of a potassium salt crystal form B of WYQ, sildenafil and tadalafil.
Figure 24:
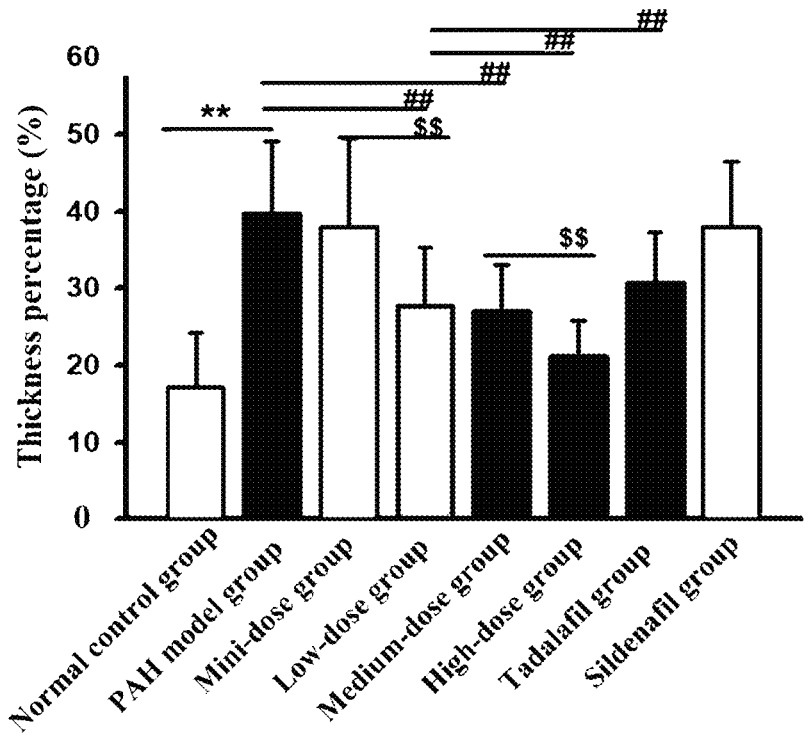
FIG. 24 shows a statistical graph of the percentage of tunica media thickness (WT %) in pulmonary arterioles of rats in different groups after 21 days of treatment of PAH rats with different doses of a potassium salt crystal form B of WYQ, sildenafil and tadalafil.
Figure 25:
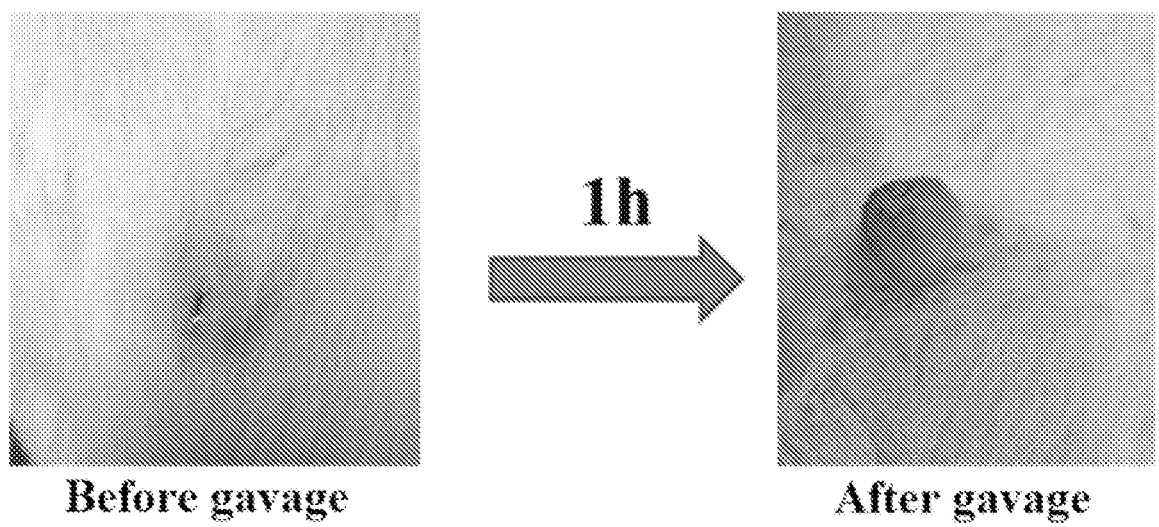
FIG. 25 shows the effect of mini-dose treatment with a potassium salt crystal form B of WYQ on the erectile function of the penises in rats.
Figure 26:
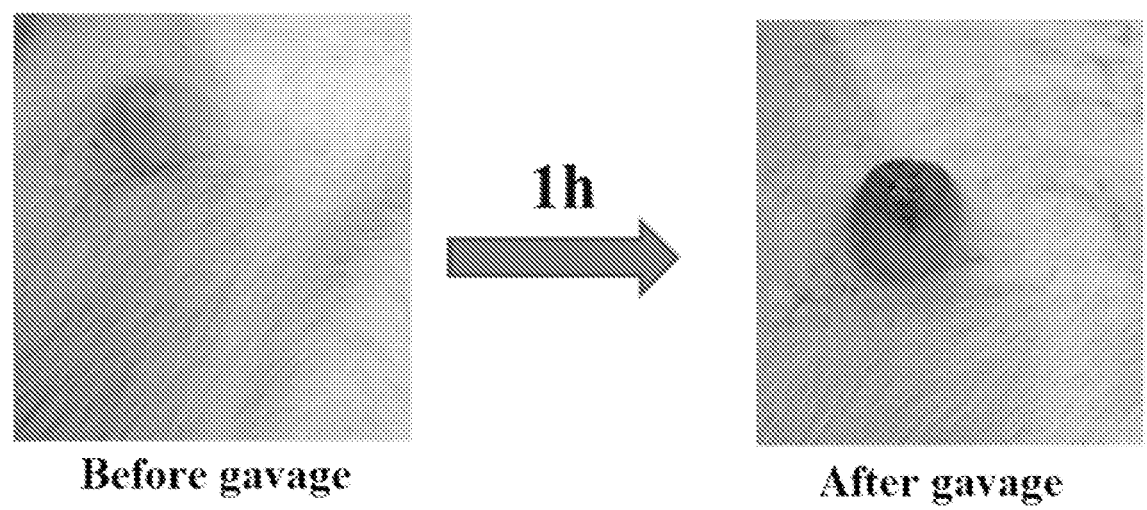
FIG. 26 shows the effect of low-dose treatment with a potassium salt crystal form B of WYQ on the erectile function of the penises in rats.
Figure 27:
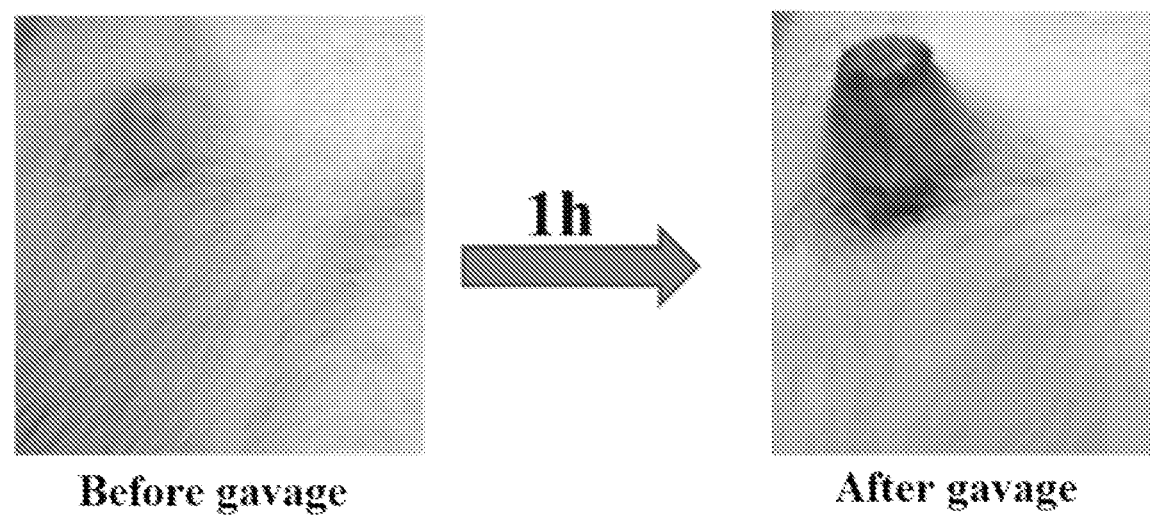
FIG. 27 shows the effect of medium-dose treatment with a potassium salt crystal form B of WYQ on the erectile function of the penises in rats.
Figure 28:
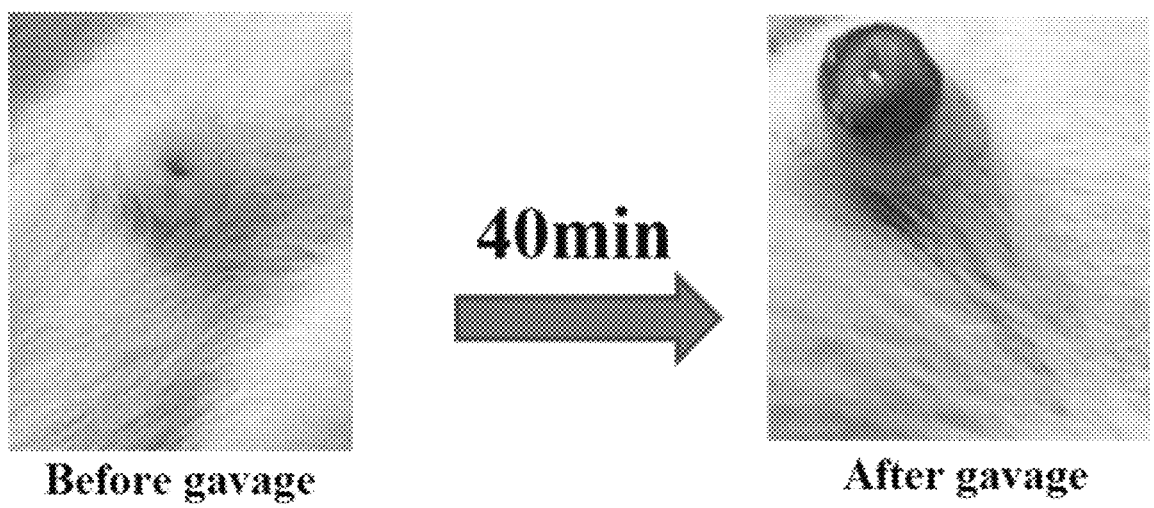
FIG. 28 shows the effect of high-dose treatment with a potassium salt crystal form B of WYQ on the erectile function of the penises in rats.
Figure 29:
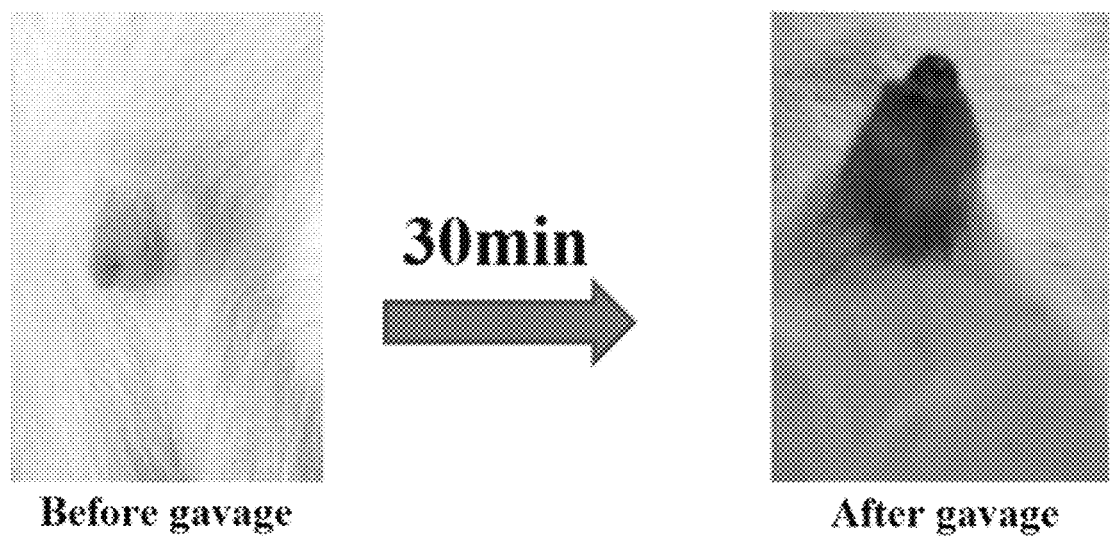
FIG. 29 shows effects of sildenafil treatment on the erectile function of penises in rats.
Figure 30:
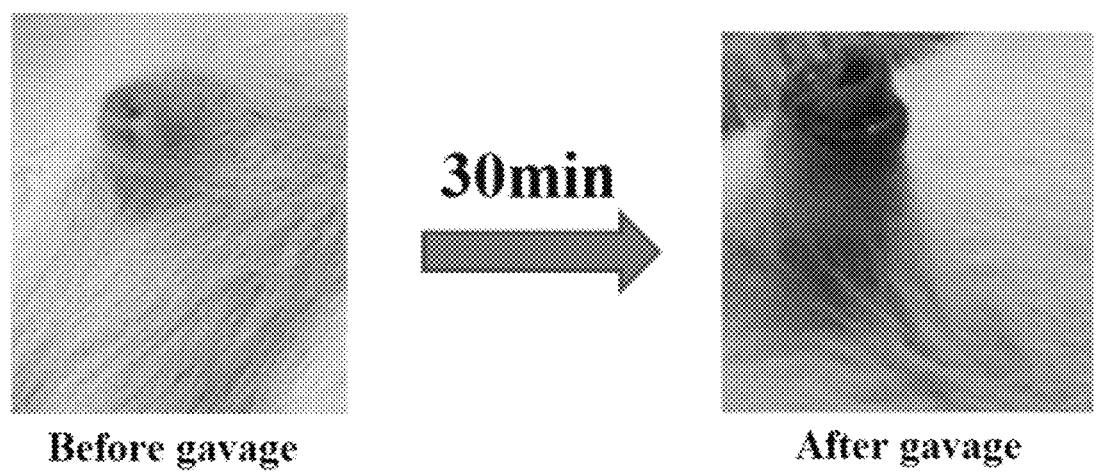
FIG. 30 shows effects of tadalafil treatment on the erectile function of penises in rats.

3.3 Pathological Observation and Quantitative Analysis of Pulmonary Arterioles in PAH Rats The tunica media thickness and WT % data of the pulmonary arterioles of the rats in each group were counted. FIG. 22 shows a standard H&E staining graph of pulmonary arterioles in different groups of rats at 200 times magnification after 21 days of treatment of PAH rats with different doses of a potassium salt crystal form B of WYQ, sildenafil and tadalafil. The results in FIG. 23 and FIG. 24 showed that the tunica media thickness and WT % of pulmonary arterioles of rats in the PAH model group increased significantly compared with the normal control group (P<0.05); the tunica media thickness and WT % in the low-, medium- and high-dose groups of the potassium salt crystal form B of WYQ decreased and improved significantly; the tunica media thickness and WT % of pulmonary arterioles in the tadalafil group also decreased significantly compared with the PAH model group; the sildenafil group showed a decrease in tunica media thickness compared with the PAH model group, but the magnitude of decrease was not as great as that in the each dose group of the potassium salt crystal form B of WYQ and the tadalafil group, and the WT % was not statistically significant compared with the PAH model group (P=0.468).

3.4 Observation of Penile Erectile Function in PAH Rats

FIGS. 25-30 show the comparison of penile erection in rats in different doses of the potassium salt crystal form B of WYQ, sildenafil and tadalafil treatment groups after gavage for 1 h/40 min/30 min. The results indicated that 30% of rats showed penile erection over 1 h after gavage in the mini-dose group of the potassium salt crystal form B of WYQ; 50% of rats showed penile erection over 1 h after gavage in the low-dose group; 80% of rats showed penile erection over 1 h after gavage in the medium-dose group; 80% of rats showed penile erection over 40 min after gavage in the high-dose group, and the size erected penis was thicker and the color of erected penis was redder as the drug dose increased. In the tadalafil group, 80% of the rats showed penile erection over 30 minutes after gavage. Similarly, 80% of the rats also showed penile erection over 30 minutes after gavage in the sildenafil group. The duration of penile erection after gavage was shorter and the effect was more significant for sildenafil and tadalafil than the potassium salt crystal form B of WYQ.

III. Experiments on Rats with Idiopathic Pulmonary Fibrosis (IPF)

1. Experimental Materials 1.1 Reagents

Bleomycin hydrochloride is a product from Nippon Kayaku Co., Ltd.; HPLC grade water, BIBF is provided by KCl Biotech (Suzhou) Co., Ltd.; Sodium carboxymethyl cellulose is a product of Sigma Reagent Company of the United States; the potassium salt crystal form B of the compound WYQ was prepared in Embodiment 1; isoflurane, pentobarbital sodium anesthetic, and formalin were purchased from China National Pharmaceutical Group Co., Ltd.

1.2 Apparatus

Nikon optical microscope camera system (Japan); animal ventilator (HX-3005), respiratory anesthesia machine (R580) from Shenzhen Reward Life Technology Co., Ltd.; tissue dehydrator: HistoCore Pearl, Leica; embedding machine: HistoCore Arcadia, Leica; microtome: RM2235, Leica; automatic staining machine: LEICAAutostainer ST5020; slice scanner: Hamamatsu NanoZoomer Digital Pathology (S210); analytical balance: METTLERToledo, ALT104; weight scale: Changshu Shuangjie Testing Instrument Factory, T1000; electric blanket: Jwilch, China; Operating microscope: LuckbirdXTS-4A; Toe volume measuring instrument: (Shanghai Xinruan Information Technology Co., Ltd.).

1.3 Experimental Animals

Male SD rats of SPF grade. The animals are housed in the SPF-grade barrier system of the animal center of KCl Biotech (Suzhou) Co., Ltd. License number of the experimental institution is SYXK (Suzhou) 2017-0041, following the international standard temperature, humidity, and light control system. This experimental animal operation plan has been jointly approved and confirmed by the IACUC Committee of KCl Biotech (Suzhou) Co., Ltd. All operations and management are carried out in strict accordance with the relevant standard operating procedures (SOPs) of KCI Biotech (Suzhou) Co., Ltd. (KCI).

2. Experimental Methods 2.1 Experimental Grouping

Thirty-two male SD rats were randomly divided into 4 groups according to their body weight, 8 rats/group: a model group, a 50 mg/kg Nintedanib group (BIBF-50 mg/kg), a group of 2.5 mg/kg of the potassium salt crystal form B of WYQ (CPD-1-2.5 mg/kg), and a group of 10 mg/kg of the potassium salt crystal form B of WYQ (CPD-1-10 mg/kg).

2.2 Animal Modeling

All operations involved in this experiment were carried out under the guidelines of the KCI animal experiment SOPs. The animals were purchased, and modeling was started after 3-7 days of acclimatization. The animals were weighed and anesthetized by inhalation with isoflurane. After the animals were confirmed to be anesthetized, the neck was disinfected, and the skin of the neck was cut. The main trachea was exposed by bluntly dissecting the muscle, a small incision was made between the tracheal rings, into which a PE-20 tube was inserted until the left main bronchus, and bleomycin was injected directly (dose: 3 mg/kg, volume: 1.0 ml/kg). The trachea and skin were sutured. After the surgery, the animals were kept warm at 37° C. under an electric blanket until the animals were fully awake and confirmed to be able to feed and drink freely before returning the animals to their normal feeding cages.

2.3 Dosage and Method of Drug Administration

Model group: normal saline gavage according to a body weight at a dose of 1 ml·100 $g^{-1}·d^{-1}$;

50 mg/kg Nintedanib group (BIBF-50 mg/kg): BIBF was prepared into a solution of 10 mg/ml with 0.5% sodium carboxymethyl cellulose and administered by gavage at a dose of 50 mg·$kg^{-1}·d^{-1}$;

The group of 2.5 mg/kg of the potassium salt crystal form B of WYQ (CPD-1-2.5 mg/kg): the potassium salt crystal form B of WYQ was diluted with normal saline to a 0.5 mg/ml solution and administered by gavage at a dose of 2.5 mg·$kg^{-1}·d^{-1}$;

The group of 10 mg/kg of the potassium salt crystal form B of WYQ (CPD-1-10 mg/kg): the potassium salt crystal form B of WYQ was diluted with normal saline into a 2 mg/ml solution and administered by gavage at a dose of 10 mg·$kg^{-1}·d^{-1}$;

Each group of rats was administered by gavage on the day of modeling, once a day for 23 days in total.

According to the interspecies dose conversion method currently adopted by the FDA in USA, the conversion factor between rats and humans is 0.162. Therefore, according to the gavage administration dose for rats in the Embodiments, it is concluded that the oral dose of the potassium salt crystal form B of WYQ in human is 0.405 mg·$kg^{-1}·d^{-1}$, 1.62 mg·$kg^{-1}·d^{-1}$, respectively, administered once a day for 23 consecutive days.

According to the dose conversion between different routes of administration in the "Pharmacological Experimental Methodology", the ratio of the intramuscular and intraperitoneal injection dose to the oral dose is about 0.3-0.4, thereby inferring that the human injectable doses of the potassium salt crystal form B of WYQ is 0.122-0.162, 0.486-0.648 mg·$kg^{-1}·d^{-1}$, respectively, administered once a day for 23 consecutive days (drug concentration: 1 mg/ml)

2.4 Test Indexes and Detection Methods 2.4.1 Left Lung Weight and Volume of IPF Rats After 23 days of continuous administration, all animals in each group were euthanized by intraperitoneal injection of pentobarbital sodium anesthetic (100 mg/kg) in accordance with the KCI standard operating procedure for animal euthanasia. Whole-body perfusion was performed by low-temperature PBS, and then fixation was performed by whole-body formalin perfusion. The left lung was taken and perfused with an equal amount of formalin fluid for weighing and subsequent lung pathology-related tests.

Left lung gross pathological examination: after perfusion with an equal amount of formalin, the wet weight of the left lung after the perfusion was weighed and recorded with a microbalance; the volume of the left lung after perfusion was measured and recorded using a toe volume measuring instrument.

2.4.2 Histopathological Examination of the Lungs of IPF Rats

The whole lung of the left lung was dehydrated according to the KCI pathology standard SOPs, and paraffin blocks were prepared. The whole lung of the left lung was paraffin-sectioned at a thickness of 3-4 μm. HE staining and Masson Trichrome staining were performed according to the KCI pathology standard staining SOPs, and the slice panoramic scanning was carried out by a Hamamatsu NanoZoomer Digital Pathology (S210) slice scanner. The lung lesion area was calculated by Masson Trichrome staining of the sections, and the left lung fibrosis area (%) was the percentage of fibrosis area in the left lung area; 10 randomly selected fields of view of 1 $mm^2$ in the lesion area were semi-quantitatively scored by the pathologist under double-blind conditions according to the Ashcroft scoring system (as shown in Table 8 and FIG. 40).

TABLE 8

Ashcroft scoring criteria

| Fibrosis grading | Ashcroft scoring criteria |
|---|---|
| 0 | Alveolar septum: no fibrotic lesions; Lung structure: normal. |
| 1 | Alveolar septum: isolated simple fibrotic changes (thickened alveolar septum, but less than three times that of a normal lung); Lung structure: partially enlarged alveolar cavity, small amount of exudate, no fibrotic material present. |
| 2 | Alveolar septum: definite fibrotic changes (thickened alveolar septum, greater than three times that of a normal lung) forming small nodules, but not connected; Lung structure: partially enlarged alveolar cavity, small amount of exudate, no fibrotic material present. |
| 3 | Alveolar septum: non-interrupted fibrosis visible in almost all alveolar walls in each high-power field (thickened alveolar septum, greater than three times that of a normal lung); |

TABLE 8-continued

Ashcroft scoring criteria

| Fibrosis grading | Ashcroft scoring criteria |
| --- | --- |
| | Lung structure: partially enlarged alveolar cavity, small amount of exudate, no fibrotic material present. |
| 4 | Alveolar septum: alveolar septum still visible; Lung structure: isolated fibrotic nodules in the alveolar cavity (≤10% of high-power field). |
| 5 | Alveolar septum: alveolar septum still visible; Lung structure: fused fibrotic nodules occurring in the alveolar cavity (>10% and ≤50% of high-power field) with severe structural damage to the lung tissue but surviving structure. |
| 6 | Alveolar septum: visible, but barely present. Lung structure: large non-interrupted fibrotic nodules (>50% of high-power field) with little to no lung tissue architecture. |
| 7 | Alveolar septum: no longer present; Lung structure: alveolar cavity almost filled with a fibrotic material, but still with 5 or less vacuolated structures. |
| 8 | Alveolar septum: no longer present; Lung structure: alveolar cavity filled with fibrotic tissue under a high-power lens. |

3. Experimental Results 3.1 Weight and Volume of the Left Lung in IPF Rats

Figure 31:
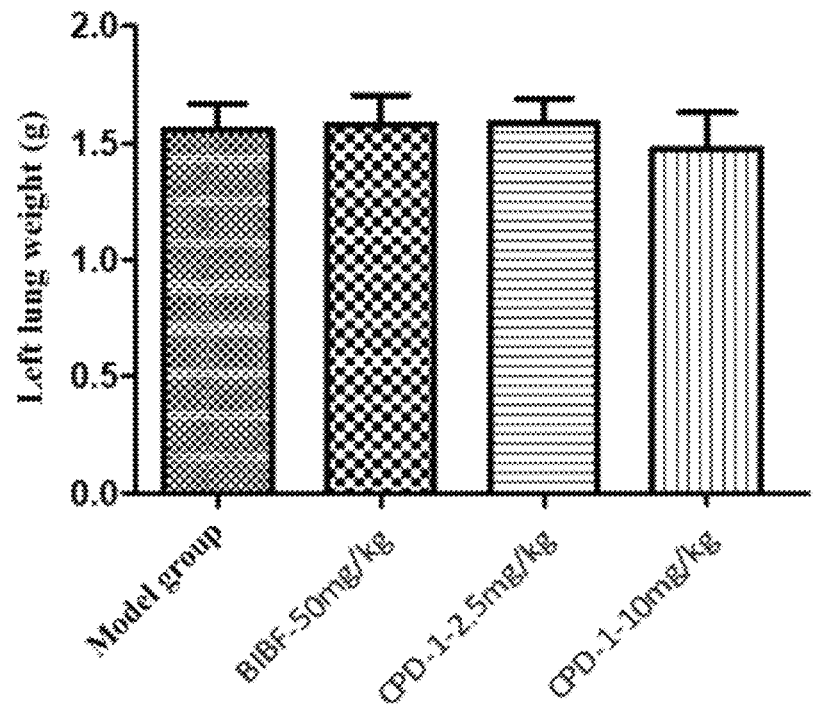
FIG. 31 is a graph showing the effect of different doses of a potassium salt crystal form B of WYQ and the currently clinically approved positive control drug Nintedanib (BIBF) on the weights of the left lungs of IPF rats after 23 days of treatment.
Figure 32:
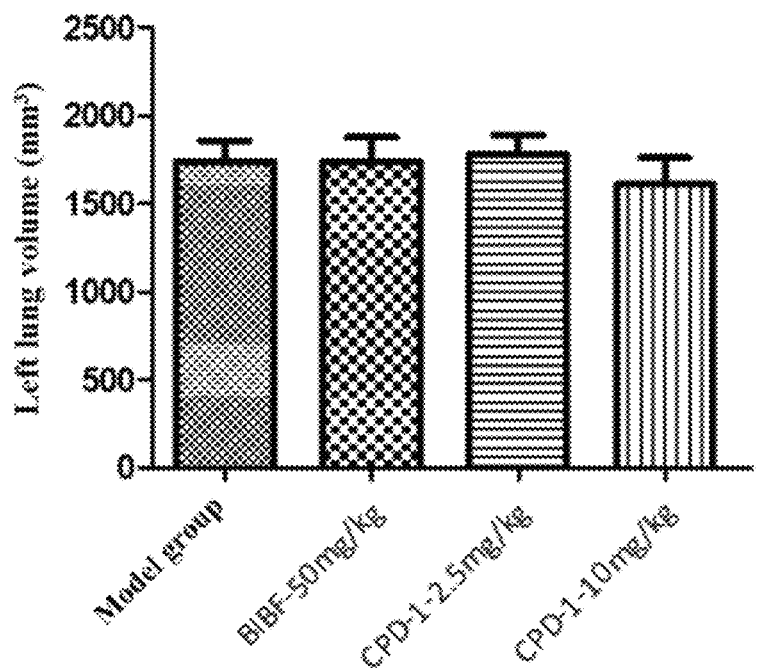
FIG. 32 is a graph showing effects of different doses of a potassium salt crystal form B of WYQ and BIBF on the volumes of the left lungs of IPF rats after 23 days of treatment.

The statistical results of the weight and volume of the left lung of IPF rats in each group after 23 days of continuous administration are shown in Table 9. FIG. 31 is a graph showing the effect of different doses of a potassium salt crystal form B of WYQ and BIBF on the weights of the left lungs of IPF rats after 23 days of treatment; FIG. 32 is a graph showing the effect of different doses of a potassium salt crystal form B of WYQ and BIBF on the volumes of the left lungs of IPF rats after 23 days of treatment.

TABLE 9

Statistical results of the weight and volume of left lung of IPF rats in each group after 23 days of continuous administration

| Group | Number of animals | Left lung weight (g) | Left lung volume (mm$^3$) |
| --- | --- | --- | --- |
| Model group | 8 | 1.56 ± 0.11 | 1739 ± 116.23 |
| BIBF-50 mg/kg | 8 | 1.58 ± 0.12 | 1736.9 ± 136.10 |
| CPD-1-2.5 mg/kg | 8 | 1.59 ± 0.10 | 1779.9 ± 105.76 |
| CPD-1-10 mg/kg | 8 | 1.47 ± 0.16 | 1604.5 ± 153.72 |

The results showed that there was no statistically significant difference in left lung weight and volume between each administration group and the model group.

Figure 33:
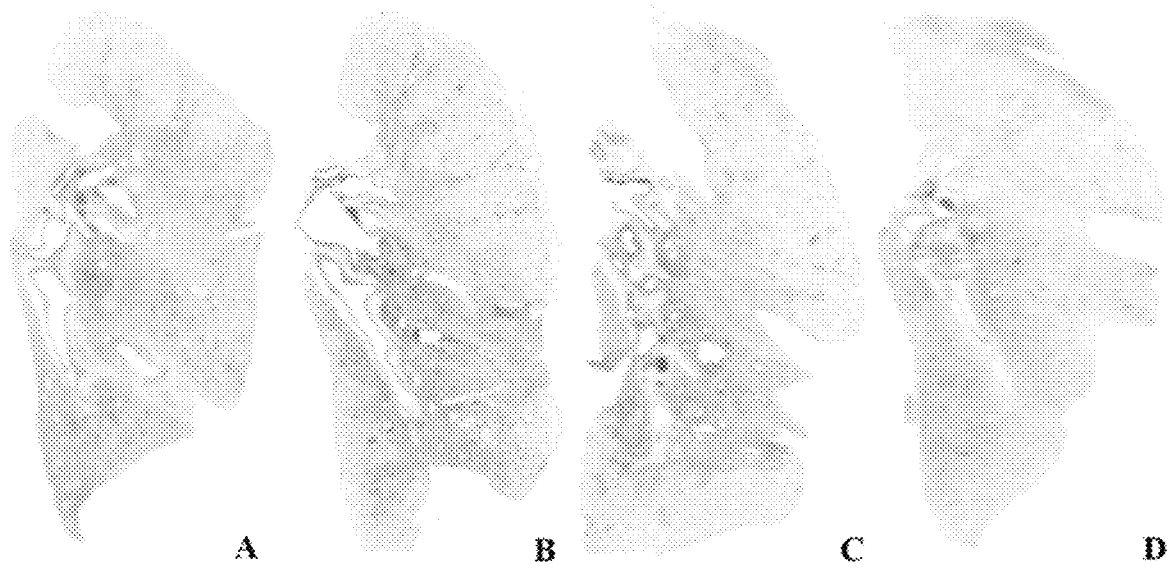
FIG. 33 is a comparison diagram of left lung pulmonary fibrosis lesions and changes in lesion range after 23 days of treatment of IPF rats with different doses of a potassium salt crystal form B of WYQ and BIBF (H&E staining), where A is a model group, B is a BIBF-50 mg/kg group, C is a CPD-1-2.5 mg/kg group, and D is a CPD-1-10 mg/kg group.
Figure 34:
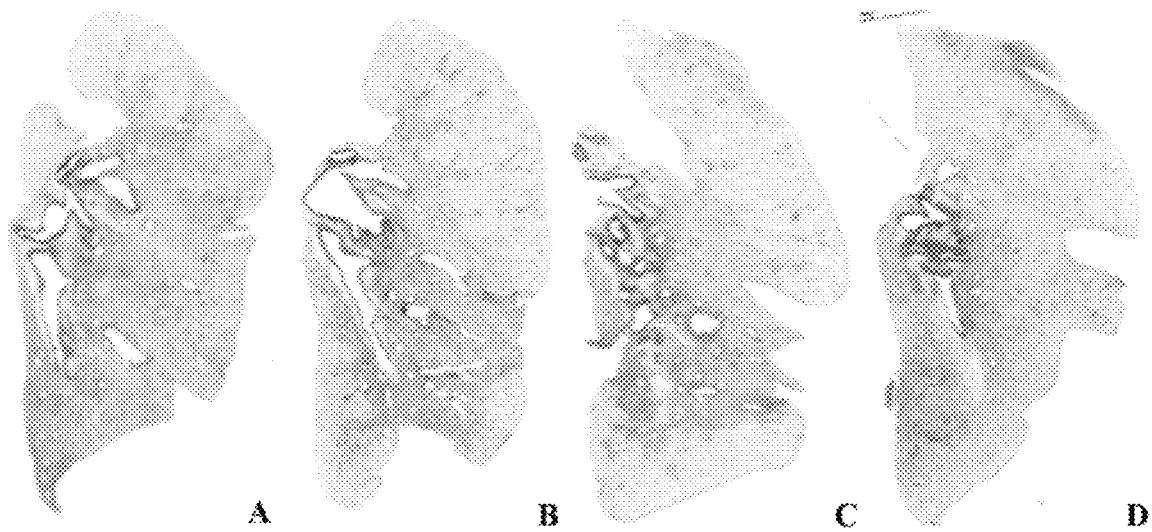
FIG. 34 is a comparison diagram of left lung pulmonary fibrosis lesions and changes in lesion range after 23 days of treatment of IPF rats with different doses of a potassium salt crystal form B of WYQ and BIBF (MassonTrichrom staining), where A is a model group, B is a BIBF-50 mg/kg group, C is a CPD-1-2.5 mg/kg group, and D is a CPD-1-10 mg/kg group.

3.2 Histopathological Examination of the Lung Tissue of IPF Rats 3.2.1 Pulmonary Fibrosis Lesions and Lesion Range in the Left Lung FIGS. 33-34 show significant lung injury with clear lung tissue boundaries. Two different lung histological stainings (H&E and Masson Trichrom staining) clearly show uniform fibrotic lesions and a lesion distribution range in the left lung. After 23 days of treatment of IPF rats with different doses of the potassium salt crystal form B of WYQ and BIBF, compared with the model group, there was no significant difference in left lung pulmonary fibrosis lesions and lesion range.

Figure 35:
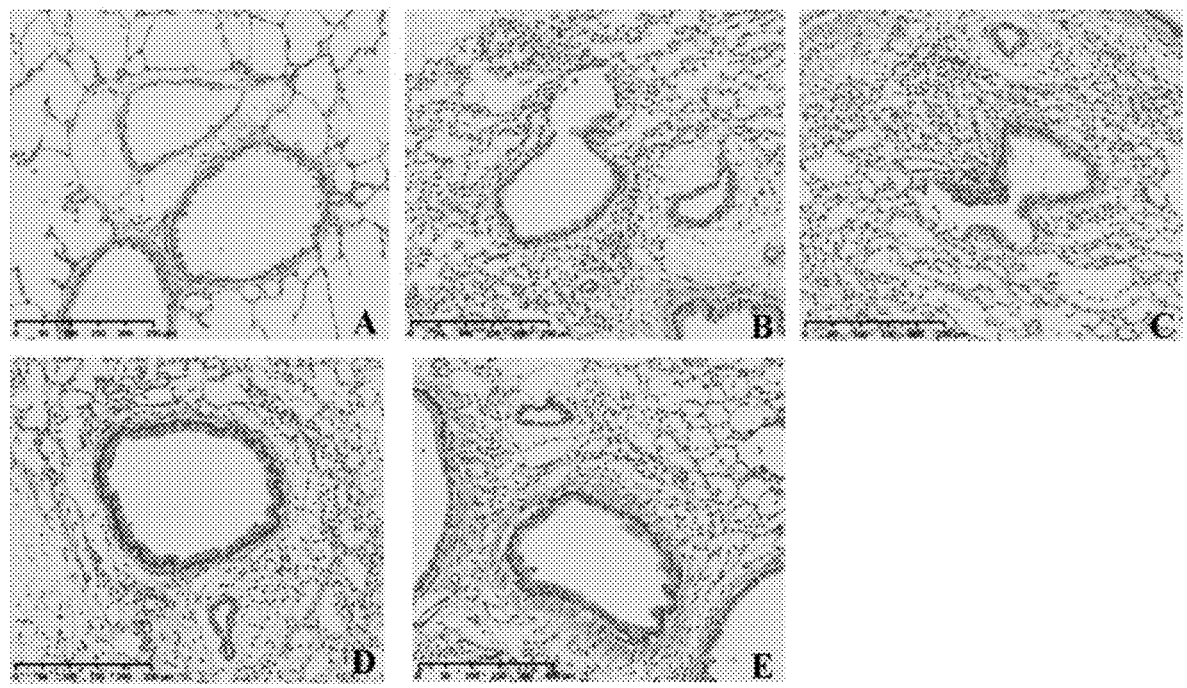
FIG. 35 shows a comparison diagram of histological changes of bronchioles and pulmonary arterioles in left lung pulmonary fibrosis lesions after 23 days of treatment of IPF rats with different doses of a potassium salt crystal form B of WYQ and BIBF (HE staining, picture magnification: ×200), where A is the contralateral lung tissue of a model group, B is the model group, C is a BIBF-50 mg/kg group, D is a CPD-1-2.5 mg/kg group, and E is a CPD-1-10 mg/kg group.
Figure 36:
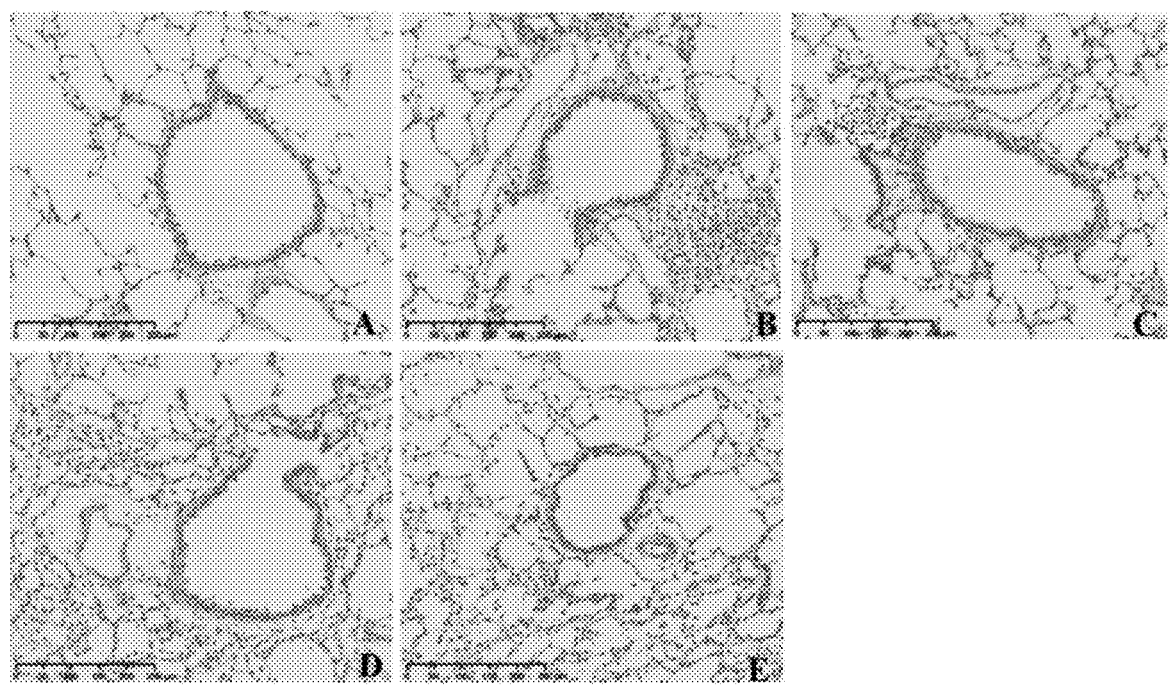
FIG. 36 shows a comparison diagram of histological changes of bronchioles and pulmonary arterioles at the edges of the left lung pulmonary fibrosis lesions after 23 days of treatment of IPF rats with different doses of a potassium salt crystal form B of WYQ and BIBF (HE staining, picture magnification: ×200), where A is the contralateral lung tissue of a model group, B is the model group, C is a BIBF-50 mg/kg group, D is a CPD-1-2.5 mg/kg group, and E is a CPD-1-10 mg/kg group.

3.2.2 Histological Changes of Bronchioles and Pulmonary Arterioles in the Left Lung Pulmonary Fibrosis Lesions of IPF Rats The observation showed different degrees of epithelial cell hyperplasia in the bronchioles, terminal bronchioles, and alveolar ducts, with some epithelium and even the whole epithelium becoming goblet cells, and varying amounts of mucus tissue in the lumen. The walls of the pulmonary arterioles were infiltrated with inflammatory cells to varying degrees, and some of the walls were thickened with smooth muscle hyperplasia and hyperplasia of granulation tissue on the outer mold membranes of the walls. FIG. 35 shows a comparison diagram of histological changes of bronchioles and pulmonary arterioles in left lung pulmonary fibrosis lesions after 23 days of treatment of IPF rats with different doses of a potassium salt crystal form B of WYQ and BIBF (HE staining), and FIG. 36 shows a comparison diagram of histological changes of bronchioles and pulmonary arterioles at the edges of the left lung pulmonary fibrosis lesions after 23 days of treatment of IPF rats with different doses of a potassium salt crystal form B of WYQ and BIBF. As shown in FIGS. 35-36, the smooth muscle proliferation and inflammatory cell infiltration, in the bronchioles and pulmonary arterioles in the left lung pulmonary fibrosis lesions, and the bronchioles and pulmonary arterioles at lesion margins, were improved after treatment. Compared with the model group, the CPD-1-10 mg/kg treatment group had better effects.

3.2.3 Alveolar Tissue Damage in the Left Lung Pulmonary Fibrosis Lesion of IPF Rats The alveolar tissues in the left lung pulmonary fibrosis lesions of IPF rats were damaged to different degrees, which showed that the alveolar epithelium was shed and regenerated, and the alveolar wall was thickened and fibrotic; the alveolar lumen was deposited with different degrees of fibrous tissue, inflammatory exudate and inflammatory cell infiltration; the lamellar alveolar structures in the fibrosis lesions were damaged and disappeared, and filled by a large number of exudate inflammatory cells and proliferated connective tissues. Inflammatory exudate and proliferated connective tissues were seen in the residual alveolar lumen.

Figure 37:
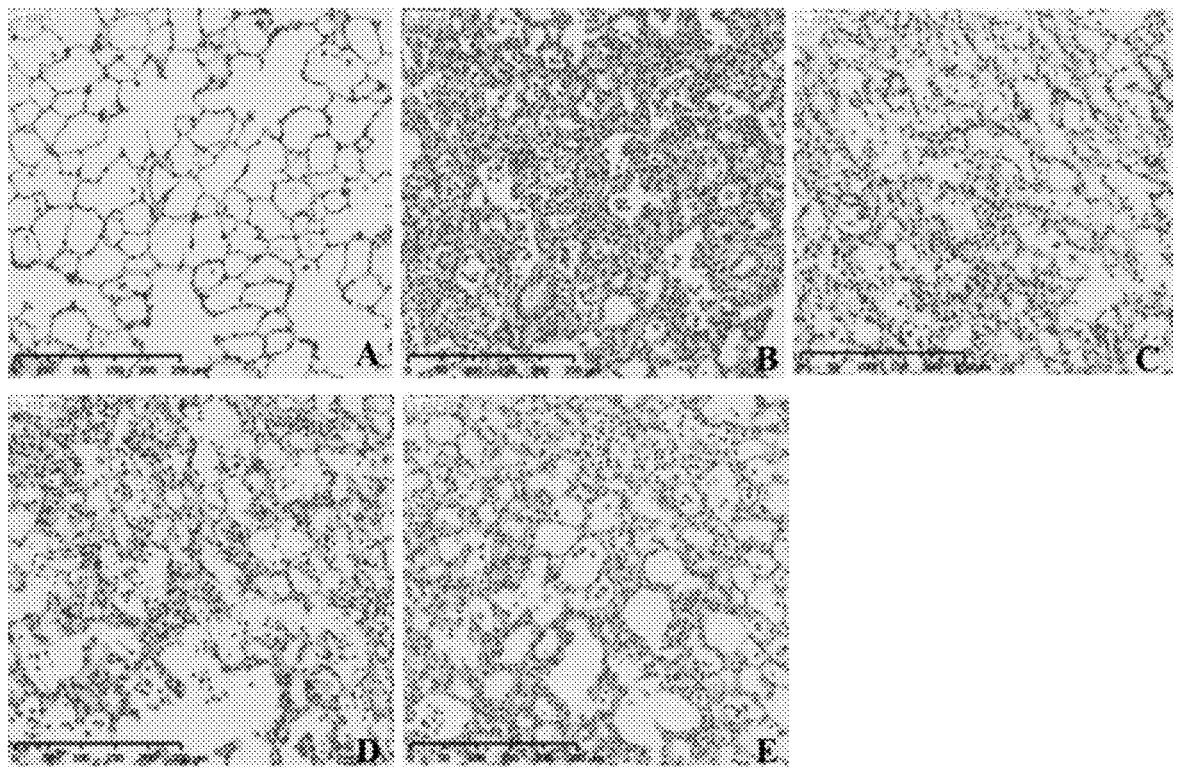
FIG. 37 shows a comparison diagram of changes in alveolar tissue structures in left lung pulmonary fibrosis lesions after 23 days of treatment of IPF rats with different doses of a potassium salt crystal form B of WYQ and BIBF (HE staining, picture magnification: ×200), where A is the contralateral lung tissue of a model group, B is the model group, C is a BIBF-50 mg/kg group, D is a CPD-1-2.5 mg/kg group, E is a CPD-1-10 mg/kg group.

FIG. 37 shows a comparison diagram of changes in alveolar tissue structure in left lung pulmonary fibrosis lesions after 23 days of treatment of IPF rats with different doses of a potassium salt crystal form B of WYQ and BIBF (HE staining, picture magnification: ×200). The results showed that in the BIBF-50 mg/kg treatment group, some of the alveolar structures in the fibrotic lesions were still damaged, the residual alveolar walls were thickened, and the walls were infiltrated with inflammatory cells; in the CPD-1-2.5 mg/kg treatment group, some of the alveolar structures in the fibrotic lesions were damaged, the residual alveolar walls were thickened, and the walls were infiltrated with inflammatory cells; in the CPD-1-10 mg/kg treatment group, the alveolar structures in the fibrotic lesions were preserved, the alveolar walls were thickened, and the walls were infiltrated with inflammatory cells.

Figure 38:
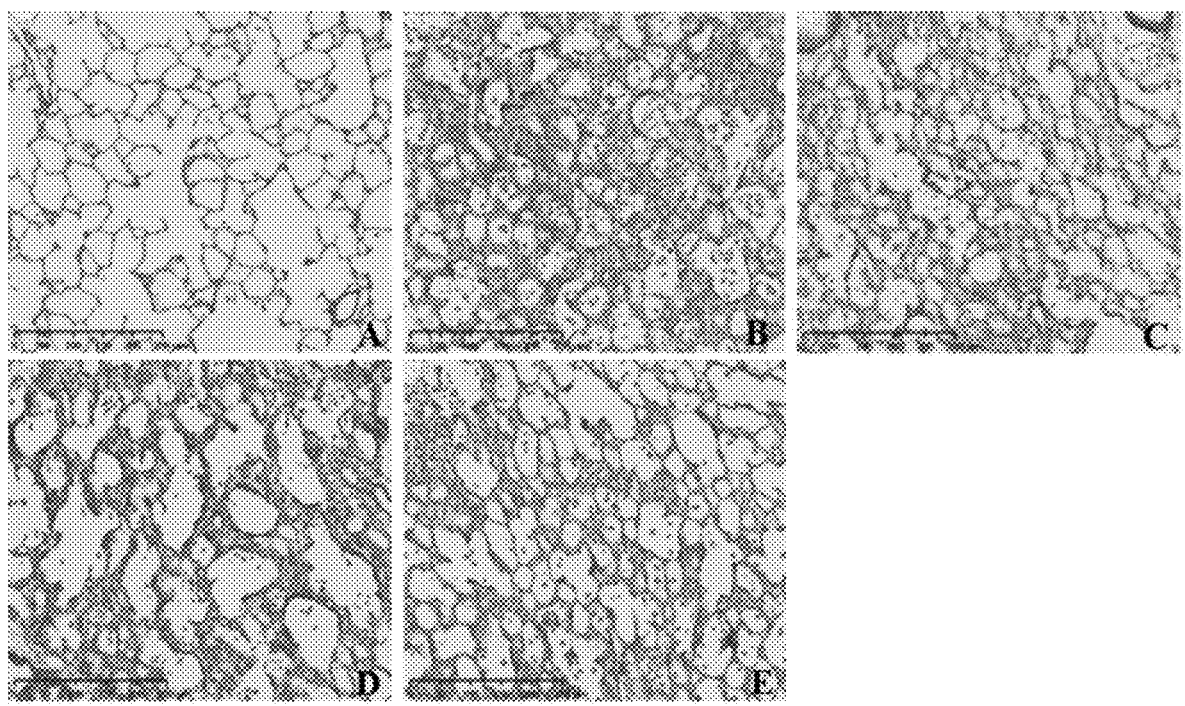
FIG. 38 shows a comparison diagram of changes in alveolar tissue structures in left lung pulmonary fibrosis lesions after 23 days treatment of IPF rats with different doses of potassium salt crystal form B of WYQ and BIBF (MassonTrichrom staining, magnification: ×200), where A is the contralateral lung tissue of a model group, B is the model group, C is a BIBF-50 mg/kg group, D is a CPD-1-2.5 mg/kg group, and E is a CPD-1-10 mg/kg group.

FIG. 38 shows a comparison diagram of changes in alveolar tissue structures of the left lung pulmonary fibrosis lesions after 23 days of treatment of IPF rats with different doses of a potassium salt crystal form B of WYQ and BIBF (Masson Trichrom staining, picture magnification: ×200). The results showed that in the BIBF-50 mg/kg treatment group, some of the alveolar structures in the fibrotic lesions disappeared and the residual alveolar walls were thickened; in the CPD-1-2.5 mg/kg treatment group, some of the alveolar structures in the fibrotic lesions were preserved and the alveolar walls were thickened, and inflammatory exudates and hyperplastic connective tissues were seen in the area of alveolar wall damage; in the CPD-1-10 mg/kg treatment group, most of the alveolar structures in the fibrotic lesions were preserved and the alveolar walls were thickened, with partially repaired alveolar wall structure, and a small amount of inflammatory exudate could be seen in the alveolar cavity.

3.2.4 Area of Fibrotic Lesions in the Left Lung of IPF Rats

Figure 39:
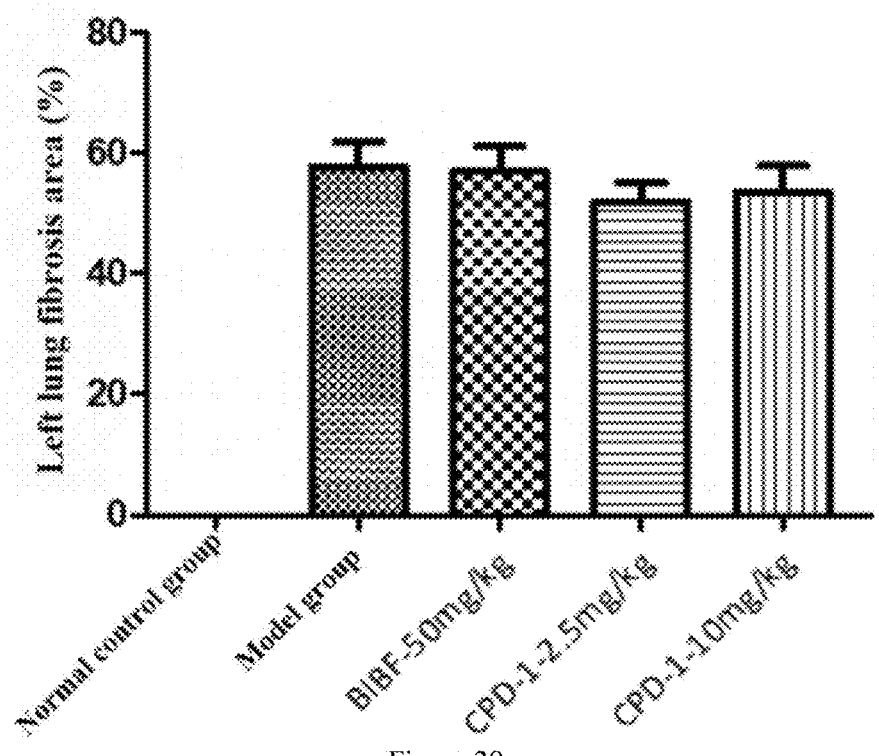
FIG. 39 shows a comparison diagram of changes in the area of pulmonary fibrosis in the left lung after 23 days of treatment of IPF rats with different doses of a potassium salt crystal form B of WYQ and BIBF.

FIG. 39 shows a comparison diagram of changes in the area of pulmonary fibrosis in the left lung after 23 days of treatment of IPF rats with different doses of a potassium salt crystal form B of WYQ and BIBF (the normal control group in the figure refers to the unadministered side of the lung in the model group). The results showed that the lesion area between the model group and each administration group was basically the same, suggesting the stability and uniformity of the model.

Figure 40:
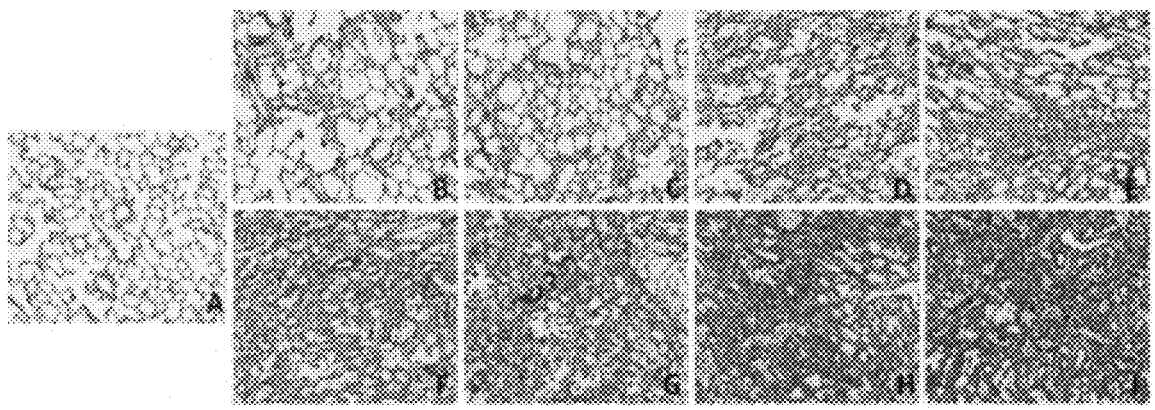
FIG. 40 shows the criteria for pathological scoring of pulmonary fibrosis (Masson Trichrome staining), and Figures A-I successively show the pictures of Masson Trichrome staining criteria for fibrosis grading 0-8 in the Ashcroft scoring system.
Figure 41:
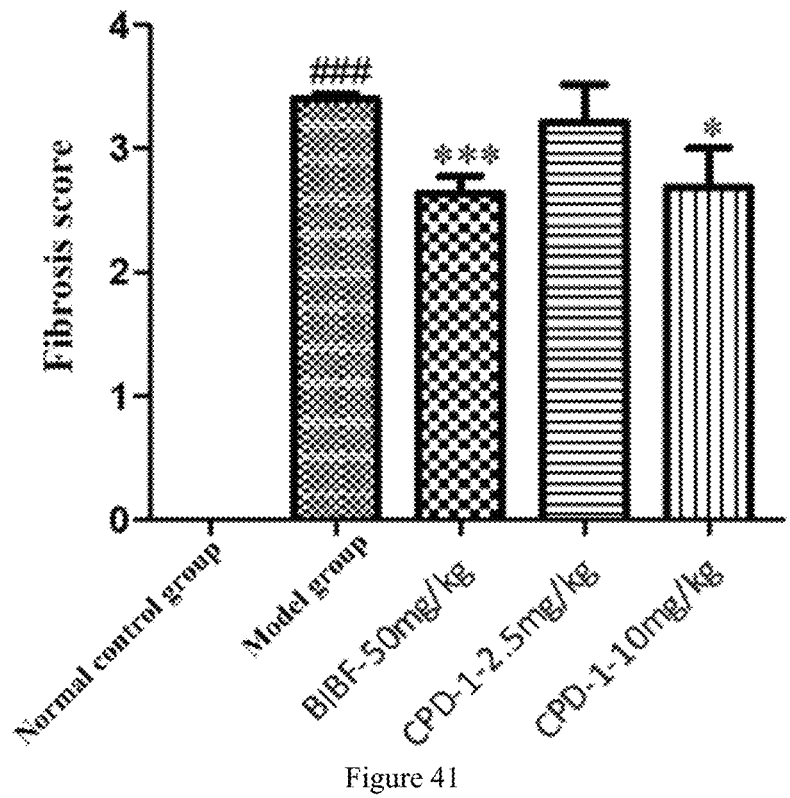
FIG. 41 shows a comparison diagram of changes in left lung pulmonary fibrosis lesion scores after 23 days of treatment of IPF rats with different doses of a potassium salt crystal form B of WYQ and BIBF.
Figure 42:
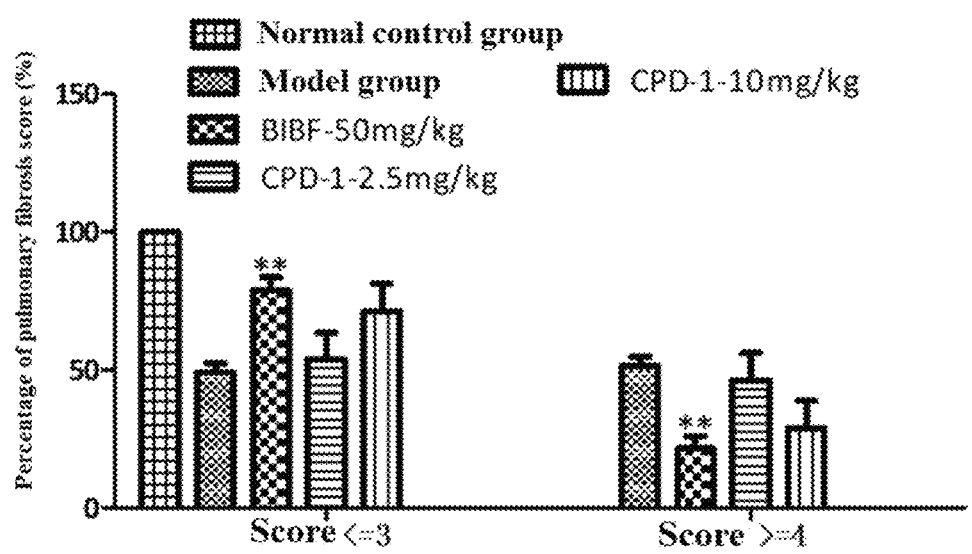
FIG. 42 shows a comparison diagram of changes in the percentage of left lung pulmonary fibrosis lesion scores after 23 days of treatment of IPF rats with different doses of a potassium salt crystal form B of WYQ and BIBF.

3.2.5 Pulmonary Fibrosis Lesion Score and Percentage of Score in the Left Lung of IPF Rats FIG. 40 shows the criteria for pathological scoring of pulmonary fibrosis (Masson Trichrome staining). Table 10 shows the statistical results of pulmonary fibrosis Ashcraft scores and percentage of score. FIG. 41 shows a comparison diagram of changes in left lung pulmonary fibrosis lesion scores after 23 days of treatment of IPF rats with different doses of a potassium salt crystal form B of WYQ and BIBF (the normal control group in the figure refers to the unadministered side of the lung in the model group); FIG. 42 shows a comparison diagram of changes in the percentage of left lung pulmonary fibrosis lesion scores after 23 days of treatment of IPF rats with different doses of a potassium salt crystal form B of WYQ and BIBF (the normal control group in the figure refers to the unadministered side of the lung in the model group).

TABLE 10 shows the statistical results of Ashcraft score and percentage of score of pulmonary fibrosis.

| Group | Number of animals | Fibrosis area | Fibrosis score | Percentage of score (%) (≤3) | Percentage of score (%) (≥4) |
|---|---|---|---|---|---|
| normal control | 5 | 0.00 ± 0.00 | 0.00 ± 0.00 | 100.00 ± 0.00 | 0.00 ± 0.00 |
| model group | 8 | 57.72 ± 4.14 | 3.40 ± 0.04[####] | 48.75 ± 3.50 | 51.25 ± 3.50 |
| BIBF-50 mg/kg | 8 | 56.91 ± 4.19 | 2.64 ± 0.13*** | 78.75 ± 4.79** | 21.25 ± 4.79** |
| CPD-1-2.5 mg/kg | 8 | 51.99 ± 3.21 | 3.21 ± 0.30 | 53.75 ± 9.81 | 46.25 ± 9.81 |
| CPD-1-10 mg/kg | 8 | 53.42 ± 4.44 | 2.69 ± 0.31* | 71.25 ± 10.08 | 28.75 ± 10.08 |

Note:
One-way ANOVA:
*$p < 0.05$ vs model group;
**$p < 0.01$ vs model group;
***$p < 0.001$ vs. model group;
$p < 0.001$ vs. normal control group.

The results of Ashcraft score of pulmonary fibrosis showed that the positive control drug BIBF at a dose of 50 mg/kg may significantly improve the degree of left lung pulmonary fibrosis in rats compared with the model group ($p<0.05$); the potassium salt crystal form B of WYQ administered orally once a day at a dose of 10 mg/kg for 23 days may significantly inhibit pulmonary fibrosis, with significant differences compared with the model group ($p<0.05$).

The percentage of pulmonary fibrosis with a score of 3 or less (including 3) or 4 or more (including 4) was calculated based on an Ashcraft score of 3. The results showed that nearly 51% or above of the focal areas in the model group had a score of 4 or more, and 25-50% of the focal areas of animals in each drug treatment group had a score of 4 or more after drug treatment. Statistical results showed that the percentage of pulmonary fibrosis after the positive drug BIBF treatment was significantly reduced compared with the model group ($p<0.05$); the potassium salt crystal form B of WYQ at a dose of 10 mg/kg significantly reduced the percentage of pulmonary fibrosis in the treatment group compared with the model group ($p<0.05$).

IV. Experiments on Animals with Renal Fibrosis

1. Experimental Materials 1.1 Reagents

Mouse anti-α-SMA antibody, mouse anti-α-tubulin antibody, rabbit anti-Fibronectin antibody and sodium carboxymethylcellulose were purchased from Sigma Reagent Company, USA; rabbit anti-Collagen-I antibody and rabbit anti-Kim-1 antibody were purchased from Millipore Company, USA; anti-rabbit and anti-mouse secondary antibodies were purchased from Jackson Company, USA; the potassium salt crystal form B of the compound WYQ was prepared in Embodiment 1; isoflurane, pentobarbital sodium anesthetic and formalin were purchased from China National Pharmaceutical Group Co., Ltd.

1.2 Apparatus

Tissue dehydrator: HistoCore Pearl, Leica; embedding machine: HistoCore Arcadia, Leica; microtome: RM2235, Leica; automatic staining machine: LEICA Autostainer ST5020; slice scanner: Hamamatsu NanoZoomer Digital Pathology (S210); analytical balance: Precia, Germany; weight scale: Changshu Shuangjie Testing Instrument Factory, T1000; operating microscope: Luckbird XTS-4A; gel imaging system: Bio-Rad, USA; electrophoresis tank, electrophoresis instrument: Bio-Rad, USA; pH meter: ETTLER, Switzerland.

1.3 Experimental Animals

The SPF-grade male BALB/c mice, with a weight of about 20 g, were purchased from the Experimental Animal Center of Southern Medical University, license number: SCXK (Guangdong)-2011-0015, and the experimental procedures were strictly in accordance with the "Guideline on the Humane Treatment of Laboratory Animals" issued in 2006 for treating the animals.

2 Experimental Methods 2.1 Unilateral Renal Ischemia-Reperfusion Mouse Model (UIRI Model)

2.1.1 Modeling and Grouping

Fifteen male BALB/c mice were randomly divided into: a Sham group (a sham-operation group) including 5 mice, and a surgical modeling group including 10 mice. Surgical method: mice were anesthetized and incised on the left side of the abdomen to expose the kidney, and the renal pedicle was bluntly dissected. In the sham-operation group, the renal pedicle was only exposed without clamping; in the modeling group, the left kidney renal pedicle was clamped with a non-invasive miniature arterial clamp for 30 min, and the mice were placed on a thermostat plate at 37° C. to maintain a constant body temperature during the clamping period, and the surgical incision was covered with saline-impregnated gauze to prevent dehydration of the renal tissue. The arterial clamp was removed after 30 min, and it was observed that the kidney changed gradually from purple-black to bright red within 1 min, indicating successful blood reperfusion. The kidney was returned to its original position and the wound was sutured. The mice in the modeling group were randomly divided into 2 groups: a UIRI group (a model group) and a treatment group of the potassium salt crystal form B of WYQ (5 mg/kg), 5 mice in each group.

2.1.2 Drug Administration

The first gavage administration was started 2 hours after the operation.

(1) Sham group and UIRI model group: normal saline gavage was given according to a body weight at a dose of 0.1 ml·10 $g^{-1} \cdot d^{-1}$;

(2) treatment group of the potassium salt crystal form B of WYQ: the potassium salt crystal form B of WYQ was diluted into a 1 mg/ml solution with normal saline and administered by gavage at the dose of 5 mg·kg$^{-1}$·d$^{-1}$; and administered once a day for consecutive 10 days.

According to the interspecies dose conversion method currently used by the FDA in USA, the conversion factor between mice and humans is 0.081. Therefore, based on the gavage administration dose for mice in the Embodiments, it is concluded that the oral dose of the potassium salt crystal form B of WYQ for human is 0.405 mg·kg$^{-1}$·d$^{-1}$, administered once a day for 10 consecutive days.

According to the dose conversion between different routes of administration in the "Pharmacological Experimental Methodology", the ratio of intramuscular and intraperitoneal injection dose to oral dose is about 0.3-0.4, thereby inferring that the human injectable dose of the potassium salt crystal form B of WYQ is 0.1215-0.162 mg·kg$^{-1}$·d$^{-1}$, administered once a day for consecutive 10 days (drug concentration: 1 mg/ml).

2.1.3 Specimen Collection and Processing

On the 10th after operation, mice were anesthetized in the same way, the right dorsum was incised to expose the right kidney, and the renal pedicle was ligated before removing the right kidney. The mice in the sham-operation group were only stripped of the perirenal membrane without removing the right kidney. On the 11th after operation, all the mice were sacrificed, the abdominal cavity was opened, and the left kidney tissues of the mice were peeled off, caring to maintain the integrity of the kidney. After the kidney is taken out, the kidney is quickly transferred to pre-chilled PBS, and the kidney is cut for different tests. The kidney is divided into four parts with a scalpel, wherein the upper and lower ventral poles of the kidney were put into liquid nitrogen for extraction of protein and mRNA, and detection of changes in the expression amount of fibrosis-related factors proteins and genes. After 2 hours, the kidney tissue was transferred and stored in the refrigerator at −80° C. The dorsal side of the kidney was fixed in 4% paraformaldehyde for making paraffin sections. The morphological changes of the kidney tissue were observed by HE staining and Masson staining, and the changes of the expression of fibrosis marker proteins in the kidney tissues were observed by immunohistochemistry.

2.2 Unilateral Ureteral Obstruction Mouse Model (UUO Model)

2.2.1 Modeling and Grouping

Fifteen male C57BL/6 mice were adaptively fed for one week and randomly divided into two groups: a Sham group (a sham-operation group) including 5 mice and a surgical modeling group including 10 mice. Surgical method: the abdominal cavities of the mice in the sham-operation group were opened under anesthesia to free the left ureter without ligation, and then their abdomens were closed and sutured; the left ureters of the mice in the modeling group were ligated under anesthesia. The mice in the modeling group were further randomly divided into two groups: a UUO group (a model group) and a treatment group of the potassium salt crystal form B of WYQ (5 mg/kg), 5 mice in each group.

2.2.2 Drug Administration

The first gavage administration was started 2 hours after the operation.

(1) Sham group and UUO model group: normal saline gavage was given according to a body weight at a dose of 0.1 ml·10 $g^{-1} \cdot d^{-1}$;

(2) treatment group of the potassium salt crystal form B of WYQ: the potassium salt crystal form B of WYQ was diluted into a 1 mg/ml solution with normal saline and administered by gavage at the dose of 5 mg·kg$^{-1}$·d$^{-1}$; and administered once a day for consecutive 7 days.

According to the interspecies dose conversion method currently used by the FDA in USA, the conversion factor between mice and humans is 0.081. Therefore, it is concluded that the oral dose of the potassium salt crystal form B of WYQ for human is 0.405 mg·kg$^{-1}$·d$^{-1}$, administered once a day for 7 consecutive days, based on the gavage administration dose for the rats in the Embodiments.

According to the dose conversion between different routes of administration in the "Pharmacological Experimental Methodology", the ratio of intramuscular and intraperitoneal injection dose to oral dose is about 0.3-0.4, thereby inferring that the human injectable dose of the potassium salt crystal form B of WYQ is 0.1215-0.162 mg·kg$^{-1}$·d$^{-1}$, administered once a day for 7 consecutive days (drug concentration: 1 mg/ml).

2.2.3 Specimen Collection and Processing

After 7 days of drug administration, all the mice were sacrificed. The abdominal cavity was opened and the left and right kidney tissues were peeled off, caring to maintain the integrity of the kidneys. The kidneys were taken out and quickly transferred to pre-cooled PBS, and the kidneys were cut for different assays. The kidney was divided into four parts with a scalpel, and the dorsal side of the kidney was fixed in 4% paraformaldehyde for making paraffin sections.

Morphological changes of kidney tissues were observed by HE staining and Masson staining, and changes of expression of fibrosis marker proteins in kidney tissues were observed by immunohistochemistry.

Figure 43:
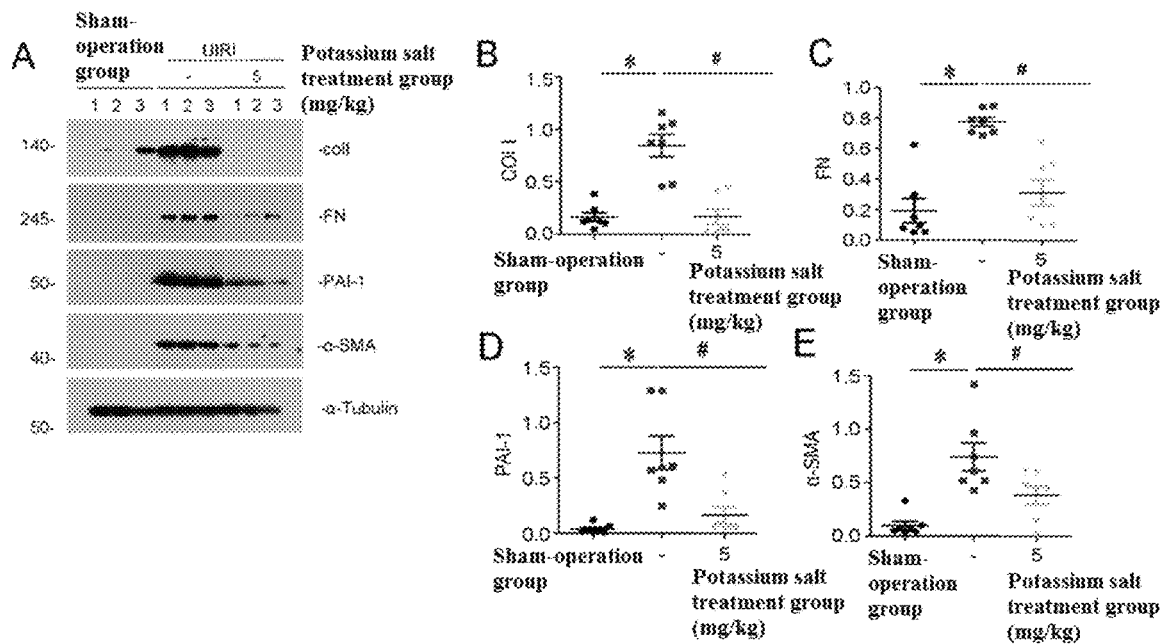
FIG. 43 shows that a potassium salt crystal form B of WYQ may improve renal fibrosis in UIRI model mice in vivo, where A is a immunoblot standard graph of the potassium salt crystal form B of WYQ for inhibiting the expression of FN, Collagen I, PAI-1 and α-SMA in renal fibrosis lesions, and numbers (1, 2, 3) indicate each animal in each group, and B-E are the relative content determination statistical graph for FN, Collagen I, PAI-1 and α-SMA.

3 Experimental Results 3.1 Therapeutic Effects of the Potassium Salt Crystal Form B of WYQ on UIRI Model Mice 3.1.1 The Potassium Salt Crystal Form B of WYQ Significantly Reduced the Expression of FN1, Collagen I, PAI-1 and α-SMA in the Kidney Tissues of UIRI Mice It was showed in Western Blot results (FIG. 43) that in the kidney tissues of mice, the expression of the fibrosis marker factors FN1, Collagen I, PAI-1 and α-SMA protein was low in the basal state and significantly increased in the kidney tissues of UIRI model mice, while the expression levels of these proteins were significantly reduced in the preventive administration group of the potassium salt crystal form B of WYQ. It was indicated that the potassium salt crystal form B of WYQ can inhibit the formation of renal fibrosis induced by ischemia-reperfusion.

Figure 44:
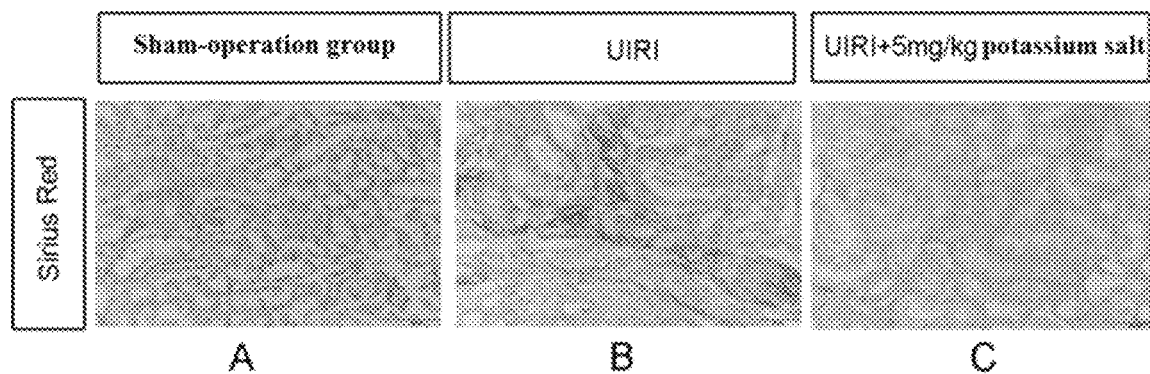
FIG. 44 respectively shows a comparison diagram of structure changes of glomeruli and renal tubules in left renal fibrosis lesions after 10 days treatment of UIRI model mice with a potassium salt crystal form B of WYQ (HE staining), A-C indicate a sham-operation group, a UIRI model group, and a treatment group of a potassium salt crystal form B of WYQ.
Figure 45:
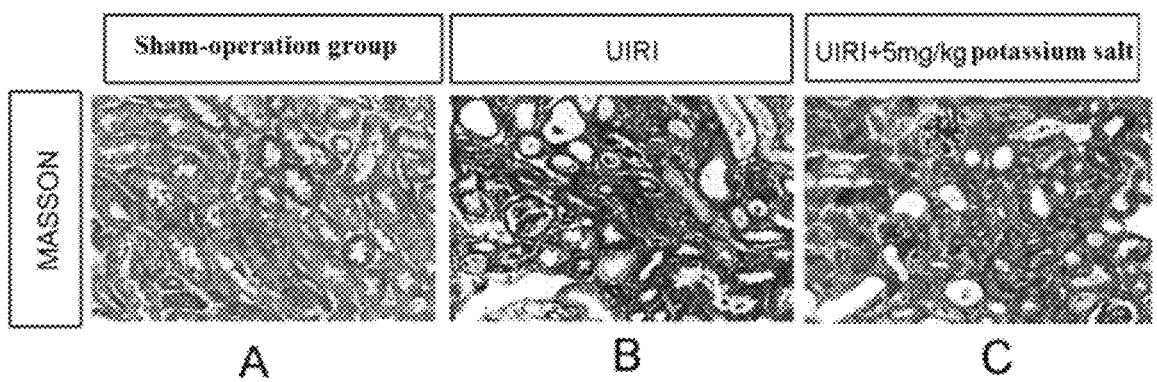
FIG. 45 shows a comparison diagram of the changes in the structure of glomeruli and renal tubules in the left renal fibrosis lesion after 10 days of treatment of UIRI model mice with a potassium salt crystal form B of WYQ (Masson Trichrome staining), A-C indicate a sham-operation group, a UIRI model group, and a treatment group of a potassium salt crystal form B of WYQ, respectively.
Figure 46:
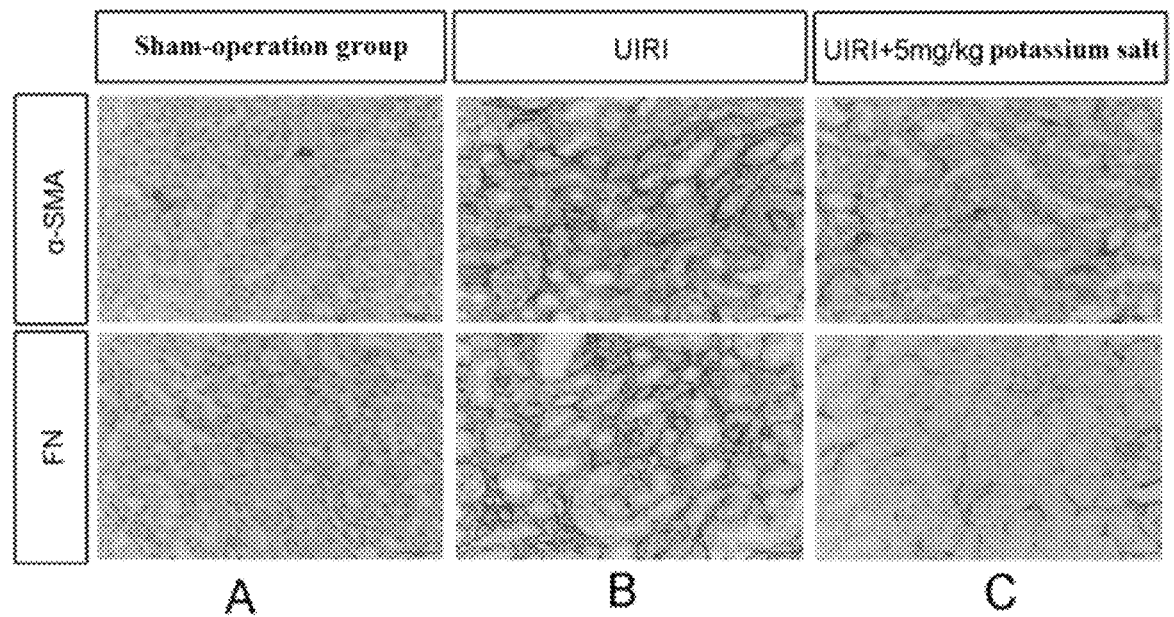
FIG. 46 shows the changes in FN and α-SMA expression in the renal fibrosis lesions of UIRI model mice treated with a potassium salt crystal form B of WYQ for 10 days (immunohistochemistry), A-C indicate a sham-operation group, a UIRI model group, and a treatment group of a potassium salt crystal form B of WYQ, respectively.

3.1.2 The Potassium Salt Crystal Form B of WYQ Effectively Alleviated Renal Fibrotic Lesions in UIRI Mice It was shown in the results of HE staining (FIG. 44) and Masson staining (FIG. 45) that the kidney tissues of mice in the sham-operation group were normal in structure, with no atrophy of the glomeruli and no pathological changes such as renal tubule dilatation, inflammatory cell infiltration and interstitial fibrous tissue proliferation. Compared with the mice in sham-operation group, the mice in the UIRI operation group showed irreversible damage to renal tissue and cell structure, atrophy or loss of renal tubules, glomerulosclerosis, significant increase in collagen fibers in the renal interstitium, significant collagen deposition, and fibrosis with interstitial inflammatory cell infiltration. Immunohistochemistry (FIG. 46) results shows that FN1 and α-SMA proteins secreted by myofibroblasts were significantly increased in the fibrotic lesions in the kidneys of UIRI mice. After treatment with the potassium salt crystal form B of WYQ, inflammatory cell infiltration in the kidneys was significantly reduced, extracellular matrix deposition was decreased, and the expression levels of FN1 and α-SMA proteins were also significantly reduced.

Figure 47:
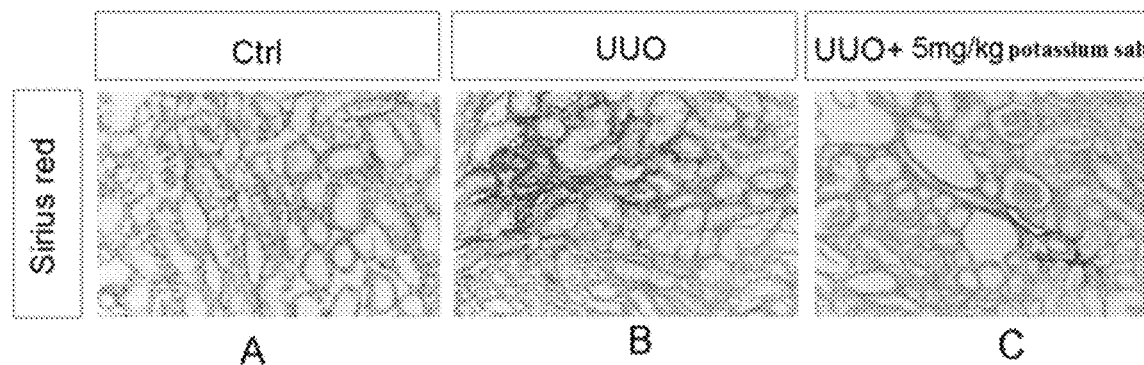
FIG. 47 shows a comparison diagram of histological changes (HE staining) of glomeruli and renal tubules in left kidney fibrosis lesions after treatment of UUO model mice with a potassium salt crystal form B of WYQ for 7 days, where A is a normal control group and B is a model group, C is a treatment group of a potassium salt crystal form B of WYQ.
Figure 48:
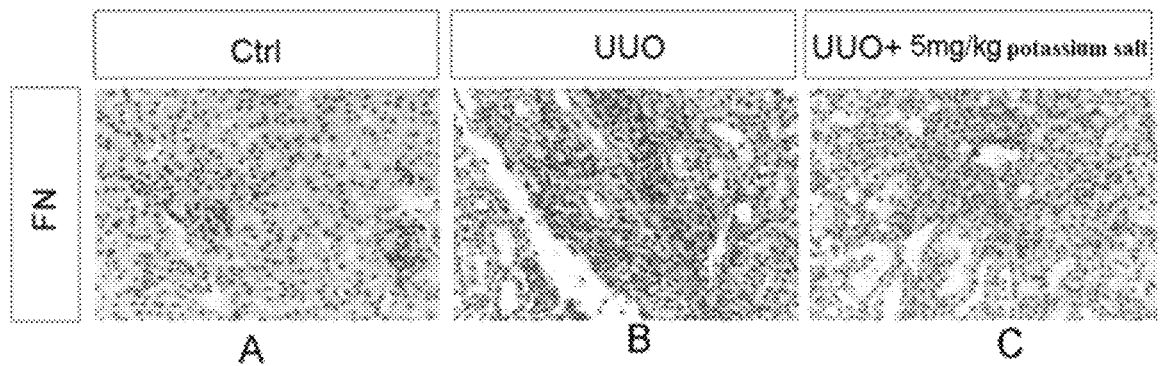
FIG. 48 shows the changes of FN expression in the kidney fibrosis lesions after treatment of UUO mice with a potassium salt crystal form B of WYQ for 7 days (immunohistochemistry), where A is a normal control group, B is a model group, and C is a group of a potassium salt crystal form B of WYQ.
Figure 49:
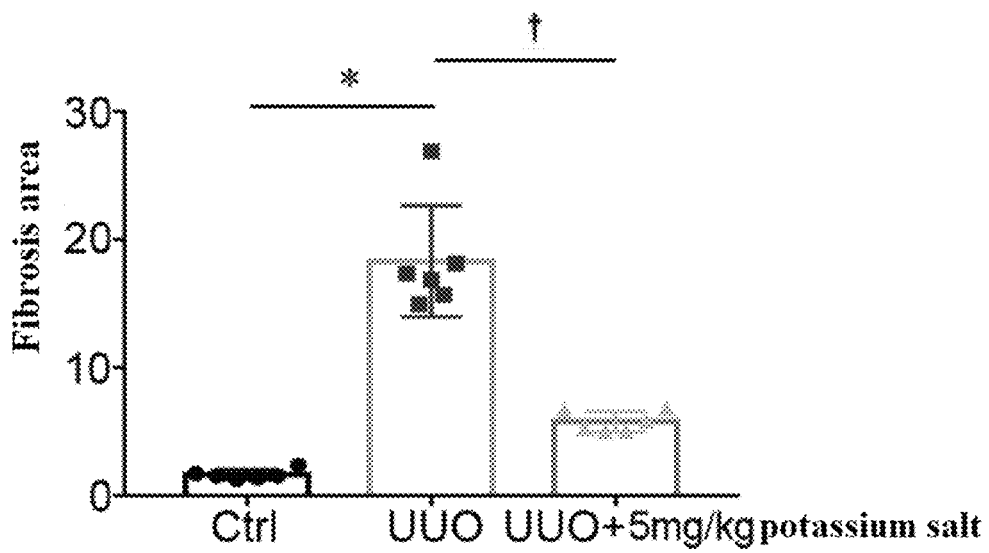
FIG. 49 is a statistical diagram of the fibrosis area in the left kidney fibrosis lesion after treatment of UUO mice with a potassium salt crystal form B of WYQ for 7 days.

3.2 Therapeutic Effects of the Potassium Salt Crystal Form B of WYQ on UUO Model Mice 3.2.1 The Potassium Salt Crystal Form B of WYQ Effectively Alleviated Renal Fibrotic Lesions in UUO Mice The results of HE staining (FIG. 47) showed that the kidney tissues of the mice in the sham-operation group were normal in structure, and no pathological changes such as renal tubule atrophy or dilatation, glomerulus lesions, inflammatory cell infiltration and interstitial fibrous tissue proliferation were observed. Compared with the mice in the sham-operation group, the mice in the UUO operation group showed obvious dilatation of the renal pelvis and calices, massive inflammatory cell infiltration in the renal interstitium, destruction of the integrity of the renal tubule brush border, varying degrees of atrophy and necrosis, thickening of the glomerulus basement membrane, glomerular glass-like changes, significant collagen deposition in the renal interstitium, and a significant increase in the area of fibrosis. Immunohistochemistry (FIG. 48) results showed that FN1 protein secreted by myofibroblasts was significantly increased in the kidney tissue of UUO mice. After treatment with the potassium salt crystal form B of WYQ, inflammatory cell infiltration in the kidney was significantly reduced, the proliferation of renal interstitial collagen fibers was reduced, and the expression level of FN1 protein was also significantly reduced. Compared with the UUO model group, the treatment group of the potassium salt crystal form B of WYQ had a significantly decrease in fibrosis area in the renal fibrosis lesions (FIG. 49).

V. Experiments on Animals with Myocardial Hypertrophy

1. Experimental Materials 1.1 Reagents

Isoproterenol, mouse anti-α-SMA antibody and sodium carboxymethylcellulose were purchased from Sigma Reagent Company, USA; rabbit anti-Collagen-I antibody was purchased from Millipore, USA; mouse anti-BNP antibody and rabbit anti-ANP antibody were purchased from abcam; anti-rabbit and anti-mouse secondary antibodies were purchased from Jackson, USA; the potassium salt crystal form B of the compound WYQ was prepared in Embodiment 1; heparin, urethane solution and formalin were purchased from China National Pharmaceutical Group Co. Ltd. The rat ANP and BNP primers were synthesized by Sango Biotech (Shanghai) Co., Ltd.

1.2 Apparatus

RM 6240E multi-channel physiological signal recorder (Chengdu Instrument Factory); analytical balance: Precia, Germany; weight scale: Changshu Shuangjie Testing Instrument Factory, T1000; operating microscope: Luckbird XTS-4A; gel imaging system: Bio-Rad, USA; electrophoresis tank and electrophoresis instrument: Bio-Rad, USA; pH meter: ETTLER, Switzerland.

1.3 Experimental Animals

The SPF-grade male SD rats were purchased from Hunan Slack Jingda Experimental Animal Co. Ltd., production license number: SCXK (Hunan) 2016-0002, raised in the Experimental Animal Center of South China University of Technology, with the animal center use license number: SYXK (Guangdong) 2017-0178, weight: 250±10 g.

2. Experimental Methods 2.1 Experimental Grouping

SD rats were randomly divided into 3 groups, 10 rats/group: a normal control group (CON); an isoproterenol-induced myocardial hypertrophy model group (Iso); an Iso+the potassium salt crystal form B of WYQ treatment group (hereafter referred to as a treatment group).

2.2 Animal Modeling

Isoproterenol was prepared into a 4 mg/ml medicinal solution with double-distilled water, which was ready to be used. The normal control group was injected with normal saline (5 mg/kg) subperitoneally, and the rest of the groups were injected with isoproterenol (5 mg/kg) subperitoneally once a day for 7 consecutive days.

2.3 Dosage and Method of Administration

CON group: no drug administration;

Iso model group: no drug administration;

Treatment group: the potassium salt crystal form B of WYQ was prepared into a 0.4 mg/ml medicinal solution with normal saline (ready to use) and administered by gavage at a dose of 2 mg·kg$^{-1}$·d$^{-1}$; and the day of injection was the starting date of the experiment, and the administration was started 2 hours after the modeling, once a day for 7 consecutive days.

According to the interspecies dose conversion method currently used by the FDA in USA, the conversion factor for rats and humans is 0.162. Therefore, it is concluded that the oral dose of the potassium salt crystal form B of WYQ for human is 0.324 mg·kg$^{-1}$d$^{-1}$, administered once a day for 7 consecutive days, based on the gavage administration dose for rats in the Embodiments.

According to the dose conversion between different routes of administration in the "Pharmacological Experimental Methodology", the ratio of intramuscular and intraperitoneal injection dose to oral dose is about 0.3-0.4, thus inferring that the human injectable dose of the potassium salt crystal form B of WYQ is 0.0972-0.1296 mg·kg$^{-1}$·d$^{-1}$, administered once a day for 7 consecutive days (drug concentration: 1 mg/ml).

2.4 Experimental Indexes and Assay Methods 2.4.1 Hemodynamic Indexes of Rats with Myocardial Hypertrophy After 7 days from the starting date of the experiment, the left ventricle was intubated retrogradely through the right common carotid artery, and the hemodynamic indexes of each group of rats were collected on the RM-6240E polygraph, including the left ventricular pressure (LVP) and the rate of ventricular pressure change (dp/dt).

2.4.2 Measurement of Myocardial Hypertrophy Index in Rats with Myocardial Hypertrophy and Tissue Separation One week after the starting date of the experiment, the animals were anesthetized and hemodynamically tested (RM-6240E polygraph). The animals were sacrificed after pressure measurement. The heart tissues were immediately dissected and rinsed in frozen normal saline to remove blood. The heart was weighed quickly, and the left and right atria are cut along the atrio-ventricular junction with ophthalmic scissors. The left ventricle was separated, and absorbed water with filter paper, weighed, and put into liquid nitrogen for extraction of protein and mRNA to detect changes in the expression of hypertrophy-related factor genes. After 2 hours, the left ventricle tissue was transferred to a refrigerator at −80° C. for freezing and storage. After completing the above operations, the leg skin and muscles of the rats were cut with surgical scissors to fully expose the tibia, and the length of the tibia was measured. The myocardial hypertrophy index of rats was expressed by a heart-tibia length (HW-Tibia).

Figure 50:
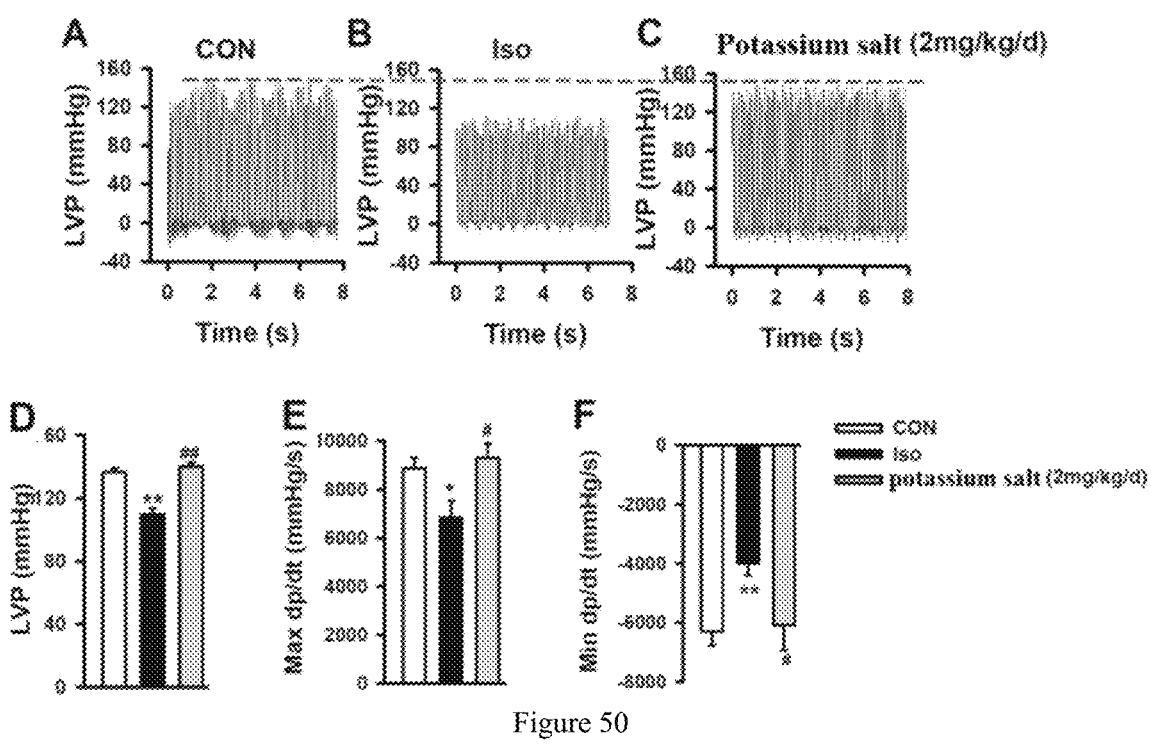
FIG. 50 shows the improvement of various parameters of cardiac function in rats with isoproterenol-induced myocardial hypertrophy after 7 days of treatment of a potassium salt crystal form B of WYQ, where A-C are the standard curves of left ventricular pressure of rats in a normal control group, a model group and a treatment group of a potassium salt crystal form B of WYQ, and D-F are the statistical graphs of left ventricular pressure, Max dp/dt and Min dp/dt in each group of rats.

3. Experimental Results 3.1 Effect of the Potassium Salt Crystal Form B of WYQ on Various Parameters of Cardiac Function in Rats with Isoproterenol-Induced Myocardial Hypertrophy The left ventricular pressure (LVP) reflects the change of left ventricular pressure in rats, and the rate of ventricular pressure change (dp/dt) reflects the rate of change of left ventricular pressure during cardiac diastole and systole, in which Max dp/dt indicates the maximum rate of increase of left ventricular pressure during isovolumic systole, reflecting the systolic function of the heart; Min dp/dt indicates the maximum rate of decrease of left ventricular pressure during isovolumic diastole, reflecting the diastolic function of the heart. The experimental results showed that: (1) compared with the CON group, the left ventricular pressure of the rats in the Iso model group was significantly lower, while after intervention of the potassium salt crystal form B of WYQ, the left ventricular pressure of the rats in the treatment group was significantly higher compared with the model group (FIGS. 50A-D). (2) Max dp/dt in rats in the Iso model group was significantly lower compared with CON, while Max dp/dt in rats in the treatment group was significantly higher compared with the model group after intervention of the potassium salt crystal form B of WYQ (FIG. 50E). (3) Min dp/dt of rats in the Iso model group was significantly lower compared with the CON; after intervention of the potassium salt crystal form B of WYQ, the Min dp/dt of rats in the treatment group was significantly higher compared with the model group (FIG. 50F). This indicates that the potassium salt crystal form B of WYQ can well restore the left heart function of rats with isoproterenol-induced myocardial hypertrophy, and has a potential drug development value.

Figure 51:
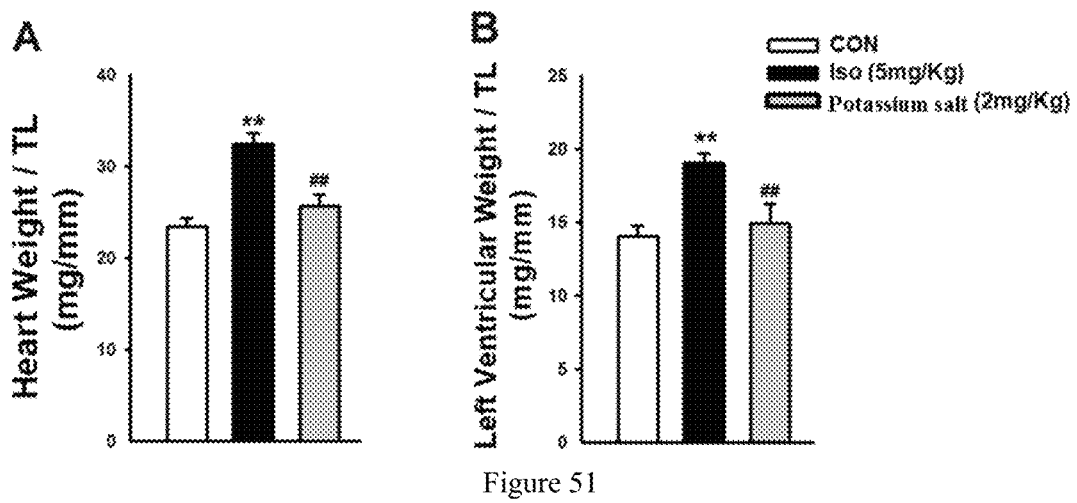
FIG. 51 shows the reduction of the myocardial hypertrophy index in rats with isoproterenol-induced myocardial hypertrophy after 7 days of treatment with a potassium salt crystal form B of WYQ, where A is a HW-Tibia ratio statistical graph of rats in a normal control group, a model group and a treatment group of a potassium salt crystal form B of WYQ, B is a statistical graph of left ventricle-tibia length ratio of rats in each group.

3.2 Effect of the Potassium Salt Crystal Form B of WYQ on the Isoproterenol-Induced Myocardial Hypertrophy Index of Rats The myocardial hypertrophy index of rats can be expressed by a heart-weight ratio. In view of the large differences in the weight gain of individual rats, and relatively uniform changes of the length of tibia with the increase of months, the heart-tibia length (HW-Tibia) is measured to express the myocardial hypertrophy index of rats. The experimental results showed that: (1) compared with CON, the HW-Tibia ratio of the rats in the Iso model group was significantly increased; and after the intervention of the potassium salt crystal form B of WYQ, the HW-Tibia ratio of the rats in the treatment group was significantly reduced compared with the model group (FIG. 51A); (2) compared with the CON, the left ventricle-tibia length ratio of the rats in the Iso model group was significantly increased; after the intervention of the potassium salt crystal form B of WYQ, the left ventricle-tibia length ratio of the rats in the treatment group was significantly reduced compared with the model group (FIG. 51B). It was indicated that the potassium salt crystal form B of WYQ can significantly reduce the myocardial hypertrophy induced by isoproterenol.

Figure 52:
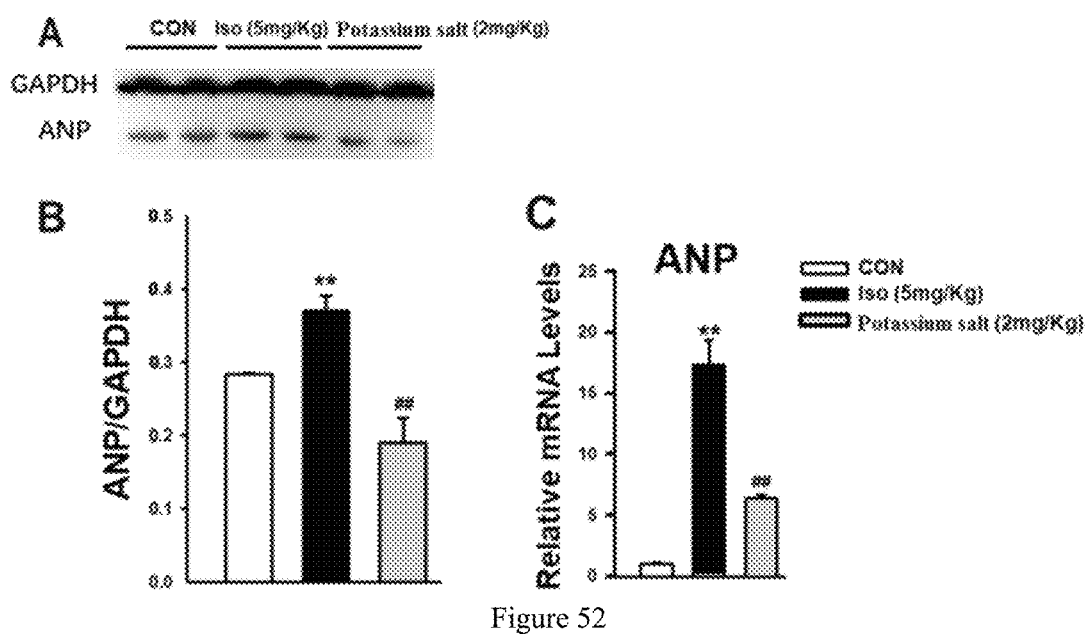
FIG. 52 shows the expression of hypertrophic factor ANP in the heart tissue of rats with isoproterenol-induced myocardial hypertrophy reduced after 7 days of treatment with a potassium salt crystal form B of WYQ, where A and B are the immunoblotting standard graph and statistical graph of ANP protein expression in the left heart tissue of rats in a normal control group, a model group and a treatment group of a potassium salt crystal form B of WYQ, and C is a statistical graph of ANP gene expression of the rats in each group.
Figure 53:
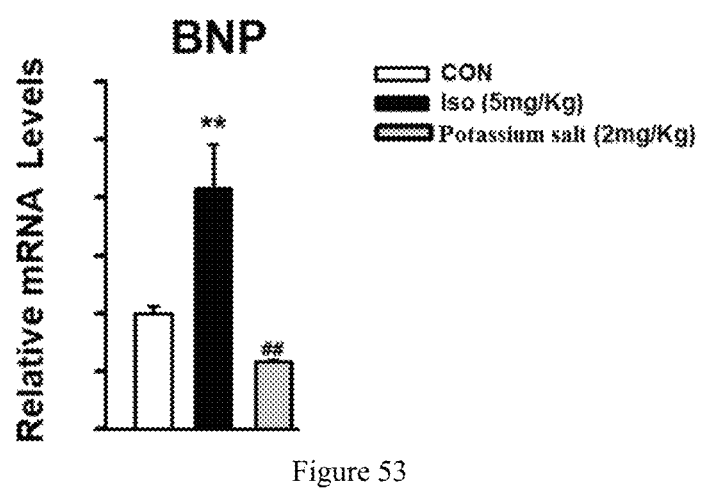
FIG. 53 shows that the expression of hypertrophic factor BNP in the heart tissue of rats with isoproterenol-induced myocardial hypertrophy reduced after 7 days of treatment with a potassium salt crystal form B of WYQ.

3.3 Effect of the Potassium Salt Crystal Form B of WYQ on the Expression of Hypertrophic Factors in the Heart Tissues of Rats with Isoproterenol-Induced Myocardial Hypertrophy The expression of atrial natriuretic peptide (ANP) in myocardial cells can be used as a marker of myocardial hypertrophy. The experimental results showed that (1) the expression of ANP gene and protein in the left heart tissues of rats in the Iso model group was significantly increased compared with that in the CON group, while the expression of ANP gene and protein in the treatment group was significantly decreased compared with that in the model group after intervention of the potassium salt crystal form B of WYQ (FIG. 52). (2) The expression of BNP gene and protein were significantly increased in the heart tissue of the Iso model group compared with the CON, while BNP gene expression was significantly decreased in the treatment group compared with the model group after intervention of the potassium salt crystal form B of WYQ (FIG. 53). It was indicated that the potassium salt crystal form B of WYQ had a significant therapeutic effect on myocardial hypertrophy caused by isoproterenol.

The above experimental results demonstrate that the present disclosure provides a potassium salt crystal form B of PDE5i, which has the advantages of good water solubility, low hygroscopicity and stable physicochemical properties. The disclosure verifies that the potassium salt crystal form B of WYQ can be used for the treatment of PAH, IPF and erectile dysfunction, and can effectively reduce RVSP, alleviate right ventricular hypertrophy, improve pulmonary arteriole proliferation, reduce fibrosis in pulmonary fibrosis lesions, and alleviate alveolar structural damage and bronchiole and pulmonary arteriole proliferation. The potassium salt crystal form B provided by the present disclosure can also be used to treat renal fibrosis and myocardial hypertrophy. In addition, the new crystal form of PDE5i has a significantly higher water solubility, thus reducing its therapeutic dosage, reducing liver and kidney stress, and reducing the economic cost of treating the disease.

The above embodiments apparently are examples only for clarity and are not intended to limit the implementation. Other variations or modifications may be made in different forms based on the above description for those of ordinary skill in the art. It is not necessary or possible to be exhaustive of all embodiments here. The obvious variations or modifications derived therefrom are still within the protection scope of the disclosure.

What is claimed is:

1. A potassium salt crystal form B of a compound, wherein the compound has a structural formula shown in a formula (I), and

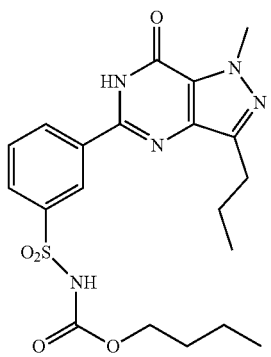

an X-ray powder diffraction (XRPD) pattern of the potassium salt crystal form B has characteristic peaks at the following 2θ angles: 5.71°±0.2°, 8.23°±0.2°, 11.37°±0.2°, 13.22°±0.2°, 17.09°±0.2°, 21.56°±0.2°, 23.99°±0.2°, and 25.85°±0.2°.

2. The potassium salt crystal form B of the compound according to claim 1, wherein the X-ray powder diffraction (XRPD) pattern of the potassium salt crystal form B has characteristic peaks at the following 2θ angles: 15.88°±0.2°, 16.35°±0.2°, 18.47°±0.2°, 19.70°±0.2°, 22.90°±0.2°, 23.64°±0.2°, and 31.92°±0.2°.

3. The potassium salt crystal form B of the compound according to claim 2, wherein the X-ray powder diffraction (XRPD) pattern of the potassium salt crystal form B has characteristic peaks at the following 2θ angles: 25.04°±0.2°, 26.54°±0.2°, 28.36°±0.2°, 29.94°±0.2°, 35.48°±0.2°, and 37.83°±0.2°.

4. The potassium salt crystal form B of the compound according to claim 1, wherein the potassium salt crystal form B has an X-ray powder diffraction (XRPD) pattern as shown in FIG. 1.

5. The potassium salt crystal form B of the compound according to claim 1, wherein a differential scanning calorimetry (DSC) pattern of the potassium salt crystal form B has endothermic peaks at 191.3° C. and 217.9° C.

6. The potassium salt crystal form B of the compound according to claim 1, wherein the potassium salt crystal form B has a TG-DSC pattern as shown in FIG. 2.

7. The potassium salt crystal form B of the compound according to claim 1, wherein the potassium salt crystal form B has a following structural formula:

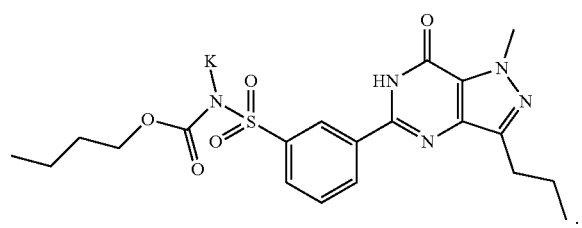

8. A method for preparing the potassium salt crystal form B of the compound according to claim 1, comprising:
mixing the compound shown in the formula I with a solvent to form a suspension 1;
adding potassium hydroxide into the suspension 1 to dissolve to form a suspension 2, followed by crystallizing with stirring to form a solid material; and
separating the solid material by filtrating under vacuum, and drying under vacuum to obtain the potassium salt crystal form B of the compound.

9. The method according to claim 8, wherein the solvent is selected from the group consisting of acetone, tetrahydrofuran, ethyl acetate or ethanol.

10. The method according to claim 8, wherein a mass-volume ratio of the compound shown in the formula I to the solvent is 25-30 mg/mL, and a mass ratio of potassium hydroxide to the compound shown in the formula I is 1:(7-10).

11. The method according to claim 8, wherein the crystallizing with stirring comprises: sequentially stirring the suspension 2 at 45-50° C. for 5-10 min, then at 20-30° C. for 20-24h, and then at 45-50° C. for 8-10h.

12. The method according to claim 8, comprising:
mixing the compound shown in the formula I with acetone at a mass-volume ratio of 28 mg/mL to form a suspension 1;
adding potassium hydroxide to the suspension 1 to dissolve with sonicating to form a suspension 2, wherein a mass ratio of potassium hydroxide to the compound shown in the formula I is 1:8;
sequentially stirring the suspension 2 at 50° C. for 5 min, then at 25° C. for 24 h, and then at 50° C. for 9 h, thereby forming a solid material; and
separating the solid material by filtrating under vacuum, and drying under vacuum to obtain the potassium salt crystal form B of the compound.

13. A pharmaceutical composition, comprising the potassium salt crystal form B of the compound according to claim 1 and a pharmaceutically acceptable carrier.

14. A method for treating pulmonary arterial hypertension, or idiopathic pulmonary fibrosis, or renal fibrosis, or myocardial hypertrophy, or erectile dysfunction, comprising administering the potassium salt crystal form B of the compound according to claim 1 to a subject.

15. The method according to claim 14, wherein for treating pulmonary arterial hypertension,
the potassium salt crystal form B of the compound is administered orally at a dose of 0.324-3.24 mg·kg$^{-1}$·d$^{-1}$, preferably once a day, preferably for 14 consecutive days; or
wherein the potassium salt crystal form B of the compound is administered by injecting at a dose of 0.097-1.296 mg·kg$^{-1}$·d$^{-1}$, preferably once a day, preferably for 14 consecutive days.

16. The method according to claim 14, wherein for treating idiopathic pulmonary fibrosis,
the potassium salt crystal form B of the compound is administered orally at a dose of 0.405-1.62 mg·kg$^{-1}$·d$^{-1}$, preferably once a day, preferably for 23 consecutive days; or
wherein the potassium salt crystal form B of the compound is administered by injecting at a dose of 0.122-0.648 mg·kg$^{-1}$·d$^{-1}$, preferably once a day, preferably for 23 consecutive days.

17. The method according to claim 14, wherein for treating renal fibrosis, the potassium salt crystal form B of the compound is administered orally at a dose of 0.405 mg·kg$^{-1}$·d$^{-1}$, preferably once a day, preferably for 10 consecutive days, more preferably for 7 consecutive days; or wherein the potassium salt crystal form B of the compound is administered by injecting at a dose of 0.1215-0.162 mg·kg$^{-1}$·d$^{-1}$, preferably once a day, preferably for 10 consecutive days, more preferably for 7 consecutive days.

18. The method according to claim 14, wherein for treating myocardial hypertrophy, the potassium salt crystal form B of the compound is administered orally at a dose of 0.324 mg·kg$^{-1}$·d$^{-1}$, preferably once a day, preferably for 7 consecutive days; or wherein the potassium salt crystal form B of the compound is administered by injecting at a dose of 0.097-0.1296 mg·kg$^{-1}$·d$^{-1}$, preferably once a day, preferably for 7 consecutive days.

19. The method according to claim 14, wherein for treating erectile dysfunction, the potassium salt crystal form B of the compound is administered orally at a dose of 0.324-3.24 mg·kg$^{-1}$·d$^{-1}$, preferably once a day, preferably for 14 consecutive days; or the potassium salt crystal form B of the compound is administered by injecting at a dose of 0.097-1.296 mg·kg$^{-1}$·d$^{-1}$, preferably once a day, preferably for 14 consecutive days.

\* \* \* \* \*